United States Patent
Nakura

(10) Patent No.: US 7,879,494 B2
(45) Date of Patent: Feb. 1, 2011

(54) LITHIUM ION SECONDARY BATTERY AND MANUFACTURING METHOD THEREFOR

(75) Inventor: Kensuke Nakura, Osaka (JP)

(73) Assignee: Panasonic Corporation, Osaka (JP)

( * ) Notice: Subject to any disclaimer, the term of this patent is extended or adjusted under 35 U.S.C. 154(b) by 888 days.

(21) Appl. No.: 11/794,311

(22) PCT Filed: Mar. 22, 2006

(86) PCT No.: PCT/JP2006/305730
§ 371 (c)(1), (2), (4) Date: Jun. 27, 2007

(87) PCT Pub. No.: WO2006/101138
PCT Pub. Date: Sep. 28, 2006

(65) Prior Publication Data
US 2008/0090150 A1 Apr. 17, 2008

(30) Foreign Application Priority Data
Mar. 23, 2005 (JP) ............................. 2005-084445

(51) Int. Cl.
*H01M 4/52* (2010.01)
(52) U.S. Cl. .................. 429/231.3; 429/223; 429/224; 429/231.1; 429/231.5; 429/231.6; 429/231.9; 429/231.95; 29/623.5
(58) Field of Classification Search .................. None
See application file for complete search history.

(56) References Cited

U.S. PATENT DOCUMENTS
2002/0086210 A1* 7/2002 Naruoka et al. ............. 429/223

FOREIGN PATENT DOCUMENTS

| JP | 7-134985 | 5/1995 |
|---|---|---|
| JP | 8-236114 | 9/1996 |
| JP | 8-250120 | 9/1996 |
| JP | 8-297357 | 10/1996 |
| JP | 10-199530 | 7/1998 |
| JP | 11-016566 | 1/1999 |
| JP | 2001-143708 | 5/2001 |
| JP | 2001-256979 | 9/2001 |
| JP | 2002-75367 | 3/2002 |
| JP | 2003-123750 | 4/2003 |
| JP | 2003-173775 | 6/2003 |
| JP | 2003-257434 | 9/2003 |
| JP | 2004-119110 | 4/2004 |
| JP | 2004-127694 | 4/2004 |
| JP | 2004-253305 | 9/2004 |

* cited by examiner

Primary Examiner—Ula C Ruddock
Assistant Examiner—Tony Chuo
(74) Attorney, Agent, or Firm—McDermott Will & Emery LLP

(57) ABSTRACT

Active material particles of a lithium ion secondary battery includes at least a first lithium-nickel composite oxide: $Li_xNi_{1-y-z}Co_yMe_zO_2$ (where $0.85 \leq x \leq 1.25$, $0 < y \leq 0.5$, $0 \leq z \leq 0.5$, $0 < y+z \leq 0.75$, and element Me is at least one selected from the group consisting of Al, Mn, Ti, Mg, and Ca) forming a core portion thereof. The surface layer portion of the active material particles includes nickel oxide having the NaCl-type crystal structure or a second lithium-nickel composite oxide, and further includes element M not forming the crystal structure of the first lithium-nickel composite oxide. Element M is at least one selected from the group consisting of Al, Mn, Mg, B, Zr, W, Nb, Ta, In, Mo, and Sn.

6 Claims, 2 Drawing Sheets

LITHIUM ION SECONDARY BATTERY AND MANUFACTURING METHOD THEREFOR

RELATED APPLICATIONS

This application is the U.S. National Phase under 35 U.S.C. §371 of International Application No. PCT/JP2006/305730, filed on Mar. 22, 2006, which in turn claims the benefit of Japanese Application No. 2005-084445, filed on Mar. 23, 2005, the disclosures of which Applications are incorporated by reference herein.

TECHNICAL FIELD

The present invention relates to a lithium ion secondary battery that is excellent in safety at the time of an internal short-circuit.

BACKGROUND ART

Lithium ion secondary batteries, a typical example of non-aqueous electrolyte secondary batteries, have high electromotive force and high energy density. Thus, demand is growing for lithium ion secondary batteries, as a main power source for mobile telecommunication devices and mobile electronic devices. A majority of lithium ion secondary batteries currently on the market include a lithium composite oxide containing cobalt as its main component (for example, $Li_xCoO_2$ (x changes based on charging and discharging of the battery)) as the positive electrode active material. However, cost reduction is difficult because of the high price of cobalt compound used as the raw material in lithium composite oxide containing cobalt as a main component.

Therefore, in view of cost reduction, there have been researches and developments for an alternative to lithium composite oxide containing cobalt as a main component. Particularly, active researches have been carried out for lithium composite oxide containing nickel as a main component (for example, $Li_xNiO_2$ (x changes based on charging and discharging of the battery)).

In addition to cost reduction, it is important to increase reliability of lithium ion secondary batteries. The lithium composite oxide including Co or Ni produces high valence, highly reactive $Co^{4+}$ or $Ni^{4+}$ upon charging. This accelerates electrolyte decomposition reaction involving lithium composite oxide under high temperature environment. As a result, gas generation occurs, and it becomes difficult to curb heat generation at the time of an internal short-circuit.

In charged batteries, $Li_xNiO_2$ is more reactive than $Li_xCoO_2$. Thus, curbing of the electrolyte decomposition reaction has been examined. For example, there has been proposed that nickel oxide with the nickel oxidation number of 3 or less and not including lithium in its crystal is added to the lithium composite oxide containing nickel as its main component (Patent Document 1). Additionally, there has been proposed that a coating comprising a specific metal oxide is formed on the positive electrode active material surface (Patent Documents 2 to 5). Further, there have been proposed that the positive electrode active material surface is reduced (Patent Document 6). For example, there has been proposed that the positive electrode active material surface is reduced with gas and the positive electrode active material is mixed with carbon and then baked.

Patent Document 1:

Japanese Laid-Open Patent Publication No. Hei 7-134985

Patent Document 2:

Japanese Laid-Open Patent Publication No. Hei 8-236114

Patent Document 3:

Japanese Laid-Open Patent Publication No. 2003-123750

Patent Document 4:

Japanese Laid-Open Patent Publication No. Hei 11-16566

Patent Document 5:

Japanese Laid-Open Patent Publication No. 2001-256979

Patent Document 6:

Japanese Laid-Open Patent Publication No. Hei 10-199530

DISCLOSURE OF INVENTION

Problem that the Invention is to Solve

As mentioned above, there have been many proposals for curbing gas generation. However, for securing battery reliability sufficiently, the reaction involving lithium composite oxide has to be curbed to a further high degree. To be specific, prevention of battery abnormal heat generation upon internal short-circuit is desired. For example, it is desired to curb battery abnormal heat generation at the time of crush test under environment of 60° C. In view of this, there is still room for improvement in techniques in Patent Documents 1 to 6.

Reasons for the occurrence of abnormal heat generation in battery at the time of an internal short-circuit is described here.

When an internal short-circuit occurs, Joule heat is generated at the short circuit portion. That heat induces thermal decomposition reaction of the positive electrode active material and reactions between the active material and the electrolyte. These reactions involve heat generation. Therefore, when these reactions cannot be curbed, it leads to abnormal heat generation in a battery.

Thermal decomposition reaction of the active material is oxygen desorption reaction from the active material surface. Electrolyte decomposition reaction is a reaction between the active material surface and the electrolyte. As a result of various examinations, there have been obtained findings that these reactions advance at active points of the active material surface. The active point of the active material surface is formed by lattice defect.

According to Patent Document 1, a nickel oxide with nickel oxidation number of three or less and not including lithium in its crystal works to curb electrolyte decomposition reactions. However, merely adding the nickel oxide to the active material leaves the active point on the active material surface existed. Thus, when the crush test is carried out under a harsh environment of 60° C., there is a possibility that battery abnormal heat generation is caused.

According to Patent Documents 2 to 5, a metal oxide film formed on the active material surface can curb the reaction between the active material surface and the electrolyte. However, the active point on the active material surface is not completely inert. Thus, oxygen desorption of the active material cannot be curbed.

According to Patent Document 6, by reducing the whole active material surface, reactivity of the whole surface declines. Thus, thermal decomposition reaction of the positive electrode active material and reaction between the active material and the electrolyte can be curbed. However, a problem occurs in which high-rate performance cannot be obtained sufficiently at low temperature.

Means for Solving the Problem

The present invention aims to further improve safety at the time of an internal short-circuit in a lithium ion secondary battery including a lithium composite oxide (lithium-nickel composite oxide) which contains nickel as its main component and has a crystal structure of for example R3-m as the positive electrode active material, without hindering high-rate performance at low temperature.

That is, the present invention relates to a lithium ion secondary battery comprising a positive electrode capable of charging and discharging, a negative electrode capable of charging and discharging, and a non-aqueous electrolyte;

the positive electrode including active material particles;

the active material particles including at least a first lithium-nickel composite oxide forming a core portion thereof;

the first lithium-nickel composite oxide being represented by $Li_xNi_{1-y-z}Co_yMe_zO_2$ where $0.85 \leq x \leq 1.25$, $0 < y \leq 0.5$, $0 \leq z \leq 0.5$, $0 < y+z \leq 0.75$, and element Me is at least one selected from the group consisting of Al, Mn, Ti, Mg, and Ca;

a surface layer portion of the active material particles including:

(i) at least one selected from the group consisting of a nickel oxide having a NaCl-type crystal structure and a second lithium-nickel composite oxide including a domain having the NaCl-type crystal structure; and (ii) element M not incorporated in the crystal structure of the first lithium-nickel composite oxide, element M being at least one selected from the group consisting of Al, Mn, Mg, B, Zr, W, Nb, Ta, In, Mo, and Sn.

The nickel oxide having the NaCl-type crystal structure is preferably at least one selected from the group consisting of NiO and cation-deficient $Ni_{1-\delta}O$. Also, the domain having the NaCl-type crystal structure is preferably structured so that Li in Li site in the first lithium-nickel composite oxide is replaced with Ni, Co, or Me.

In one embodiment of the present invention, element M is distributed more in the outer side of the surface layer portion than in the inner side, and nickel oxide is distributed more in the inner side of the surface layer portion than in the outer side.

In one embodiment of the present invention, the above general formula satisfies $0 < z \leq 0.5$, and the concentration of element Me is higher in the proximity of the surface layer portion of the active material particles compared with the inner side thereof.

The amount of element M is preferably 2 mol % or less relative to the lithium-nickel composite oxide.

The present invention also relates to a method for producing a lithium ion secondary battery, the method comprising the steps of:

obtaining a positive electrode capable of charging and discharging;

obtaining a negative electrode capable of charging and discharging; and assembling a battery including the positive electrode, the negative electrode, and a non-aqueous electrolyte:

the step of obtaining the positive electrode including:

(i) allowing a first lithium-nickel composite oxide represented by $Li_xNi_{1-y-z}Co_yMe_zO_2$ where $0.85 \leq x \leq 1.25$, $0 < y \leq 0.5$, $0 \leq z \leq 0.5$, $0 < y+z \leq 0.75$, and element Me is at least one selected from the group consisting of Al, Mn, Ti, Mg, and Ca to carry at least one element M selected from the group consisting of Al, Mn, Mg, B, Zr, W, Nb, Ta, In, Mo, and Sn;

(ii) producing NiOOH on the surface of the first lithium-nickel composite oxide by moisture in the atmosphere by allowing the first lithium-nickel composite oxide carrying element M to stand under an environment with a temperature of 60° C. or less and a humidity of 20% or more;

(iii) preliminary baking the first lithium-nickel composite oxide with NiOOH produced on the surface thereof in a dry air atmosphere, and then carrying out a main baking in an oxygen atmosphere, thereby converting NiOOH into at least one selected from the group consisting of NiO having a NaCl-type crystal structure, cation-deficient $Ni_{1-\delta}O$ having the NaCl-type crystal structure, and a second lithium-nickel composite oxide including a domain having the NaCl-type crystal structure, to obtain active material particles; and (iv) forming a positive electrode including the active material particles.

EFFECTS OF THE INVENTION

Based on the present invention, safety at the time of an internal short-circuit can be improved than before in a lithium ion secondary battery including a lithium composite oxide containing nickel as its main component (a first lithium-nickel composite oxide) as the positive electrode active material, without obstructing high-rate performance at low temperature.

The reasons that a high degree of safety can be secured at the time of an internal short-circuit have been only confirmed phenomenologically at this point. By adding element M to the surface of the first lithium-nickel composite oxide and exposing it to an environment satisfying predetermined conditions, only the active point of side reaction is converted into a second lithium-nickel composite oxide including NiO having the electrochemically inactive NaCl-type crystal structure, cation-deficient $Ni_{1-\delta}O$ having the NaCl-type crystal structure, or a domain having the NaCl-type crystal structure. The side reaction includes oxygen desorption reaction of the first lithium-nickel composite oxide and electrolyte decomposition reaction. Since only the side reaction active point of the surface layer portion of the active material particles is converted into electrochemically inactive oxide, decline in high-rate performance at low temperature is curbed.

It is difficult at this point to clearly analyze in what form element M (at least one selected from the group consisting of Al, Mn, Mg, B, Zr, W, Nb, Ta, In, Mo, and Sn) is contained at the surface layer portion of the active material particles. However, it is possible to distinguish, for example, Al, Mn, or Mg present at the surface layer portion, from Al, Mn, or Mg included in the crystal of the first lithium-nickel composite oxide by analysis such as electron diffraction measurement and EXAFS. In analysis, these can be distinguished by its crystal structure. The presence of element M at the surface layer portion of the active material particles can also be confirmed by analysis method such as element mapping by EPMA (Electron Probe Micro-Analysis).

BEST MODE FOR CARRYING OUT THE INVENTION

Figure 1:
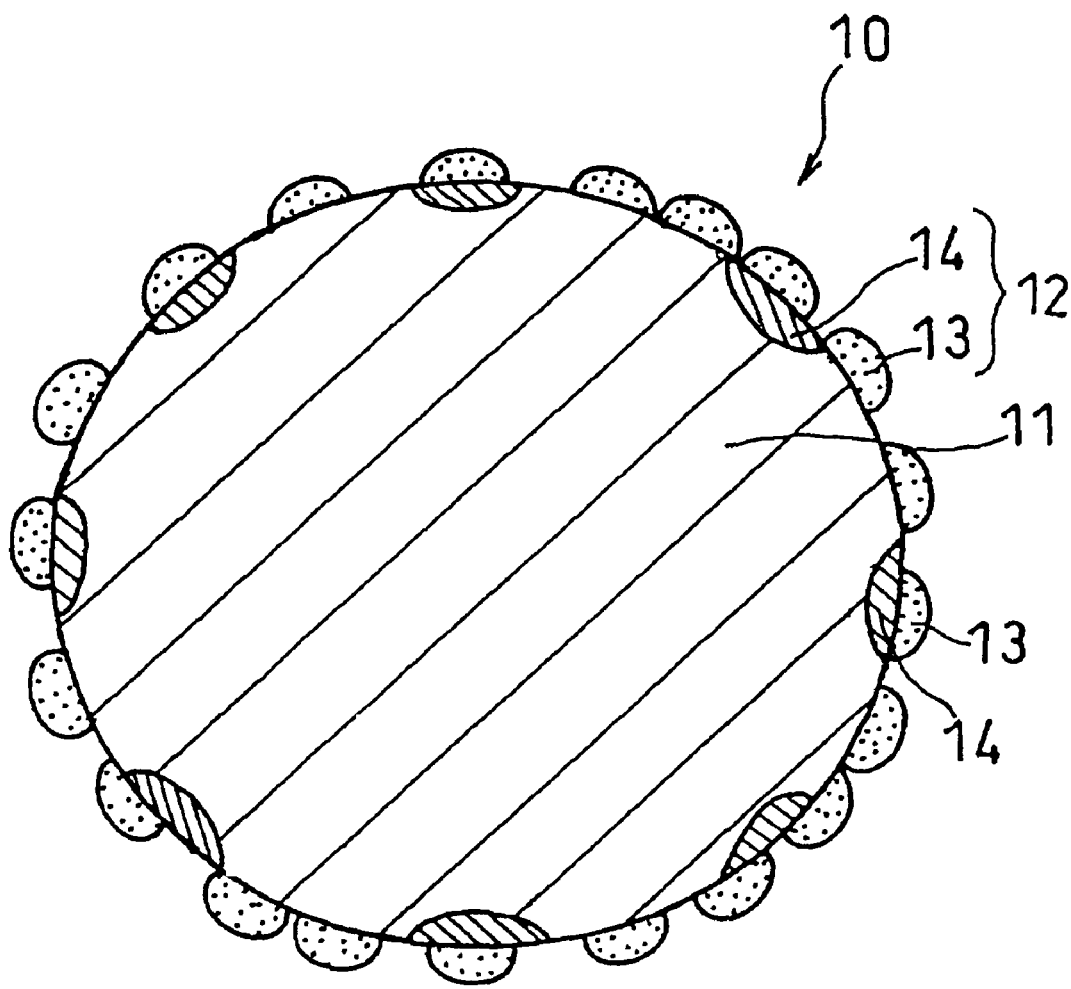
[FIG. 1] A schematic cross sectional view of an example of an active material particle of the present invention.

A positive electrode of the present invention is described first. The positive electrode includes active material particles as described below.

The active material particles include a first lithium-nickel composite oxide. The first lithium-nickel composite oxide may be in any form without limitation. The first lithium-nickel composite oxide may form active material particles, for example, with its primary particles and with secondary particles. The average particle size of the active material particles is preferably 1 to 30 μm, for example, without any limitation.

The first lithium-nickel composite oxide is represented by the general formula:

$$Li_xNi_{1-y-z}Co_yMe_zO_2$$

where $0.85 \leq x \leq 1.25$, $0 < y \leq 0.5$, $0 \leq z \leq 0.5$, $0 < y+z \leq 0.75$, and element Me is at least one selected from the group consisting of Al, Mn, Ti, Mg, and Ca. The first lithium-nickel composite oxide may include, as element Me, any of Al, Mn, Ti, Mg, and Ca, singly or in combination of two or more.

The value of x increases and decreases within the above range by battery charging and discharging. Co is an essential component, which gives an effect of decreasing the irreversible capacity to the first lithium-nickel composite oxide. Element Me is an arbitrary component which gives an effect of improving thermal stability to the first lithium-nickel composite oxide. When y or z exceeds 0.5, sufficient capacity cannot be obtained. Also, when y+z exceeds 0.75, the amount of Ni becomes below 0.25. Thus, it becomes difficult to produce NiOOH, NiO, $Ni_{1-\delta}O$, or a second lithium-nickel composite oxide including a domain having the NaCl-type crystal structure.

In view of achieving both battery performance and safety, the ranges of y and z are preferably $0.05 \leq y \leq 0.25$ and $0.001 \leq z \leq 0.1$, respectively, and further preferably $0.08 \leq y \leq 0.2$ and $0.005 \leq z \leq 0.05$, respectively.

The first lithium-nickel composite oxide is synthesized by baking a raw material having a predetermined metal element ratio in an oxidizing atmosphere. The raw material includes lithium, nickel, cobalt, and element Me, i.e., an arbitrary component. The raw material includes oxides, hydroxides, oxyhydroxides, carbonates, nitrates, and organic complex salts of each metal element. These may be used singly, or may be used in combination of two or more.

In view of making the synthesizing of the first lithium-nickel composite oxide easy, the raw material preferably includes a solid solution containing a plurality of metal elements. The solid solution including a plurality of metal elements may be oxides, hydroxides, oxyhydroxides, carbonates, nitrates, and organic complex salts. For example, a solid solution including Ni and Co, a solid solution including Ni and element Me, a solid solution including Co and element Me, and a solid solution including Ni, Co, and element Me are preferably used.

Baking temperature and oxygen partial pressure of the oxidizing atmosphere for the raw material depend on the composition, amount, and synthesizing device of the raw material. Those skilled in the art can select appropriate conditions as appropriate.

An element other than Li, Ni, Co, and element Me is sometimes mixed in as impurities in a range of amount usually included in industrial raw materials. However, the impurities may not affect the present invention greatly.

The surface layer portion of the active material particles includes at least one selected from the group consisting of nickel oxide having the NaCl-type crystal structure and a second lithium composite oxide including a domain having the NaCl-type crystal structure. Nickel oxide having the NaCl-type crystal structure is preferably at least one selected from the group consisting of NiO and cation-deficient $Ni_{1-\delta}O$. The surface layer portion may include any one of NiO, cation-deficient $Ni_{1-\delta}O$, and a second lithium-nickel composite oxide, singly or in combination of two or more.

Presence of NiO and cation-deficient $Ni_{1-\delta}O$ may be confirmed by X-ray diffraction measurement (XRD) and XENES measurement. The second lithium-nickel composite oxide including the domain having the NaCl-type crystal structure may be confirmed by electron diffraction measurement.

$\delta$ preferably satisfies $0 \leq \delta \leq 0.1$. In the following, nickel oxide of at least one selected from the group consisting of NiO and cation-deficient $Ni_{1-\delta}O$ is also called $Ni_{1-\delta}O$ ($0 \leq \delta$).

When the amount of $Ni_{1-\delta}O(0 \leq \delta)$ or the domain having the NaCl-type crystal structure is excessively small to the extent that its presence cannot be confirmed, sometimes the effects of curbing oxygen desorption reaction of the first lithium-nickel composite oxide and reaction between the first lithium composite oxide and electrolyte become insufficient.

The surface layer portion of the active material particles further includes at least one element M selected from the group consisting of Al, Mn, Mg, B, Zr, W, Nb, Ta, In, Mo, and Sn. The surface layer portion may include the above element singly as element M, or a plurality of the above elements may be combined arbitrary. Element M contributes to deactivation of side reaction active point of the first lithium-nickel composite oxide. Element M is preferably present at the surface layer portion of the active material particles as oxides. Also, element M is preferably deposited, attached, or carried at the first lithium-nickel composite oxide surface as oxides.

Sometimes the surface layer portion of the active material particles include at least one selected from the group consisting of Al, Mn, and Mg as element M, and the lithium composite oxide includes at least one selected from the group consisting of Al, Mn, and Mg as element Me. In this case, Al, Mn, and Mg as element M contributing to deactivation of side reaction active point of the lithium composite oxide is different from Al, Mn, and Mg as element Me forming lithium composite oxide in the crystal structure. Therefore, these can be clearly distinguished.

However, there may be a case where Al, Mn, and Mg at the surface layer portion diffuse into the first lithium-nickel composite oxide inside the active material particles. That is, there may be a case in which element M at the surface layer portion changes into element Me forming the first lithium-nickel composite oxide. In this case, an Al, Mn, or Mg concentration in the first lithium-nickel composite oxide becomes high in the proximity of the surface layer portion compared with the inner portion of the active material particles.

FIG. 1 is a schematic cross sectional view of an example of an active material particle 10.

The active material particle 10 includes at least a first lithium-nickel composite oxide 11 forming a core portion thereof, and a surface layer portion 12 existing at a surface of the first lithium-nickel composite oxide 11. An oxide of element M 13 is attached to a surface of the first lithium-nickel composite oxide 11. Nickel oxide having the NaCl-type crystal structure or a second lithium-nickel composite oxide 14 is formed mainly at an inner side of the oxide of element M 13. That is, the oxide of element M 13 mainly forms the outer side of the surface layer portion 12, and nickel oxide or the second lithium-nickel composite oxide 14 mainly forms the inner side of the surface layer portion 12.

The first lithium-nickel composite oxide 11 forming the core portion of the active material particle 10 may be primary particles, or may be secondary particles formed by the aggregation of a plurality of the primary particles. Also, a plurality of the active material particles 10 may be aggregated to form the secondary particles.

For the raw material for element M included in the surface layer portion of the active material particles, sulfates, nitrates, carbonates, chlorides, hydroxides, oxides, and alkoxides are preferably used. These may be used singly, or may be used in combination of two or more. Among these, sulfates, nitrates, chlorides, or alkoxides are preferably used particularly, since $Ni_{1-\delta}O$ ($0 \leq \delta$) and the second lithium-nickel composite oxide are easily produced at the surface layer portion.

The amount of element M included in the active material particles is preferably 2 mol % or less relative to the first lithium-nickel composite oxide (when x=1, Li in the first lithium-nickel composite oxide). When the amount of element M exceeds 2.0 mol %, there may be a case where the active material surface is excessively covered with the oxide not contributing to reactions, declining high-rate performance at low temperature. Element M may be used in small amount, but preferably element M is 0.01 mol % or more, and further preferably 0.1 mol % or more relative to the first lithium-nickel composite oxide.

An example of a method of manufacturing a positive electrode is described next. First, a case in which $Ni_{1-\delta}O$ ($0 \leq \delta$) is produced at the surface layer portion of the active material particles is described. In this case, side reaction active point of the first lithium-nickel composite oxide involved with oxygen desorption and electrolyte decomposition is converted to $Ni_{1-\delta}O$ ($0 \leq \delta$).

(i) First Step

First, element M of at least one selected from the group consisting of Al, Mn, Mg, B, Zr, W, Nb, Ta, In, Mo, and Sn is carried on a first lithium-nickel composite oxide represented by the general formula $Li_xNi_{1-y-z}Co_yMe_zO_2 (x \leq 1.02)$. The average particle size of the first lithium-nickel composite oxide is not particularly limited, but preferably, for example, 1 to 30 μm.

The method for allowing the first lithium-nickel composite oxide to carry element M is not particularly limited. For example, a raw material for element M is dissolved or dispersed in a liquid component, to prepare a solution or a dispersion. For the raw material of element M, sulfates, nitrates, carbonates, chlorides, hydroxides, oxides, and alkoxides including element M are used. The obtained solution or dispersion is mixed with the first lithium-nickel composite oxide, and afterwards, the liquid component is removed.

The liquid component for dissolving or dispersing the raw material of element M is preferably an organic solvent, though not particularly limited. For example, ketones such as acetone and methylethylketone (MEK), ethers such as tetrahydrofuran (THF), and alcohols such as ethanol are preferable. An alkaline water of pH 10 to 14 is also preferably used.

After introducing the first lithium-nickel composite oxide to the obtained solution or dispersion, the mixed solution is stirred. At that time, the temperature in the liquid is preferably set to for example 80 to 150° C., to easily advance the reaction. Although the stirring time is not particularly limited, for example, 3 hours is sufficient. The method for removing the liquid component is not particularly limited, but the drying is carried out for example at a temperature of about 100° C. for 2 hours.

(ii) Second Step

Next, the first lithium-nickel composite oxide carrying element M is allowed to stand under an environment with a temperature of 60° C. or less and a humidity of 20% or more, preferably for 2 to 48 hours. For example, the first lithium-nickel composite oxide carrying element M is allowed to stand under an environment with a temperature of about 25° C. and a humidity of about 55% for about 24 hours. During this time, NiOOH is produced by moisture in the atmosphere at the surface of the first lithium-nickel composite oxide. At that time, moisture is chemisorped to the side reaction active points at the first lithium-nickel composite oxide surface on a priority basis. Therefore, the side reaction active points can be converted to NiOOH on a priority basis.

There is a possibility that portions other than the side reaction active points are also converted to NiOOH when the humidity is excessively high, or the temperature is high, i.e., exceeding 60° C., in the environment where the first lithium-nickel composite oxide carrying element M is allowed to stand. Allowing to stand for an excessively long period of time also causes the same result. In this case, sufficient charge and discharge capacity may not be secured. Preferable temperature for the environment for allowing the first lithium-nickel composite oxide carrying element M to stand is 10 to 55° C., and preferable humidity is 25 to 60%.

(iii) Third Step

The first lithium-nickel composite oxide with NiOOH produced on the surface thereof is preliminary baked in dry air, and then baked in an oxygen atmosphere. By such baking, NiOOH is converted to $Ni_{1-\delta}O$ ($0 \leq \delta$). The baking conditions are not particularly limited, as long as NiOOH is reduced to $Ni_{1-\delta}O$ ($0 \leq \delta$) under such conditions. The produced $Ni_{1-\delta}O$ ($0 \leq \delta$) forms the surface layer portion of the active material particles along with element M. Element M is usually converted to oxide by baking. $Ni_{1-\delta}O$ ($0 \leq \delta$) is made by partially converting nickel of the first lithium-nickel composite oxide. Therefore, $Ni_{1-\delta}O$ ($0 \leq \delta$) is distributed to the inner side of the surface layer portion, and oxide of element M is distributed to the outer side.

When element M is not present at the first lithium-nickel composite oxide surface, upon converting NiOOH to $Ni_{1-\delta}O$ ($0 \leq \delta$), portions other than the side reaction active points are also deactivated. Therefore, the active material particles with sufficient capacity cannot be obtained. That is, element M works to stabilize the first lithium-nickel composite oxide, and to curb a modification thereof. Upon converting NiOOH to $Ni_{1-\delta}O$ ($0 \leq \delta$), water is thought to be released. Element M is thought to curb deterioration of the first lithium-nickel composite oxide by the released water.

An example of baking conditions is described in the following.

Baking of the first lithium-nickel composite oxide with NiOOH produced on the surface thereof is preferably carried out by the following three steps, in view of reliably converting the side reaction active points to $Ni_{1-\delta}O$ ($0 \leq \delta$).

First, the first lithium-nickel composite oxide with NiOOH produced on the surface thereof is baked at 300 to 450° C. for about 2 to 24 hours (preferably for 6 hours) in a dry air atmosphere. At this time, the humidity of the dry air atmosphere is preferably 2 to 19%, and the pressure is preferably 101 to 50 KPa.

Then, the baking is carried out at 650 to 750° C. for 2 to 24 hours (preferably for 6 hours) under an oxygen atmosphere.

At this time, the pressure of the oxygen atmosphere is preferably 101 to 50 KPa. Afterwards, annealing is further carried out at a temperature of 300 to 500° C., preferably at about 400° C. under an oxygen atmosphere. At this time, the pressure in the oxygen atmosphere is preferably 101 to 50 KPa. The oxygen atmosphere may include components other than oxygen, for example, moisture. However, the oxygen partial pressure is preferably 20% or more (when the pressure in the oxygen atmosphere is set as P and the oxygen partial pressure is set as Po, $0.2 \leq Po/P \leq 1$).

(iv) Fourth Step

A positive electrode is formed by using the active material particles. The method for making the positive electrode is not particularly limited. Generally, the positive electrode is made by allowing a strip-like positive electrode core material (positive electrode current collector) to carry a positive electrode material mixture including active material particles and a binder. To the positive electrode material mixture, an additive such as a conductive material may also be included as an arbitrary component. A paste is prepared by dispersing the positive electrode material mixture in a liquid component, and the paste is applied on the core material and dried, to allow the core material to carry the positive electrode material mixture.

Described next is a case where a second lithium-nickel composite oxide including a domain having the NaCl-type crystal structure is produced on the surface layer portion of the active material particles.

(i) First Step

A first lithium-nickel composite oxide is allowed to carry element M by carrying out operations in the same manner as the case where the side reaction active points are converted to $Ni_{1-\delta}O$ ($0 \leq \delta$), except that the first lithium-nickel composite oxide represented by the general formula $Li_x Ni_{1-y-z}Co_y Me_x O_2$ ($1.03 \leq x$) is used.

(ii) Second Step

Operations are carried out in the same manner as the case where the side reaction active points are converted to $Ni_{1-\delta}O$ ($0 \leq \delta$), to convert the side reaction active points of the first lithium-nickel composite oxide to NiOOH.

(iii) Third Step

The first lithium-nickel composite oxide with NiOOH produced on the surface thereof is baked. By this baking, NiOOH reacts with surplus Li in the first lithium-nickel composite oxide. At that time, a second lithium-nickel composite oxide including a domain having the NaCl-type crystal structure is produced.

The baking conditions are not particularly limited, as long as NiOOH and surplus Li are reacted under such conditions. The produced second lithium-nickel composite oxide forms the surface layer portion of the active material particles along with element M. Element M is usually converted to oxide by baking. The second lithium-nickel composite oxide is made by partially converting the first lithium-nickel composite oxide. Therefore, the second lithium-nickel composite oxide is distributed to the inner side of the surface layer portion, and oxide of element M is distributed to the outer side.

Similarly to the case where the side reaction active points are converted to $Ni_{1-\delta}O$ ($0 \leq \delta$), when element M is not present at the first lithium-nickel composite oxide surface, upon converting NiOOH to the second lithium-nickel composite oxide, portions other than the side reaction active points are also modified to the second lithium-nickel composite oxide. Therefore, the active material particles with sufficient capacity cannot be obtained.

An example of baking conditions is described in the following.

The first lithium-nickel composite oxide with NiOOH produced on the surface thereof is baked for 2 to 24 hours (preferably for 6 hours) at 400 to 750° C. under an oxygen atmosphere. At this time, the pressure of the oxygen atmosphere is preferably 101 to 50 KPa. The oxygen atmosphere may include components other than oxygen, for example, moisture. However, the oxygen partial pressure is preferably set to 20% or more (when the pressure of the oxygen atmosphere is set to P, and the oxygen partial pressure is set to Po, $0.2 \leq Po/P \leq 1$).

(iv) Fourth Step

A positive electrode is made by carrying out operations in the same manner as the case where the side reaction active points are converted to $Ni_{1-\delta}O$ ($0 \leq \delta$).

Elements such as Mg, Ti, Nb, and Ca are generally known to improve battery performance, reliability, and safety. Therefore, elements such as Mg, Ti, Nb, and Ca are preferably incorporated into the first lithium-nickel composite oxide to form a solid solution.

For the binder to be included in the positive electrode material mixture, a thermoplastic resin is preferable, although any of the thermoplastic resin and a thermosetting resin may be used. For the thermoplastic resin that can be used as the binder, for example, polyethylene, polypropylene, polytetrafluoroethylene (PTFE), polyvinylidene fluoride (PVDF), styrenebutadiene rubber, tetrafluoroethylene-hexafluoropropylene copolymer (FEP), tetrafluoroethylene-perfluoroalkylvinylether copolymer (PFA), vinylidene fluoride-hexafluoropropylene copolymer, vinylidene fluoride-chlorotrifluoroethylene copolymer, ethylene-tetrafluoroethylene copolymer (ETFE), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer, vinylidene fluoride-perfluoromethylvinylether-tetrafluoroethylene copolymer, ethylene-acrylic acid copolymer, ethylene-methacrylic acid copolymer, ethylene-methyl acrylate copolymer, and ethylene-methyl methacrylate copolymer may be mentioned. These may be used singly, or may be used in combination of two or more. These may be crosslinked by ions of, for example, Na.

Any conductive material may be included in the positive electrode material mixture, as long as the material is an electron conductive material that is chemically stable in the battery. For example, graphites such as natural graphite (flake graphite) and artificial graphite; carbon blacks such as acetylene black, ketjen black, channel black, furnace black, lamp black, and thermal black; conductive fibers such as carbon fiber and metal fiber; metal powder such as aluminum powder; conductive whiskers such as zinc oxide and potassium titanate; conductive metal oxide such as titanium oxide; an organic conductive material such as polyphenylene derivative; and carbon fluoride may be used. These may be used singly, or may be used in combination of two or more. The amount of the conductive material to be added is not particularly limited, but preferably is 1 to 50 wt %, further preferably 1 to 30 wt %, and still further preferably 2 to 15 wt % relative to the active material particles included in the positive electrode material mixture.

The positive electrode core material (positive electrode current collector) may be any electron conductor, as long as it is chemically stable in the battery. For example, a foil or a sheet of aluminum, stainless steel, nickel, titanium, carbon, and conductive resin may be used. Particularly, aluminum foil and aluminum alloy foil are preferable. On the surface of the foil or the sheet, a layer of carbon or titanium may be added, and an oxide layer may be formed. Also, on the surface of the foil or sheet, unevenness may be added. For example, net, punched sheet, lath, porous material, formed material, fibrous molded material may be used. The thickness of the positive electrode core material is not particularly limited, but for example within a range of 1 to 500 μm.

In the following, elements other than the positive electrode are described. However, a lithium ion secondary battery of the present invention is characterized in that the positive electrode such as the above is included. Thus, elements other than the positive electrode are not particularly limited. The following is not to limit the present invention.

For the negative electrode capable of charging and discharging, for example, may be used is a negative electrode material mixture including a negative electrode active material and a binder, and including a conductive material and a thickener as arbitrary components being carried on a negative electrode core material. Such a negative electrode may be made by a method similar to that for the positive electrode.

The negative electrode active material may be a material capable of charging and discharging lithium electrochemically. For example, graphites, non-graphitizable carbon material, and lithium alloy may be used. The lithium alloy is preferably an alloy including particularly at least one selected from the group consisting of silicon, tin, aluminum, zinc, and magnesium. The average particle size of the negative electrode active material is not particularly limited, but preferably 1 to 30 μm.

The binder to be included in the negative electrode material mixture is not particularly limited, but for example, may be selected arbitrary from the materials shown as examples of the binder to be included in the positive electrode material mixture.

The conductive material to be included in the negative electrode material mixture may be any electron conductive material, as long as it is chemically stable in the battery. For example, graphites such as natural graphite (such as flake graphite) and artificial graphite; carbon blacks such as acetylene black, ketjen black, channel black, furnace black, lamp black, and thermal black; conductive fibers such as carbon fiber and metal fiber; metal powders such as copper and nickel; and organic conductive material such as polyphenylene derivative may be used. These may be used singly, or may be used in combination of two or more. The amount of the conductive material to be added is not particularly limited, but preferably 1 to 30 wt %, and further preferably 1 to 10 wt % relative to the active material particles included in the negative electrode material mixture.

The negative electrode core material (negative electrode current collector) may be any electron conductor, as long as it is chemically stable in the battery. For example, a foil or sheet of stainless steel, nickel, copper, titanium, carbon, or conductive resin may be used. Copper foil or copper alloy foil is particularly preferable. On the surface of the foil or sheet, a layer of carbon, titanium, or nickel may be added, and an oxide layer may be formed. Also, on the surface of the foil or sheet, unevenness may be added. For example, net, punched sheet, lath, porous material, formed material, and fibrous molded material may be used. The thickness of the negative electrode core material is not particularly limited, but for example within a range of 1 to 500 μm.

For the non-aqueous electrolyte, a non-aqueous solvent dissolving a lithium salt therein is preferably used.

May be used for the non-aqueous solvent are, for example, cyclic carbonates such as ethylene carbonate (EC), propylene carbonate (PC), butylene carbonate (BC), and vinylene carbonate (VC); chain carbonates such as dimethyl carbonate (DMC), diethyl carbonate (DEC), ethylmethyl carbonate (EMC), and dipropyl carbonate (DPC); aliphatic carboxylic acid esters such as methyl formate, methyl acetate, methyl propionate, and ethyl propionate; lactones such as γ-butyrolactone and γ-valerolactone; chain ethers such as 1,2-dimethoxyethane (DME), 1,2-diethoxyethane (DEE), and ethoxymethoxyethane (EME); cyclic ethers such as tetrahydrofuran and 2-methyltetrahydrofuran; dimethylsulfoxide, 1,3-dioxolane, formamide, acetamide, dimethylformamide, dioxolane, acetonitrile, propylnitrile, nitromethane, ethylmonoglyme, phosphoric acid triester, trimethoxymethane, dioxolane derivative, sulfolane, methylsulfolane, 1,3-dimethyl-2-imidazolidinone, 3-methyl-2-oxazolidinone, propylene carbonate derivative, tetrahydrofuran derivative, ethylether, 1,3-propanesultone, anisole, dimethylsulfoxide, and N-methyl-2-pyrrolidone. These may be used singly, but preferably used in combination of two or more. Particularly, a solvent mixture of cyclic carbonate and chain carbonate; or a solvent mixture of cyclic carbonate, chain carbonate, and aliphatic carboxylic acid ester is preferable.

The lithium salt to be dissolved in the non-aqueous solvent includes, for example, $LiClO_4$, $LiBF_4$, $LiPF_6$, $LiAlCl_4$, $LiSbF_6$, $LiSCN$, $LiCl$, $LiCF_3SO_3$, $LiCF_3CO_2$, $Li(CF_3SO_2)_2$, $LiAsF_6$, $LiN(CF_3SO_2)_2$, $LiB_{10}Cl_{10}$, lithium lower aliphatic carboxylate, $LiCl$, $LiBr$, $LiI$, $LiBCl_4$, lithium tetraphenylborate, and lithium imide salt. These may be used singly, or may be used in combination of two or more. However, at least $LiPF_6$ is used preferably.

The amount of lithium salt to be dissolved relative to the non-aqueous solvent is not particularly limited, but the lithium salt concentration is preferably 0.2 to 2 mol/L, and further preferably 0.5 to 1.5 mol/L.

Various additives may be added to the non-aqueous electrolyte for improving battery's charge and discharge performance. The additives include, for example, triethylphosphite, triethanol amine, cyclic ether, ethylenediamine, n-glyme, pyridine, hexaphosphoric triamide, nitrobenzene derivative, crown ether, quaternary ammonium salt, and ethylene glycol dialkylether.

A separator has to be interposed between the positive electrode and the negative electrode.

For the separator, a microporous thin film having a high ion permeability, a predetermined mechanical strength, and insulating ability is preferably used. The microporous thin film preferably has a function of closing the pores at a certain temperature or more, to increase the battery resistance. The material used for the microporous thin film preferably includes polyolefin (polypropylene and polyethylene) that is excellent in resistance to organic solvents and is hydrophobic. A sheet made of glass fiber, nonwoven fabric, and woven fabric are also used as the separator. The pore size of the separator is, for example, 0.01 to 1 μm. The thickness of the separator is generally 10 to 300 μm. The porosity of the separator is generally 30 to 80%.

A polymer electrolyte including a non-aqueous electrolyte and a polymer material retaining the electrolyte may be used instead of the separator. The polymer electrolyte may be integrated with the positive electrode or the negative electrode. The polymer material retaining the non-aqueous electrolyte is not particularly limited, but preferably, for example, a copolymer of vinylidene fluoride and hexafluoropropylene is preferable.

The present invention is described in detail based on Examples in the following, but the present invention is not limited to Examples below.

EXAMPLE 1

Example Battery A1

(i) Synthesis of First Lithium-nickel Composite Oxide

Nickel sulfate, cobalt sulfate, and aluminum sulfate were mixed so that a molar ratio of Ni atoms, Co atoms, and Al atoms was 80:15:5. The obtained mixture in an amount of 3.2 kg was dissolved in 10 L of water, to obtain a raw material solution. To the raw material solution, 400 g of sodium hydroxide was added to form a precipitate. The precipitate was sufficiently washed with water and dried, to obtain a coprecipitated hydroxide.

To 3 kg of the obtained coprecipitated hydroxide of Ni—Co—Al, 784 g of lithium hydroxide was mixed in, and the mixture was baked for 10 hours at a temperature of 750° C. under an atmosphere with an oxygen partial pressure of 0.5 atm, to obtain a first lithium-nickel composite oxide ($LiNi_{0.8}Co_{0.15}Al_{0.05}O_2$) including Al as element Me.

Various first lithium-nickel composite oxides were also synthesized by using various raw materials, instead of the above coprecipitated hydroxide of Ni—Co—Al. Evaluations were carried out for these as well, but the explanations are omitted in Examples below, since the obtained results were similar to the case of $LiNi_{0.8}Co_{0.15}Al_{0.05}O_2$.

(ii) Synthesis of Active Material Particles

<a> First Step

Tantalum pentaethoxide was dissolved in 10 L of ethanol. To the obtained solution, 2 kg of the synthesized first lithium-nickel composite oxide was dispersed. The amount of tantalum pentaethoxide dissolved in ethanol was set to 0.5 mol % relative to the first lithium-nickel composite oxide. The mixed solution of the first lithium-nickel composite oxide and the ethanol solution was stirred for 3 hours at 60° C. Afterwards, the mixed solution was filtrated and the residue thereof was dried for 2 hours at 100° C. As a result, a first lithium-nickel composite oxide carrying tantalum (Ta) as element M on the surface thereof was obtained.

<b> Second Step

The first lithium-nickel composite oxide (powder after drying) carrying tantalum on the surface thereof was allowed to stand under an environment with a temperature of 25° C. and a humidity of 55% for 24 hours. During this time, moisture in the atmosphere acted on the side reaction active points of the first lithium-nickel composite oxide surface to form NiOOH on the first lithium-nickel composite oxide surface. The formation of NiOOH was checked by XRD measurement and ESCA measurement.

<c> Third Step

The first lithium-nickel composite oxide with NiOOH formed on the surface thereof was baked preliminary for 6 hours at 300° C. under a dry air atmosphere (humidity 19%, pressure 101 KPa). Afterwards, a main baking was carried out for 6 hours at 650° C. under an atmosphere of 100% oxygen (pressure 101 KPa), and lastly, an annealing was carried out for 4 hours at 400° C. under an atmosphere of 100% oxygen (pressure 101 KPa). By this baking, NiOOH on the first lithium-nickel composite oxide surface is converted to $Ni_{1-\delta}O$ ($0 \leq \delta$) having the NaCl-type crystal structure. Thus, active material particles having a surface layer portion including Ta and $Ni_{1-\delta}O$ ($0 \leq \delta$) was obtained. The presence of $Ni_{1-\delta}O$ ($0 \leq \delta$) having the NaCl-type crystal structure was confirmed by XRD measurement or XENES measurement. In Examples below as well, presence of $Ni_{1-\delta}O$ ($0 \leq \delta$) in the active material particles was confirmed by XRD measurement or XENES measurement.

(iii) Positive Electrode Preparation

The obtained active material particles in an amount of 1 kg was stirred with a double-armed kneader along with 0.5 kg of PVDF#1320 (an N-methyl-2-pyrrolidone (NMP) solution including 12 wt % of PVDF) manufactured by Kureha Corporation, 40 g of acetylene black, and an appropriate amount of NMP, to prepare a positive electrode material mixture paste. This paste was applied on both sides of aluminum foil with a thickness of 20 μm, dried, and rolled to give a total thickness of 160 μm. Afterwards, the obtained electrode plate was cut to give a width that can be inserted to a battery case of cylindrical type 18650, to obtain a positive electrode.

(iv) Negative Electrode Preparation

A negative electrode material mixture paste was prepared by stirring 3 kg of artificial graphite, 200 g of BM-400B (dispersion including 40 wt % of modified styrene-butadiene rubber) manufactured by Zeon Corporation, 50 g of carboxymethylcellulose (CMC), and an appropriate amount of water with a double-armed kneader. This paste was applied on both sides of copper foil with a thickness of 12 μm, dried, and rolled to give a total thickness of 160 μm. Afterwards, the obtained electrode plate was cut to give a width that can be inserted to the above battery case, to obtain a negative electrode.

(v) Battery Assembly

Figure 2:
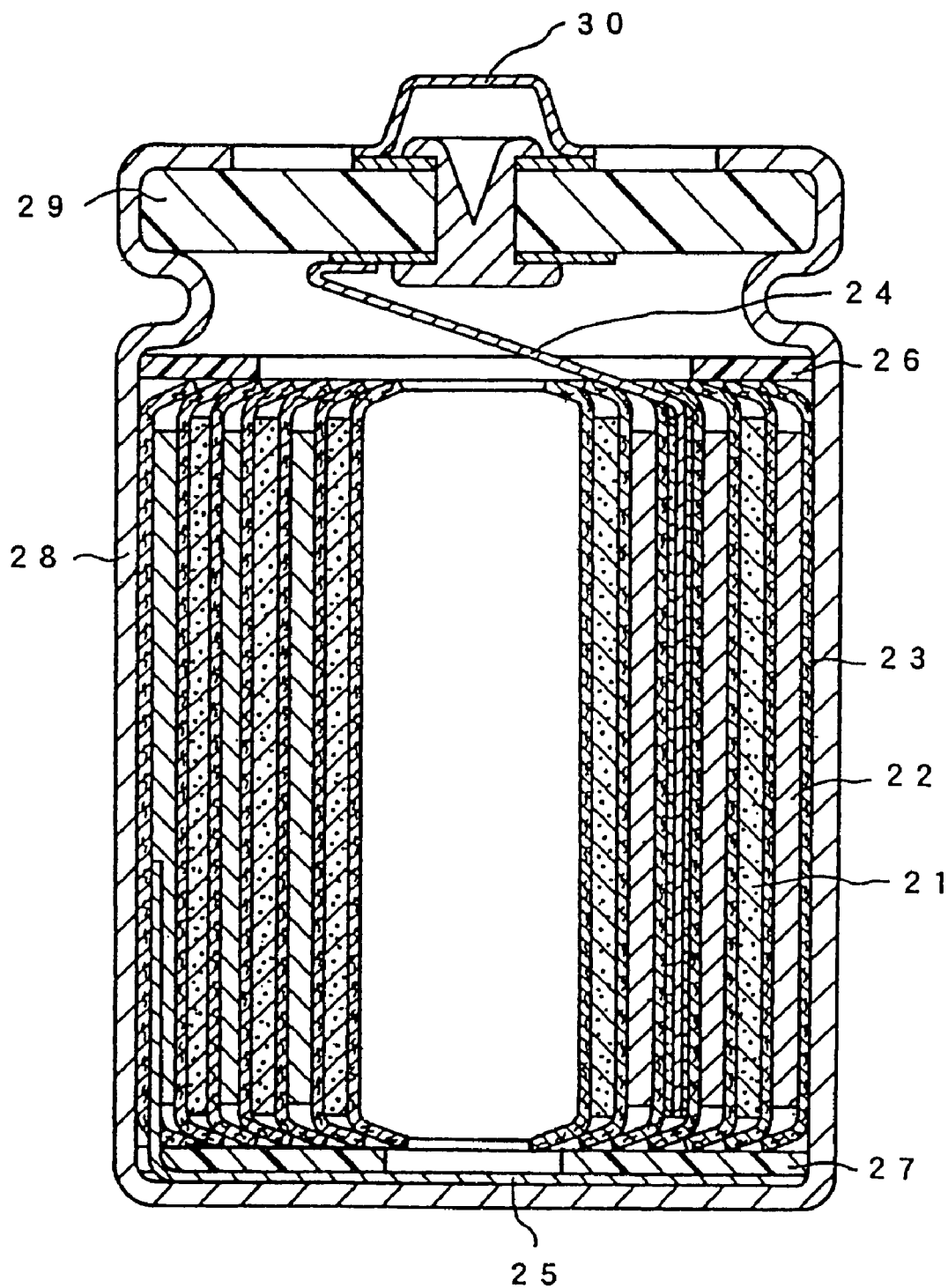
[FIG. 2] A vertical cross section of a cylindrical lithium ion secondary battery of Example of the present invention.

Description is given by referring to FIG. 2. First, a positive electrode 21 and a negative electrode 22 were wound with a separator 23 interposed therebetween, to form an electrode assembly. For the separator 23, a composite film (2300 manufactured by Celgard KK, thickness of 25 μm) comprising polyethylene and polypropylene was used.

To the positive electrode 21 and the negative electrode 22, a positive electrode lead 24 and a negative electrode lead 25 of nickel were attached, respectively. An upper insulating plate 26 and a lower insulating plate 27 were placed on the top face and the bottom face of the electrode assembly, respectively, and inserted into a battery case 28, and further, 5 g of a non-aqueous electrolyte was injected into the battery case 28.

For the non-aqueous electrolyte, to a solvent mixture of ethylene carbonate and methylethyl carbonate with a volume ratio of 10:30, $LiPF_6$ was dissolved with a concentration of 1.5 mol/L and used.

Afterwards, a positive electrode terminal 30 of a sealing plate 29 for sealing the opening of the battery case 28, and the positive electrode lead 24 were brought into conduction, and the opening was sealed. A cylindrical type 18650 lithium secondary battery was thus completed. This battery was named as Example Battery A1.

Example Battery A2

Battery A2 was made in the same manner as Battery A1 except that the amount of tantalum pentaethoxide dissolved in 10 L of ethanol was changed to 2.0 mol % relative to the first lithium-nickel composite oxide.

Example Battery A3

Battery A3 was made in the same manner as Battery A1, except that in the first step of synthesizing active material particles, a solution dissolving aluminum (Al: element M) triisopropoxide in 10 L of isopropanol was used instead of the ethanol solution of tantalum pentaethoxide. The amount of aluminum triisopropoxide dissolved was set to 0.5 mol % relative to the first lithium-nickel composite oxide.

Example Battery A4

Battery A4 was made in the same manner as Battery A3, except that the amount of aluminum triisopropoxide dissolved in 10 L of isopropanol was changed to 2.0 mol % relative to the first lithium-nickel composite oxide.

Example Battery A5

Battery A5 was made in the same manner as Battery A1, except that in the first step of synthesizing active material particles, a solution dissolving zirconium (Zr: element M) tetra-n-butoxide in 10 L of butanol was used instead of the ethanol solution of tantalum pentaethoxide. The amount of zirconium tetra-n-butoxide dissolved was set to 0.5 mol % relative to the first lithium-nickel composite oxide.

Example Battery A6

Battery A6 was made in the same manner as Battery A5, except that the amount of zirconium tetra-n-butoxide dissolved in 10 L of butanol was changed to 2.0 mol % relative to the first lithium-nickel composite oxide.

Example Battery A7

Battery A7 was made in the same manner as Battery A1, except that in the first step of synthesizing active material particles, a solution dissolving magnesium acetate (Mg: element M) in 10 L of ethanol was used instead of the ethanol solution of tantalum pentaethoxide. The amount of magnesium acetate was set to 0.5 mol % relative to the first lithium-nickel composite oxide.

Example Battery A8

Battery A8 was made in the same manner as Battery A7, except that amount of magnesium acetate dissolved in 10 L of ethanol was changed to 2.0 mol % relative to the first lithium-nickel composite oxide.

Example Battery A9

Battery A9 was made in the same manner as Battery A1, except that in the first step of synthesizing active material particles, a solution dissolving indium nitrate (In: element M) in 10 L of ethanol was used instead of the ethanol solution of tantalum pentaethoxide. The amount of indium nitrate dissolved was set to 0.5 mol % relative to the first lithium-nickel composite oxide.

Example Battery A10

Battery A10 was made in the same manner as Battery A9, except that the amount of indium nitrate dissolved in 10 L of ethanol was changed to 2.0 mol % relative to the first lithium-nickel composite oxide.

Example Battery A11

In the first step of synthesizing active material particles, 2 kg of the first lithium-nickel composite oxide was dispersed in 10 L of an aqueous solution of sodium hydroxide with pH13 instead of the ethanol solution of tantalum pentaethoxide. Tin sulfate (Sn: element M) in an amount of 0.5 mol % relative to the first lithium-nickel composite oxide was dissolved in 100 g of distilled water. To a mixed solution of the first lithium-nickel composite oxide and the aqueous solution of sodium hydroxide, an aqueous solution of tin sulfate was dropped for 10 minutes. Afterwards, Battery A11 was made in the same manner as Battery A1, except that the stirring was carried out for 3 hours at 100° C.

Example Battery A12

Battery A12 was made in the same manner as Battery A11, except that the amount of tin sulfate dissolved in 100 g of distilled water was changed to 2.0 mol % relative to the first lithium-nickel composite oxide.

Example Battery A13

Battery A13 was made in the same manner as Battery A11, except that tin sulfate was changed to manganese sulfate (Mn: element M).

Example Battery A14

Battery A14 was made in the same manner as Battery A12, except that tin sulfate was changed to manganese sulfate.

Example Battery A15

Battery A15 was made in the same manner as Battery A11, except that tin sulfate was changed to boric acid (B: element M).

Example Battery A16

Battery A16 was made in the same manner as Battery A12, except that tin sulfate was changed to boric acid.

Example Battery A17

Battery A17 was made in the same manner as Battery A11, except that tin sulfate was changed to sodium tungstate (W: element M).

Example Battery A18

Battery A18 was made in the same manner as Battery A12, except that tin sulfate was changed to sodium tungstate.

Example Battery A19

Battery A19 was made in the same manner as Battery A11, except that tin sulfate was changed to niobium pentachloride (Nb: element M).

Example Battery A20

Battery A20 was made in the same manner as Battery A12, except that tin sulfate was changed to niobium pentachloride.

Example Battery A21

Battery A21 was made in the same manner as Battery A11, except that tin sulfate was changed to ammonium heptamolybdate (Mo: element M).

Example Battery A22

Battery A22 was made in the same manner as Battery A12, except that tin sulfate was changed to ammonium heptamolybdate.

Example Batteries A23 to A33

Batteries A23 to A33 were made in the same manner as Batteries 1A, 3A, 5A, 7A, 9A, 11A, 13A, 15A, 17A, 19A, and 21A, except that the respective amount of tantalum pentaethoxide, aluminum triisopropoxide, zirconium tetra-n-butoxide, magnesium acetate, indium nitrate, tin sulfate, manganese sulfate, boric acid, sodium tungstate, niobium pentachloride, and ammonium heptamolybdate was set to 2.5 mol % relative to the first lithium-nickel composite oxide.

Example Batteries A34 to A44

Batteries A34 to A44 were made in the same manner as Batteries 1A, 3A, 5A, 7A, 9A, 11A, 13A, 15A, 17A, 19A, and 21A, except that in the second step of synthesizing the active material particles, the environment for allowing the first lithium-nickel composite oxide carrying element M (powder after drying) to stand was changed to an environment with a temperature of 60° C. and a humidity of 55%.

Comparative Example Batteries a1 to a11

Batteries a1 to a11 were made in the same manner as Batteries 1A, 3A, 5A, 7A, 9A, 11A, 13A, 15A, 17A, 19A, and 21A, respectively, except that in the second step of synthesizing the active material particles, the environment for allowing the first lithium-nickel composite oxide carrying element M (powder after drying) to stand was changed to an environment with a temperature of 25° C. and a humidity of 20%.

No $Ni_{1-\delta}O$ ($0 \leqq \delta$) production was confirmed in XRD measurement on active material particles in each battery.

Comparative Example Batteries a12 to a22

Batteries a12 to a22 were made in the same manner as Batteries 1A, 3A, 5A, 7A, 9A, 11A, 13A, 15A, 17A, 19A, and 21A, except that in the third step of synthesizing the active material particles, the atmosphere of preliminarily baking the first lithium-nickel composite oxide with NiOOH formed on the surface thereof was changed from the dry air atmosphere to an atmosphere of 100% oxygen (pressure 101 KPa).

No $Ni_{1-\delta}O$ production was confirmed in XRD measurement on the active material particles of each battery. Preliminarily baking in highly oxidizing atmosphere probably causes $Ni_{1-\delta}O$ ($0 \leqq \delta$), i.e., a reduction product, not to be produced.

Comparative Example Batteries a23 to a33

Batteries a23 to a33 were made in the same manner as Batteries 1A, 3A, 5A, 7A, 9A, 11A, 13A, 15A, 17A, 19A, and 21A, except that in the third step of synthesizing the active material particles, the atmospheres of the main baking and of the following annealing of the first lithium-nickel composite oxide with NiOOH formed on the surface thereof were changed from the atmosphere of 100% oxygen to a dry air atmosphere (humidity 19%, pressure 101 KPa).

No $Ni_{1-\delta}O$ ($0 \leqq \delta$) production was confirmed in XRD measurement on the active material particles of each battery. The main baking in a dry air atmosphere probably causes no $Ni_{1-\delta}O$ ($0 \leqq \delta$) production, but causes the active material itself to be changed into a different phase.

Comparative Example Battery a34

Battery a34 was made in the same manner as Battery A1, except that in the synthesizing of the active material particles, the first step was not carried out, and the first lithium-nickel composite oxide was allowed to stand as is in the second step for 24 hours, under an environment with a temperature of 25° C. and a humidity of 55%.

NiO production was confirmed in an analysis on the active material particles.

Comparative Example Battery a35

Battery a35 was made in the same manner as Battery A1, except that the first lithium-nickel composite oxide to which 0.5 mol % of NiO powder was added was used as the positive electrode active material.

Comparative Example Battery a36

A first lithium-nickel composite oxide was heat-treated under an atmosphere of a mixed gas of a 95:5 molar ratio nitrogen and hydrogen at 400° C. for 6 hours, to form a reduced layer including Ni and Co having a low valence on the surface of the first lithium-nickel composite oxide. Battery a36 was made in the same manner as Battery A1, except that a first lithium-nickel composite oxide with the thus obtained reduced layer was used as the positive electrode active material.

Comparative Example Battery a37

Battery a37 was made in the same manner as Battery A1, except that a first lithium-nickel composite oxide not containing element M and $Ni_{1-\delta}O$ ($0 \leqq \delta$) was used as is as the positive electrode active material.

[Evaluation 1]

Example Batteries A1 to A44 and Comparative Example Batteries a1 to a37 were evaluated with the method below. The results are shown in Tables 1A and 1B.

TABLE 1A

First Lithium-Nickel Composite Oxide: $LiNi_{0.80}Co_{0.15}Al_{0.05}O_2$

| Battery No | Element M | Amount Added (mol %) | Environment to be Allowed to Stand Temperature · Humidity (° C. · %) | Preliminary Baking Atmosphere | Main Baking-Annealing Atmosphere | Discharge Performance Discharge 400 mA at 0° C. (mAh) | 4000 mA at 0° C. (mAh) | Internal Short Circuit Safety 60° C.-Crush Speed 5 mm/Sec Highest Temperature Reached (° C.) |
|---|---|---|---|---|---|---|---|---|
| Ex. A1 | Ta | 0.5 | 25 · 55 | Dry Air | Oxygen | 1980 | 1900 | 70 |
| Ex. A2 |  | 2.0 |  |  |  | 1985 | 1900 | 75 |
| Ex. A3 | Al | 0.5 |  |  |  | 1985 | 1905 | 70 |
| Ex. A4 |  | 2.0 |  |  |  | 1990 | 1905 | 71 |
| Ex. A5 | Zr | 0.5 |  |  |  | 1990 | 1910 | 65 |
| Ex. A6 |  | 2.0 |  |  |  | 1990 | 1910 | 65 |
| Ex. A7 | Mg | 0.5 |  |  |  | 1995 | 1915 | 70 |
| Ex. A8 |  | 2.0 |  |  |  | 1992 | 1920 | 72 |
| Ex. A9 | In | 0.5 |  |  |  | 1990 | 1925 | 71 |
| Ex. A10 |  | 2.0 |  |  |  | 1995 | 1920 | 65 |
| Ex. A11 | Sn | 0.5 |  |  |  | 1990 | 1910 | 72 |
| Ex. A12 |  | 2.0 |  |  |  | 1989 | 1905 | 71 |
| Ex. A13 | Mn | 0.5 |  |  |  | 1990 | 1900 | 65 |
| Ex. A14 |  | 2.0 |  |  |  | 1991 | 1900 | 70 |
| Ex. A15 | B | 0.5 |  |  |  | 1991 | 1900 | 72 |
| Ex. A16 |  | 2.0 |  |  |  | 1990 | 1905 | 75 |
| Ex. A17 | W | 0.5 |  |  |  | 1990 | 1902 | 74 |
| Ex. A18 |  | 2.0 |  |  |  | 1992 | 1910 | 72 |
| Ex. A19 | Nb | 0.5 |  |  |  | 1980 | 1905 | 70 |
| Ex. A20 |  | 2.0 |  |  |  | 1990 | 1905 | 71 |
| Ex. A21 | Mo | 0.5 |  |  |  | 1990 | 1905 | 65 |
| Ex. A22 |  | 2.0 |  |  |  | 1990 | 1900 | 70 |
| Ex. A23 | Ta | 2.5 |  |  |  | 1990 | 1800 | 70 |
| Ex. A24 | Al |  |  |  |  | 1992 | 1810 | 70 |
| Ex. A25 | Zr |  |  |  |  | 1980 | 1800 | 70 |
| Ex. A26 | Mg |  |  |  |  | 1985 | 1805 | 75 |
| Ex. A27 | In |  |  |  |  | 1982 | 1800 | 78 |
| Ex. A28 | Sn |  |  |  |  | 1990 | 1805 | 68 |
| Ex. A29 | Mn |  |  |  |  | 1990 | 1802 | 70 |
| Ex. A30 | B |  |  |  |  | 1989 | 1800 | 71 |
| Ex. A31 | W |  |  |  |  | 1990 | 1810 | 69 |
| Ex. A32 | Nb |  |  |  |  | 1990 | 1900 | 70 |
| Ex. A33 | Mo |  |  |  |  | 1992 | 1900 | 72 |
| Ex. A34 | Ta | 0.5 | 60 · 55 |  |  | 1800 | 1701 | 70 |
| Ex. A35 | Al |  |  |  |  | 1805 | 1700 | 68 |
| Ex. A36 | Zr |  |  |  |  | 1810 | 1710 | 69 |
| Ex. A37 | Mg |  |  |  |  | 1820 | 1715 | 71 |
| Ex. A38 | In |  |  |  |  | 1800 | 1700 | 71 |
| Ex. A39 | Sn |  |  |  |  | 1805 | 1700 | 72 |
| Ex. A40 | Mn |  |  |  |  | 1807 | 1702 | 68 |
| Ex. A41 | B |  |  |  |  | 1800 | 1710 | 67 |
| Ex. A42 | W |  |  |  |  | 1800 | 1705 | 70 |
| Ex. A43 | Nb |  |  |  |  | 1800 | 1700 | 70 |
| Ex. A44 | Mo |  |  |  |  | 1805 | 1700 | 68 |

TABLE 1B

First Lithium-Nickel Composite Oxide: $LiNi_{0.80}Co_{0.15}Al_{0.05}O_2$

| Battery No | Element M | Amount Added (mol %) | Environment to be Allowed to Stand Temperature · Humidity (° C. · %) | Preliminary Baking Atmosphere | Main Baking-Annealing Atmosphere | Discharge Performance Discharge 400 mA at 0° C. (mAh) | 4000 mA at 0° C. (mAh) | Internal Short Circuit Safety 60° C.-Crush Speed 5 mm/Sec Highest Temperature Reached (° C.) |
|---|---|---|---|---|---|---|---|---|
| Comp. Ex. a1 | Ta | 0.5 | 25 · 20 | Dry Air | Oxygen | 1990 | 1920 | 120 |
| Comp. Ex. a2 | Al |  |  |  |  | 1990 | 1900 | 115 |
| Comp. Ex. a3 | Zr |  |  |  |  | 1989 | 1900 | 120 |
| Comp. Ex. a4 | Mg |  |  |  |  | 1990 | 1899 | 110 |
| Comp. Ex. a5 | In |  |  |  |  | 1987 | 1890 | 110 |

TABLE 1B-continued

First Lithium-Nickel Composite Oxide: $LiNi_{0.80}Co_{0.15}Al_{0.05}O_2$

| Battery No | Element M | Amount Added (mol %) | Environment to be Allowed to Stand Temperature · Humidity (° C. · %) | Preliminary Baking Atmosphere | Main Baking-Annealing Atmosphere | Discharge Performance Discharge 400 mA at 0° C. (mAh) | Discharge Performance Discharge 4000 mA at 0° C. (mAh) | Internal Short Circuit Safety 60° C.-Crush Speed 5 mm/Sec Highest Temperature Reached (° C.) |
|---|---|---|---|---|---|---|---|---|
| Comp. Ex. a6 | Sn | | | | | 1985 | 1900 | 120 |
| Comp. Ex. a7 | Mn | | | | | 1988 | 1905 | 115 |
| Comp. Ex. a8 | B | | | | | 1990 | 1900 | 120 |
| Comp. Ex. a9 | W | | | | | 1985 | 1900 | 125 |
| Comp. Ex. a10 | Nb | | | | | 1992 | 1902 | 110 |
| Comp. Ex. a11 | Mo | | | | | 1990 | 1900 | 122 |
| Comp. Ex. a12 | Ta | | 25 · 55 | Oxygen | | 1982 | 1910 | 117 |
| Comp. Ex. a13 | Al | | | | | 1980 | 1910 | 122 |
| Comp. Ex. a14 | Zr | | | | | 1985 | 1915 | 125 |
| Comp. Ex. a15 | Mg | | | | | 1990 | 1915 | 120 |
| Comp. Ex. a16 | In | | | | | 1995 | 1910 | 118 |
| Comp. Ex. a17 | Sn | | | | | 1995 | 1900 | 115 |
| Comp. Ex. a18 | Mn | | | | | 1990 | 1905 | 112 |
| Comp. Ex. a19 | B | | | | | 1990 | 1910 | 110 |
| Comp. Ex. a20 | W | | | | | 1992 | 1908 | 115 |
| Comp. Ex. a21 | Nb | | | | | 1990 | 1905 | 110 |
| Comp. Ex. a22 | Mo | | | | | 1989 | 1900 | 120 |
| Comp. Ex. a23 | Ta | | | Dry Air | Dry Air | 1990 | 1910 | 120 |
| Comp. Ex. a24 | Al | | | | | 1985 | 1905 | 109 |
| Comp. Ex. a25 | Zr | | | | | 1988 | 1905 | 105 |
| Comp. Ex. a26 | Mg | | | | | 1986 | 1900 | 100 |
| Comp. Ex. a27 | In | | | | | 1990 | 1915 | 102 |
| Comp. Ex. a28 | Sn | | | | | 1970 | 1900 | 100 |
| Comp. Ex. a29 | Mn | | | | | 1985 | 1905 | 106 |
| Comp. Ex. a30 | B | | | | | 1985 | 1900 | 107 |
| Comp. Ex. a31 | W | | | | | 1990 | 1910 | 100 |
| Comp. Ex. a32 | Nb | | | | | 1991 | 1904 | 100 |
| Comp. Ex. a33 | Mo | | | | | 1990 | 1905 | 105 |
| Comp. Ex. a34 | Not Added | — | 25 · 55 | | Oxygen | 1800 | 1700 | 75 |
| Comp. Ex. a35 | Not Added | 0.5 | | Not Carried Out | | 1995 | 1910 | 110 |
| Comp. Ex. a36 | Added | — | | Mixed Gas of Nitrogen:Hydrogen = 95:5 (molar ratio) treatment at 400° C. for 6 hours | | 1990 | 1910 | 115 |
| Comp. Ex. a37 | | | | Not Carried Out | | 1995 | 1915 | 140 |

(Discharge Performance)

Each battery was preliminary charged and discharged twice, and then stored under an environment of 40° C. for 2 days. Afterwards, the following two patterns of charging and discharging were carried out for each battery. The battery designed capacity was 2000 mAh.

First Pattern (1) Constant Current Charging (20° C.): 1400 mA (End Voltage 4.2 V)

(2) Constant Voltage Charging (20° C.): 4.2 V (End Current 100 mA)

(3) Constant Current Discharging (0° C.): 400 mA (End Voltage 3 V)

Second Pattern (1) Constant Current Charging (20° C.): 1400 mA (end voltage 4.2 V)

(2) Constant Voltage Charging (20° C.): 4.2 V (end current 100 mA)

(3) Constant Current Discharging (0° C.): 4000 mA (end voltage 3 V)

The discharge capacities obtained in the first and the second pattern are shown in Tables 1A and 1B.

(Safety)

A battery crush test was carried out under an environment of 60° C. for evaluating safety upon internal short-circuit occurrence. First, the following charging was carried out for those batteries after the discharge performance evaluation under an environment of 20° C. The battery designed capacity was 2000 mAh.

(1) Constant Current Charging: 1400 mA (end voltage 4.25 V)

(2) Constant Voltage Charging: 4.25 V (end current 100 mA)

An iron rod with a 10 mm diameter was thrust at a speed of 5 mm/sec from a side face of the charged battery under an environment of 60° C. to break the battery. The temperatures reached at the broken portion of the battery after 90 seconds are shown in Tables 1A and 1B.

The evaluation results are shown below.

In Example Batteries A1 to A22, in which the active material particle surface layer portion includes element M and $Ni_{1-\delta}O$ ($0 \leq \delta \leq 0.1$), and the amount of element M is 0.5 mol % or 2 mol % relative to the first lithium-nickel composite oxide, the degree of the heat generation was quite small in the crush test. The discharge capacity of these batteries at 0° C. in 2 CmA (4000 mAh) discharging was the same level as that of Comparative Example Battery a37 using the first lithium-nickel composite oxide as is.

In Example Batteries A23 to A33, in which the amount of element M relative to the lithium composite oxide is 2.5 mol %, the discharge capacity in 2 CmA (4000 mAh) discharging at 0° C. declined. The compound of element M included in the surface layer portion of the first lithium-nickel composite oxide was electrochemically inactive and thus probably became resistance.

Example Batteries A34 to A44, in which a condition for allowing the first lithium-nickel composite oxide carrying element M before baking to stand was changed to give high temperature, the discharge capacity tended to be low. This is probably because the portions other than the side reaction active points of the first lithium-nickel composite oxide were changed to $Ni_{1-\delta}O$.

In Comparative Example Battery a34, in which the first lithium-nickel composite oxide was baked after being allowed to stand under an environment of a temperature of 25° C. and a humidity of 55% for 24 hours and used without carrying element M, the discharge capacity was not sufficient. This is probably because the absence of element M at the surface caused the first lithium-nickel composite oxide to deteriorate.

In Comparative Example Batteries a1 to a11, in which a condition for the first lithium-nickel composite oxide carrying element M before baking to stand was changed to give low humidity, and Comparative Example Batteries a12 to a33, in which the baking atmosphere was changed, a great amount of heat was generated in the crush test. This is probably because $Ni_{1-\delta}O$ ($0 \leqq \delta$), which inactivates the side reaction active points of the first lithium-nickel composite oxide was not produced.

In Comparative Example Battery a35 as well, in which the first lithium-nickel composite oxide with NiO added was used for the positive electrode active material, since the side reaction active points did not disappear, a great amount of heat generated in the crush test.

In Comparative Example Battery a36, in which the lithium composite oxide surface with the reduced layer formed on the surface thereof was used as the positive electrode active material, the discharge capacity with 2 CmA (4000 mAh) at 0° C. was insufficient. This is probably because the first lithium-nickel composite oxide surface was covered with Ni or Co having a low oxidation number and low electrochemical activity.

EXAMPLE 2

A first lithium-nickel composite oxide having a composition of $LiNi_{0.9}Co_{0.07}Al_{0.03}O_2$ was obtained by using nickel sulfate, cobalt sulfate, and aluminum sulfate so that a molar ratio of Ni atoms, Co atoms, and Al atoms was 90:7:3 upon synthesizing the first lithium-nickel composite oxide. Example Batteries B1 to B44 and Comparative Example Batteries b1 to b37 were made in the same manner as Example Batteries A1 to A44 and Comparative Example Batteries a1 to a37, respectively, except that this first lithium-nickel composite oxide was used as the raw material for the active material particles, and the evaluation was carried out in the same manner as Example 1. The results are shown in Tables 2A and 2B.

TABLE 2A

First Lithium-Nickel Composite Oxide: $LiNi_{0.9}Co_{0.07}Al_{0.03}O_2$

| Battery No | Element M | Amount Added (mol %) | Environment to be Allowed to Stand Temperature · Humidity (° C. · %) | Preliminary Baking Atmosphere | Main Baking-Annealing Atmosphere | Discharge Performance Discharge 400 mA at 0° C. (mAh) | 4000 mA at 0° C. (mAh) | Internal Short Circuit Safety 60° C.-Crush Speed 5 mm/Sec Highest Temperature Reached (° C.) |
|---|---|---|---|---|---|---|---|---|
| Ex. B1 | Ta | 0.5 | 25 · 55 | Dry Air | Oxygen | 1485 | 1460 | 65 |
| Ex. B2 |  | 2.0 |  |  |  | 1490 | 1455 | 65 |
| Ex. B3 | Al | 0.5 |  |  |  | 1480 | 1462 | 70 |
| Ex. B4 |  | 2.0 |  |  |  | 1475 | 1460 | 65 |
| Ex. B5 | Zr | 0.5 |  |  |  | 1470 | 1460 | 70 |
| Ex. B6 |  | 2.0 |  |  |  | 1475 | 1458 | 71 |
| Ex. B7 | Mg | 0.5 |  |  |  | 1470 | 1455 | 65 |
| Ex. B8 |  | 2.0 |  |  |  | 1470 | 1460 | 65 |
| Ex. B9 | In | 0.5 |  |  |  | 1480 | 1455 | 71 |
| Ex. B10 |  | 2.0 |  |  |  | 1485 | 1457 | 65 |
| Ex. B11 | Sn | 0.5 |  |  |  | 1480 | 1456 | 65 |
| Ex. B12 |  | 2.0 |  |  |  | 1480 | 1450 | 65 |
| Ex. B13 | Mn | 0.5 |  |  |  | 1482 | 1460 | 71 |
| Ex. B14 |  | 2.0 |  |  |  | 1485 | 1462 | 72 |
| Ex. B15 | B | 0.5 |  |  |  | 1490 | 1465 | 72 |
| Ex. B16 |  | 2.0 |  |  |  | 1475 | 1455 | 74 |
| Ex. B17 | W | 0.5 |  |  |  | 1475 | 1455 | 72 |
| Ex. B18 |  | 2.0 |  |  |  | 1480 | 1460 | 75 |
| Ex. B19 | Nb | 0.5 |  |  |  | 1480 | 1460 | 70 |
| Ex. B20 |  | 2.0 |  |  |  | 1482 | 1460 | 72 |
| Ex. B21 | Mo | 0.5 |  |  |  | 1490 | 1465 | 72 |
| Ex. B22 |  | 2.0 |  |  |  | 1485 | 1460 | 70 |
| Ex. B23 | Ta | 2.5 |  |  |  | 1480 | 1330 | 70 |
| Ex. B24 | Al |  |  |  |  | 1490 | 1330 | 70 |
| Ex. B25 | Zr |  |  |  |  | 1485 | 1335 | 70 |
| Ex. B26 | Mg |  |  |  |  | 1486 | 1332 | 75 |

TABLE 2A-continued

First Lithium-Nickel Composite Oxide: LiNi$_{0.90}$Co$_{0.07}$Al$_{0.03}$O$_2$

| Battery No | Element M | Amount Added (mol %) | Environment to be Allowed to Stand Temperature · Humidity (° C. · %) | Preliminary Baking Atmosphere | Main Baking-Annealing Atmosphere | Discharge Performance Discharge 400 mA at 0° C. (mAh) | 4000 mA at 0° C. (mAh) | Internal Short Circuit Safety 60° C.-Crush Speed 5 mm/Sec Highest Temperature Reached (° C.) |
|---|---|---|---|---|---|---|---|---|
| Ex. B27 | In | | | | | 1490 | 1332 | 70 |
| Ex. B28 | Sn | | | | | 1488 | 1335 | 70 |
| Ex. B29 | Mn | | | | | 1480 | 1335 | 70 |
| Ex. B30 | B | | | | | 1485 | 1330 | 75 |
| Ex. B31 | W | | | | | 1490 | 1330 | 69 |
| Ex. B32 | Nb | | | | | 1485 | 1325 | 71 |
| Ex. B33 | Mo | | | | | 1490 | 1330 | 72 |
| Ex. B34 | Ta | 0.5 | 60 · 55 | | | 1300 | 1200 | 75 |
| Ex. B35 | Al | | | | | 1305 | 1205 | 72 |
| Ex. B36 | Zr | | | | | 1302 | 1200 | 75 |
| Ex. B37 | Mg | | | | | 1300 | 1200 | 74 |
| Ex. B38 | In | | | | | 1305 | 1205 | 72 |
| Ex. B39 | Sn | | | | | 1302 | 1207 | 75 |
| Ex. B40 | Mn | | | | | 1300 | 1202 | 74 |
| Ex. B41 | B | | | | | 1300 | 1205 | 70 |
| Ex. B42 | W | | | | | 1305 | 1205 | 71 |
| Ex. B43 | Nb | | | | | 1300 | 1200 | 72 |
| Ex. B44 | Mo | | | | | 1302 | 1205 | 71 |

TABLE 2B

First Lithium-Nickel Composite Oxide: LiNi$_{0.90}$Co$_{0.07}$Al$_{0.03}$O$_2$

| Battery No | Element M | Amount Added (mol %) | Environment to be Allowed to Stand Temperature · Humidity (° C. · %) | Preliminary Baking Atmosphere | Main Baking-Annealing Atmosphere | Discharge Performance Discharge 400 mA at 0° C. (mAh) | 4000 mA at 0° C. (mAh) | Internal Short Circuit Safety 60° C.-Crush Speed 5 mm/Sec Highest Temperature Reached (° C.) |
|---|---|---|---|---|---|---|---|---|
| Comp. Ex. b1 | Ta | 0.5 | 25 · 20 | Dry Air | Oxygen | 1490 | 1455 | 120 |
| Comp. Ex. b2 | Al | | | | | 1492 | 1456 | 106 |
| Comp. Ex. b3 | Zr | | | | | 1495 | 1457 | 107 |
| Comp. Ex. b4 | Mg | | | | | 1487 | 1455 | 100 |
| Comp. Ex. b5 | In | | | | | 1488 | 1450 | 117 |
| Comp. Ex. b6 | Sn | | | | | 1489 | 1460 | 115 |
| Comp. Ex. b7 | Mn | | | | | 1490 | 1465 | 120 |
| Comp. Ex. b8 | B | | | | | 1492 | 1466 | 118 |
| Comp. Ex. b9 | W | | | | | 1496 | 1455 | 115 |
| Comp. Ex. b10 | Nb | | | | | 1492 | 1460 | 120 |
| Comp. Ex. b11 | Mo | | | | | 1495 | 1450 | 120 |
| Comp. Ex. b12 | Ta | | 25 · 55 | Oxygen | | 1495 | 1450 | 112 |
| Comp. Ex. b13 | Al | | | | | 1497 | 1460 | 106 |
| Comp. Ex. b14 | Zr | | | | | 1490 | 1460 | 115 |
| Comp. Ex. b15 | Mg | | | | | 1485 | 1450 | 120 |
| Comp. Ex. b16 | In | | | | | 1489 | 1450 | 118 |
| Comp. Ex. b17 | Sn | | | | | 1480 | 1455 | 115 |
| Comp. Ex. b18 | Mn | | | | | 1485 | 1452 | 112 |
| Comp. Ex. b19 | B | | | | | 1480 | 1456 | 110 |
| Comp. Ex. b20 | W | | | | | 1490 | 1462 | 115 |
| Comp. Ex. b21 | Nb | | | | | 1492 | 1460 | 112 |
| Comp. Ex. b22 | Mo | | | | | 1495 | 1462 | 110 |
| Comp. Ex. b23 | Ta | | | Dry Air | Dry Air | 1490 | 1462 | 120 |
| Comp. Ex. b24 | Al | | | | | 1490 | 1465 | 109 |
| Comp. Ex. b25 | Zr | | | | | 1485 | 1466 | 105 |
| Comp. Ex. b26 | Mg | | | | | 1488 | 1468 | 100 |
| Comp. Ex. b27 | In | | | | | 1488 | 1468 | 102 |
| Comp. Ex. b28 | Sn | | | | | 1487 | 1450 | 100 |
| Comp. Ex. b29 | Mn | | | | | 1485 | 1450 | 106 |
| Comp. Ex. b30 | B | | | | | 1485 | 1450 | 107 |
| Comp. Ex. b31 | W | | | | | 1490 | 1450 | 100 |

TABLE 2B-continued

First Lithium-Nickel Composite Oxide: $LiNi_{0.90}Co_{0.07}Al_{0.03}O_2$

| Battery No | Element M | Amount Added (mol %) | Environment to be Allowed to Stand Temperature · Humidity (° C. · %) | Preliminary Baking Atmosphere | Main Baking-Annealing Atmosphere | Discharge Performance Discharge 400 mA at 0° C. (mAh) | 4000 mA at 0° C. (mAh) | Internal Short Circuit Safety 60° C.-Crush Speed 5 mm/Sec Highest Temperature Reached (° C.) |
|---|---|---|---|---|---|---|---|---|
| Comp. Ex. b32 | Nb | | | | | 1488 | 1445 | 105 |
| Comp. Ex. b33 | Mo | | | | | 1480 | 1450 | 105 |
| Comp. Ex. b34 | Not Added | — | 25 · 55 | | Oxygen | 1305 | 1202 | 76 |
| Comp. Ex. b35 | Not Added | 0.5 | Not Carried Out | | | 1490 | 1460 | 110 |
| Comp. Ex. b36 | | — | Mixed Gas of Nitrogen:Hydrogen = 95:5 (molar ratio) treatment at 400° C. for 6 hours | | | 1490 | 1460 | 115 |
| Comp. Ex. b37 | | | Not Carried Out | | | 1495 | 1465 | 130 |

EXAMPLE 3

A first lithium-nickel composite oxide having a composition of $LiNi_{0.25}Co_{0.25}Al_{0.50}O_2$ was obtained by using nickel sulfate, cobalt sulfate, and aluminum sulfate, so that a molar ratio of Ni atoms, Co atoms, and Al atoms was 25:25:50 upon synthesizing the first lithium-nickel composite oxide. Example Batteries C1 to C44 and Comparative Example Batteries c1 to c37 were made in the same manner as Example Batteries A1 to A44 and Comparative Example Batteries a1 to a37, respectively, except that this first lithium-nickel composite oxide was used as the raw material for the active material particles, and the evaluation was carried out in the same manner as Example 1. The results are shown in Tables 3A and 3B.

TABLE 3A

First Lithium-Nickel Composite Oxide: $LiNi_{0.25}Co_{0.25}Al_{0.50}O_2$

| Battery No | Element M | Amount Added (mol %) | Environment to be Allowed to Stand Temperature · Humidity (° C. · %) | Preliminary Baking Atmosphere | Main Baking-Annealing Atmosphere | Discharge Performance Discharge 400 mA at 0° C. (mAh) | 4000 mA at 0° C. (mAh) | Internal Short Circuit Safety 60° C.-Crush Speed 5 mm/Sec Highest Temperature Reached (° C.) |
|---|---|---|---|---|---|---|---|---|
| Ex. C1 | Ta | 0.5 | 25 · 55 | Dry Air | Oxygen | 1485 | 1460 | 68 |
| Ex. C2 | | 2.0 | | | | 1490 | 1455 | 64 |
| Ex. C3 | Al | 0.5 | | | | 1480 | 1462 | 62 |
| Ex. C4 | | 2.0 | | | | 1475 | 1460 | 70 |
| Ex. C5 | Zr | 0.5 | | | | 1470 | 1460 | 70 |
| Ex. C6 | | 2.0 | | | | 1475 | 1458 | 70 |
| Ex. C7 | Mg | 0.5 | | | | 1470 | 1455 | 75 |
| Ex. C8 | | 2.0 | | | | 1470 | 1460 | 72 |
| Ex. C9 | In | 0.5 | | | | 1480 | 1455 | 66 |
| Ex. C10 | | 2.0 | | | | 1485 | 1457 | 68 |
| Ex. C11 | Sn | 0.5 | | | | 1480 | 1456 | 64 |
| Ex. C12 | | 2.0 | | | | 1480 | 1450 | 62 |
| Ex. C13 | Mn | 0.5 | | | | 1482 | 1460 | 65 |
| Ex. C14 | | 2.0 | | | | 1485 | 1462 | 59 |
| Ex. C15 | B | 0.5 | | | | 1490 | 1465 | 60 |
| Ex. C16 | | 2.0 | | | | 1475 | 1455 | 61 |
| Ex. C17 | W | 0.5 | | | | 1475 | 1455 | 65 |
| Ex. C18 | | 2.0 | | | | 1480 | 1460 | 67 |
| Ex. C19 | Nb | 0.5 | | | | 1480 | 1455 | 66 |
| Ex. C20 | | 2.0 | | | | 1485 | 1457 | 68 |
| Ex. C21 | Mo | 0.5 | | | | 1480 | 1456 | 64 |
| Ex. C22 | | 2.0 | | | | 1480 | 1450 | 62 |
| Ex. C23 | Ta | 2.5 | | | | 1480 | 1350 | 68 |
| Ex. C24 | Al | | | | | 1490 | 1355 | 64 |
| Ex. C25 | Zr | | | | | 1485 | 1350 | 65 |
| Ex. C26 | Mg | | | | | 1486 | 1350 | 66 |
| Ex. C27 | In | | | | | 1490 | 1352 | 69 |
| Ex. C28 | Sn | | | | | 1488 | 1357 | 70 |
| Ex. C29 | Mn | | | | | 1480 | 1356 | 70 |

TABLE 3A-continued

First Lithium-Nickel Composite Oxide: $LiNi_{0.25}Co_{0.25}Al_{0.50}O_2$

| Battery No | Element M | Amount Added (mol %) | Environment to be Allowed to Stand Temperature · Humidity (° C. · %) | Preliminary Baking Atmosphere | Main Baking-Annealing Atmosphere | Discharge Performance Discharge 400 mA at 0° C. (mAh) | 4000 mA at 0° C. (mAh) | Internal Short Circuit Safety 60° C.-Crush Speed 5 mm/Sec Highest Temperature Reached (° C.) |
|---|---|---|---|---|---|---|---|---|
| Ex. C30 | B | | | | | 1485 | 1350 | 75 |
| Ex. C31 | W | | | | | 1490 | 1350 | 69 |
| Ex. C32 | Nb | | | | | 1490 | 1352 | 69 |
| Ex. C33 | Mo | | | | | 1488 | 1357 | 70 |
| Ex. C34 | Ta | 0.5 | 60 · 55 | | | 1350 | 1200 | 70 |
| Ex. C35 | Al | | | | | 1355 | 1200 | 71 |
| Ex. C36 | Zr | | | | | 1350 | 1205 | 72 |
| Ex. C37 | Mg | | | | | 1350 | 1205 | 68 |
| Ex. C38 | In | | | | | 1352 | 1200 | 69 |
| Ex. C39 | Sn | | | | | 1355 | 1202 | 67 |
| Ex. C40 | Mn | | | | | 1355 | 1205 | 70 |
| Ex. C41 | B | | | | | 1345 | 1200 | 70 |
| Ex. C42 | W | | | | | 1345 | 1200 | 75 |
| Ex. C43 | Nb | | | | | 1350 | 1205 | 68 |
| Ex. C44 | Mo | | | | | 1352 | 1200 | 69 |

TABLE 3B

First Lithium-Nickel Composite Oxide: $LiNi_{0.25}Co_{0.25}Al_{0.50}O_2$

| Battery No | Element M | Amount Added (mol %) | Environment to be Allowed to Stand Temperature · Humidity (° C. · %) | Preliminary Baking Atmosphere | Main Baking-Annealing Atmosphere | Discharge Performance Discharge 400 mA at 0° C. (mAh) | 4000 mA at 0° C. (mAh) | Internal Short Circuit Safety 60° C.-Crush Speed 5 mm/Sec Highest Temperature Reached (° C.) |
|---|---|---|---|---|---|---|---|---|
| Comp. Ex. c1 | Ta | 0.5 | 25 · 20 | Dry Air | Oxygen | 1490 | 1450 | 110 |
| Comp. Ex. c2 | Al | | | | | 1492 | 1456 | 105 |
| Comp. Ex. c3 | Zr | | | | | 1495 | 1457 | 107 |
| Comp. Ex. c4 | Mg | | | | | 1487 | 1455 | 109 |
| Comp. Ex. c5 | In | | | | | 1488 | 1450 | 110 |
| Comp. Ex. c6 | Sn | | | | | 1489 | 1460 | 105 |
| Comp. Ex. c7 | Mn | | | | | 1490 | 1465 | 108 |
| Comp. Ex. c8 | B | | | | | 1492 | 1466 | 110 |
| Comp. Ex. c9 | W | | | | | 1496 | 1455 | 115 |
| Comp. Ex. c10 | Nb | | | | | 1488 | 1450 | 110 |
| Comp. Ex. c11 | Mo | | | | | 1489 | 1460 | 105 |
| Comp. Ex. c12 | Ta | | 25 · 55 | Oxygen | | 1495 | 1450 | 112 |
| Comp. Ex. c13 | Al | | | | | 1497 | 1460 | 110 |
| Comp. Ex. c14 | Zr | | | | | 1490 | 1460 | 110 |
| Comp. Ex. c15 | Mg | | | | | 1485 | 1450 | 115 |
| Comp. Ex. c16 | In | | | | | 1489 | 1450 | 120 |
| Comp. Ex. c17 | Sn | | | | | 1480 | 1455 | 120 |
| Comp. Ex. c18 | Mn | | | | | 1485 | 1452 | 118 |
| Comp. Ex. c19 | B | | | | | 1480 | 1456 | 116 |
| Comp. Ex. c20 | W | | | | | 1490 | 1462 | 119 |
| Comp. Ex. c21 | Nb | | | | | 1480 | 1455 | 120 |
| Comp. Ex. c22 | Mo | | | | | 1485 | 1452 | 118 |
| Comp. Ex. c23 | Ta | | | Dry Air | Dry Air | 1490 | 1462 | 120 |
| Comp. Ex. c24 | Al | | | | | 1490 | 1465 | 120 |
| Comp. Ex. c25 | Zr | | | | | 1485 | 1466 | 120 |
| Comp. Ex. c26 | Mg | | | | | 1488 | 1468 | 115 |
| Comp. Ex. c27 | In | | | | | 1488 | 1468 | 112 |
| Comp. Ex. c28 | Sn | | | | | 1487 | 1450 | 116 |
| Comp. Ex. c29 | Mn | | | | | 1485 | 1450 | 117 |
| Comp. Ex. c30 | B | | | | | 1485 | 1450 | 118 |
| Comp. Ex. c31 | W | | | | | 1490 | 1450 | 120 |
| Comp. Ex. c32 | Nb | | | | | 1487 | 1450 | 116 |
| Comp. Ex. c33 | Mo | | | | | 1485 | 1450 | 117 |

TABLE 3B-continued

First Lithium-Nickel Composite Oxide: $LiNi_{0.25}Co_{0.25}Al_{0.50}O_2$

| Battery No | Element M | Amount Added (mol %) | Environment to be Allowed to Stand Temperature · Humidity (° C. · %) | Preliminary Baking Atmosphere | Main Baking-Annealing Atmosphere | Discharge Performance Discharge 400 mA at 0° C. (mAh) | 4000 mA at 0° C. (mAh) | Internal Short Circuit Safety 60° C.-Crush Speed 5 mm/Sec Highest Temperature Reached (° C.) |
|---|---|---|---|---|---|---|---|---|
| Comp. Ex. c34 | Not Added | — | 25 · 55 | | Oxygen | 1340 | 1180 | 77 |
| Comp. Ex. c35 | Not Added | 0.5 | Not Carried Out | | | 1490 | 1460 | 120 |
| Comp. Ex. c36 | Added | — | Mixed Gas of Nitrogen:Hydrogen = 95:5 (molar ratio) treated at 400° C. for 6 hours | | | 1490 | 1460 | 120 |
| Comp. Ex. c37 | | | Not Carried Out | | | 1495 | 1465 | 130 |

EXAMPLE 4

A first lithium-nickel composite oxide having a composition of $LiNi_{0.25}Co_{0.50}Al_{0.25}O_2$ was obtained by using nickel sulfate, cobalt sulfate, and aluminum sulfate, so that a molar ratio of Ni atoms, Co atoms, and Al atoms was 25:50:25 upon synthesizing the first lithium-nickel composite oxide.

Example Batteries D1 to D44 and Comparative Example Batteries d1 to d37 were made in the same manner as Example Batteries A1 to A44 and Comparative Example Batteries a1 to a37, respectively, except that this first lithium-nickel composite oxide was used as the raw material for the active material particles, and the evaluation was carried out in the same manner as Example 1. The results are shown in Tables 4A and 4B.

TABLE 4A

First Lithium-Nickel Composite Oxide: $LiNi_{0.25}Co_{0.50}Al_{0.25}O_2$

| Battery No | Element M | Amount Added (mol %) | Environment to be Allowed to Stand Temperature · Humidity (° C. · %) | Preliminary Baking Atmosphere | Main Baking-Annealing Atmosphere | Discharge Performance Discharge 400 mA at 0° C. (mAh) | 4000 mA at 0° C. (mAh) | Internal Short Circuit Safety 60° C.-Crush Speed 5 mm/Sec Highest Temperature Reached (° C.) |
|---|---|---|---|---|---|---|---|---|
| Ex. D1 | Ta | 0.5 | 25 · 55 | Dry Air | Oxygen | 1880 | 1810 | 60 |
| Ex. D2 | | 2.0 | | | | 1890 | 1815 | 65 |
| Ex. D3 | Al | 0.5 | | | | 1885 | 1812 | 64 |
| Ex. D4 | | 2.0 | | | | 1884 | 1810 | 61 |
| Ex. D5 | Zr | 0.5 | | | | 1882 | 1810 | 65 |
| Ex. D6 | | 2.0 | | | | 1880 | 1815 | 65 |
| Ex. D7 | Mg | 0.5 | | | | 1892 | 1815 | 70 |
| Ex. D8 | | 2.0 | | | | 1892 | 1810 | 70 |
| Ex. D9 | In | 0.5 | | | | 1880 | 1812 | 68 |
| Ex. D10 | | 2.0 | | | | 1880 | 1816 | 67 |
| Ex. D11 | Sn | 0.5 | | | | 1880 | 1810 | 65 |
| Ex. D12 | | 2.0 | | | | 1889 | 1815 | 65 |
| Ex. D13 | Mn | 0.5 | | | | 1889 | 1812 | 70 |
| Ex. D14 | | 2.0 | | | | 1887 | 1812 | 64 |
| Ex. D15 | B | 0.5 | | | | 1888 | 1812 | 65 |
| Ex. D16 | | 2.0 | | | | 1888 | 1810 | 65 |
| Ex. D17 | W | 0.5 | | | | 1888 | 1810 | 70 |
| Ex. D18 | | 2.0 | | | | 1888 | 1810 | 72 |
| Ex. D19 | Nb | 0.5 | | | | 1880 | 1810 | 65 |
| Ex. D20 | | 2.0 | | | | 1889 | 1815 | 65 |
| Ex. D21 | Mo | 0.5 | | | | 1889 | 1812 | 70 |
| Ex. D22 | | 2.0 | | | | 1887 | 1812 | 64 |
| Ex. D23 | Ta | 2.5 | | | | 1889 | 1600 | 68 |
| Ex. D24 | Al | | | | | 1890 | 1610 | 65 |
| Ex. D25 | Zr | | | | | 1892 | 1605 | 65 |
| Ex. D26 | Mg | | | | | 1895 | 1605 | 62 |
| Ex. D27 | In | | | | | 1897 | 1601 | 62 |
| Ex. D28 | Sn | | | | | 1897 | 1605 | 72 |
| Ex. D29 | Mn | | | | | 1890 | 1610 | 70 |
| Ex. D30 | B | | | | | 1890 | 1610 | 70 |
| Ex. D31 | W | | | | | 1885 | 1600 | 70 |

TABLE 4A-continued

First Lithium-Nickel Composite Oxide: LiNi$_{0.25}$Co$_{0.50}$Al$_{0.25}$O$_2$

| Battery No | Element M | Amount Added (mol %) | Environment to be Allowed to Stand Temperature · Humidity (° C. · %) | Preliminary Baking Atmosphere | Main Baking-Annealing Atmosphere | Discharge Performance Discharge 400 mA at 0° C. (mAh) | 4000 mA at 0° C. (mAh) | Internal Short Circuit Safety 60° C.-Crush Speed 5 mm/Sec Highest Temperature Reached (° C.) |
|---|---|---|---|---|---|---|---|---|
| Ex. D32 | Nb | | | | | 1897 | 1601 | 62 |
| Ex. D33 | Mo | | | | | 1897 | 1605 | 72 |
| Ex. D34 | Ta | 0.5 | 60 · 55 | | | 1620 | 1500 | 68 |
| Ex. D35 | Al | | | | | 1620 | 1505 | 67 |
| Ex. D36 | Zr | | | | | 1625 | 1510 | 70 |
| Ex. D37 | Mg | | | | | 1630 | 1510 | 71 |
| Ex. D38 | In | | | | | 1635 | 1500 | 71 |
| Ex. D39 | Sn | | | | | 1620 | 1500 | 71 |
| Ex. D40 | Mn | | | | | 1625 | 1505 | 72 |
| Ex. D41 | B | | | | | 1620 | 1502 | 68 |
| Ex. D42 | W | | | | | 1625 | 1500 | 69 |
| Ex. D43 | Nb | | | | | 1620 | 1500 | 71 |
| Ex. D44 | Mo | | | | | 1625 | 1505 | 72 |

TABLE 4B

First Lithium-Nickel Composite Oxide: LiNi$_{0.25}$Co$_{0.50}$Al$_{0.25}$O$_2$

| Battery No | Element M | Amount Added (mol %) | Environment to be Allowed to Stand Temperature · Humidity (° C. · %) | Preliminary Baking Atmosphere | Main Baking-Annealing Atmosphere | Discharge Performance Discharge 400 mA at 0° C. (mAh) | 4000 mA at 0° C. (mAh) | Internal Short Circuit Safety 60° C.-Crush Speed 5 mm/Sec Highest Temperature Reached (° C.) |
|---|---|---|---|---|---|---|---|---|
| Comp. Ex. d1 | Ta | 0.5 | 25 · 20 | Dry Air | Oxygen | 1880 | 1812 | 120 |
| Comp. Ex. d2 | Al | | | | | 1885 | 1812 | 115 |
| Comp. Ex. d3 | Zr | | | | | 1885 | 1815 | 111 |
| Comp. Ex. d4 | Mg | | | | | 1888 | 1815 | 120 |
| Comp. Ex. d5 | In | | | | | 1887 | 1815 | 112 |
| Comp. Ex. d6 | Sn | | | | | 1889 | 1812 | 115 |
| Comp. Ex. d7 | Mn | | | | | 1890 | 1810 | 118 |
| Comp. Ex. d8 | B | | | | | 1892 | 1810 | 118 |
| Comp. Ex. d9 | W | | | | | 1891 | 1810 | 120 |
| Comp. Ex. d10 | Nb | | | | | 1889 | 1812 | 115 |
| Comp. Ex. d11 | Mo | | | | | 1890 | 1810 | 118 |
| Comp. Ex. d12 | Ta | | 25 · 55 | Oxygen | | 1891 | 1815 | 110 |
| Comp. Ex. d13 | Al | | | | | 1890 | 1812 | 112 |
| Comp. Ex. d14 | Zr | | | | | 1890 | 1812 | 112 |
| Comp. Ex. d15 | Mg | | | | | 1890 | 1812 | 118 |
| Comp. Ex. d16 | In | | | | | 1890 | 1812 | 118 |
| Comp. Ex. d17 | Sn | | | | | 1890 | 1815 | 115 |
| Comp. Ex. d18 | Mn | | | | | 1890 | 1810 | 120 |
| Comp. Ex. d19 | B | | | | | 1888 | 1811 | 120 |
| Comp. Ex. d20 | W | | | | | 1887 | 1811 | 120 |
| Comp. Ex. d21 | Nb | | | | | 1890 | 1815 | 115 |
| Comp. Ex. d22 | Mo | | | | | 1890 | 1810 | 120 |
| Comp. Ex. d23 | Ta | | | Dry Air | Dry Air | 1885 | 1816 | 110 |
| Comp. Ex. d24 | Al | | | | | 1890 | 1817 | 110 |
| Comp. Ex. d25 | Zr | | | | | 1890 | 1818 | 105 |
| Comp. Ex. d26 | Mg | | | | | 1888 | 1818 | 108 |
| Comp. Ex. d27 | In | | | | | 1887 | 1817 | 107 |
| Comp. Ex. d28 | Sn | | | | | 1886 | 1817 | 109 |
| Comp. Ex. d29 | Mn | | | | | 1892 | 1818 | 110 |
| Comp. Ex. d30 | B | | | | | 1892 | 1817 | 110 |
| Comp. Ex. d31 | W | | | | | 1892 | 1818 | 112 |
| Comp. Ex. d32 | Nb | | | | | 1886 | 1817 | 109 |
| Comp. Ex. d33 | Mo | | | | | 1892 | 1818 | 110 |
| Comp. Ex. d34 | Not Added | — | 25 · 55 | | Oxygen | 1615 | 1480 | 71 |
| Comp. Ex. d35 | Not | 0.5 | | Not Carried Out | | 1890 | 1818 | 112 |

TABLE 4B-continued

First Lithium-Nickel Composite Oxide: $LiNi_{0.25}Co_{0.50}Al_{0.25}O_2$

| Battery No | Element M | Amount Added (mol %) | Environment to be Allowed to Stand Temperature · Humidity (° C. · %) | Preliminary Baking Atmosphere | Main Baking-Annealing Atmosphere | Discharge Performance Discharge 400 mA at 0° C. (mAh) | 4000 mA at 0° C. (mAh) | Internal Short Circuit Safety 60° C.-Crush Speed 5 mm/Sec Highest Temperature Reached (° C.) |
|---|---|---|---|---|---|---|---|---|
| Comp. Ex. d36 | Added | — | | Mixed Gas of Nitrogen:Hydrogen = 95:5 (molar ratio) treated at 400° C. for 6 hours | | 1888 | 1818 | 115 |
| Comp. Ex. d37 | | | | Not Carried Out | | 1892 | 1815 | 120 |

EXAMPLE 5

A first lithium-nickel composite oxide having a composition of $LiNi_{0.90}Co_{0.10}O_2$ was obtained by using nickel sulfate and cobalt sulfate without using aluminum sulfate, so that a molar ratio of Ni atoms and Co atoms was 90:10 upon synthesizing the first lithium-nickel composite oxide. Example Batteries E1 to E44 and Comparative Example Batteries e1 to e37 were made in the same manner as Example Batteries A1 to A44 and Comparative Example Batteries a1 to a37, respectively, except that this first lithium-nickel composite oxide was used as the raw material for the active material particles, and the evaluation was carried out in the same manner as Example 1. The results are shown in Tables 5A and 5B.

TABLE 5A

First Lithium-Nickel Composite Oxide: $LiNi_{0.90}Co_{0.10}O_2$

| Battery No | Element M | Amount Added (mol %) | Environment to be Allowed to Stand Temperature · Humidity (° C. · %) | Preliminary Baking Atmosphere | Main Baking-Annealing Atmosphere | Discharge Performance Discharge 400 mA at 0° C. (mAh) | 4000 mA at 0° C. (mAh) | Internal Short Circuit Safety 60° C.-Crush Speed 5 mm/Sec Highest Temperature Reached (° C.) |
|---|---|---|---|---|---|---|---|---|
| Ex. E1 | Ta | 0.5 | 25 · 55 | Dry Air | Oxygen | 2000 | 1900 | 65 |
| Ex. E2 | | 2.0 | | | | 2005 | 1905 | 70 |
| Ex. E3 | Al | 0.5 | | | | 2004 | 1902 | 68 |
| Ex. E4 | | 2.0 | | | | 2002 | 1900 | 62 |
| Ex. E5 | Zr | 0.5 | | | | 2000 | 1902 | 62 |
| Ex. E6 | | 2.0 | | | | 2000 | 1900 | 64 |
| Ex. E7 | Mg | 0.5 | | | | 1999 | 1900 | 65 |
| Ex. E8 | | 2.0 | | | | 1998 | 1905 | 70 |
| Ex. E9 | In | 0.5 | | | | 2002 | 1900 | 71 |
| Ex. E10 | | 2.0 | | | | 2000 | 1900 | 75 |
| Ex. E11 | Sn | 0.5 | | | | 2000 | 1905 | 64 |
| Ex. E12 | | 2.0 | | | | 2005 | 1904 | 68 |
| Ex. E13 | Mn | 0.5 | | | | 2000 | 1902 | 62 |
| Ex. E14 | | 2.0 | | | | 2004 | 1902 | 65 |
| Ex. E15 | B | 0.5 | | | | 2002 | 1900 | 62 |
| Ex. E16 | | 2.0 | | | | 1999 | 1910 | 67 |
| Ex. E17 | W | 0.5 | | | | 2002 | 1910 | 70 |
| Ex. E18 | | 2.0 | | | | 2000 | 1915 | 72 |
| Ex. E19 | Nb | 0.5 | | | | 2002 | 1900 | 71 |
| Ex. E20 | | 2.0 | | | | 2000 | 1900 | 75 |
| Ex. E21 | Mo | 0.5 | | | | 2004 | 1902 | 65 |
| Ex. E22 | | 2.0 | | | | 2002 | 1900 | 62 |
| Ex. E23 | Ta | 2.5 | | | | 2000 | 1700 | 69 |
| Ex. E24 | Al | | | | | 2002 | 1702 | 68 |
| Ex. E25 | Zr | | | | | 1999 | 1710 | 67 |
| Ex. E26 | Mg | | | | | 1998 | 1715 | 70 |
| Ex. E27 | In | | | | | 2002 | 1705 | 60 |
| Ex. E28 | Sn | | | | | 2000 | 1705 | 60 |
| Ex. E29 | Mn | | | | | 2000 | 1700 | 62 |
| Ex. E30 | B | | | | | 2005 | 1702 | 65 |
| Ex. E31 | W | | | | | 2004 | 1700 | 64 |
| Ex. E32 | Nb | | | | | 2002 | 1705 | 60 |
| Ex. E33 | Mo | | | | | 2005 | 1702 | 65 |
| Ex. E34 | Ta | 0.5 | 60 · 55 | | | 1750 | 1610 | 70 |
| Ex. E35 | Al | | | | | 1750 | 1612 | 72 |

TABLE 5A-continued

First Lithium-Nickel Composite Oxide: LiNi$_{0.90}$Co$_{0.10}$O$_2$

| Battery No | Element M | Amount Added (mol %) | Environment to be Allowed to Stand Temperature · Humidity (° C. · %) | Preliminary Baking Atmosphere | Main Baking-Annealing Atmosphere | Discharge Performance Discharge 400 mA at 0° C. (mAh) | 4000 mA at 0° C. (mAh) | Internal Short Circuit Safety 60° C.-Crush Speed 5 mm/Sec Highest Temperature Reached (° C.) |
|---|---|---|---|---|---|---|---|---|
| Ex. E36 | Zr | | | | | 1755 | 1600 | 65 |
| Ex. E37 | Mg | | | | | 1760 | 1620 | 68 |
| Ex. E38 | In | | | | | 1765 | 1625 | 67 |
| Ex. E39 | Sn | | | | | 1760 | 1630 | 62 |
| Ex. E40 | Mn | | | | | 1762 | 1625 | 65 |
| Ex. E41 | B | | | | | 1758 | 1620 | 67 |
| Ex. E42 | W | | | | | 1757 | 1615 | 70 |
| Ex. E43 | Nb | | | | | 1760 | 1630 | 62 |
| Ex. E44 | Mo | | | | | 1758 | 1620 | 67 |

TABLE 5B

First Lithium-Nickel Composite Oxide: LiNi$_{0.90}$Co$_{0.10}$O$_2$

| Battery No | Element M | Amount Added (mol %) | Environment to be Allowed to Stand Temperature · Humidity (° C. · %) | Preliminary Baking Atmosphere | Main Baking-Annealing Atmosphere | Discharge Performance Discharge 400 mA at 0° C. (mAh) | 4000 mA at 0° C. (mAh) | Internal Short Circuit Safety 60° C.-Crush Speed 5 mm/Sec Highest Temperature Reached (° C.) |
|---|---|---|---|---|---|---|---|---|
| Comp. Ex. e1 | Ta | 0.5 | 25 · 20 | Dry Air | Oxygen | 2004 | 1900 | 118 |
| Comp. Ex. e2 | Al | | | | | 2005 | 1900 | 119 |
| Comp. Ex. e3 | Zr | | | | | 2000 | 1905 | 120 |
| Comp. Ex. e4 | Mg | | | | | 2000 | 1905 | 115 |
| Comp. Ex. e5 | In | | | | | 2002 | 1902 | 114 |
| Comp. Ex. e6 | Sn | | | | | 2000 | 1902 | 112 |
| Comp. Ex. e7 | Mn | | | | | 2003 | 1902 | 110 |
| Comp. Ex. e8 | B | | | | | 2005 | 1900 | 120 |
| Comp. Ex. e9 | W | | | | | 2005 | 1905 | 115 |
| Comp. Ex. e10 | Nb | | | | | 2003 | 1902 | 110 |
| Comp. Ex. e11 | Mo | | | | | 2002 | 1902 | 114 |
| Comp. Ex. e12 | Ta | | 25 · 55 | Oxygen | | 2000 | 1902 | 116 |
| Comp. Ex. e13 | Al | | | | | 2000 | 1902 | 114 |
| Comp. Ex. e14 | Zr | | | | | 2005 | 1905 | 118 |
| Comp. Ex. e15 | Mg | | | | | 2000 | 1900 | 117 |
| Comp. Ex. e16 | In | | | | | 1999 | 1905 | 116 |
| Comp. Ex. e17 | Sn | | | | | 1998 | 1902 | 112 |
| Comp. Ex. e18 | Mn | | | | | 1997 | 1903 | 118 |
| Comp. Ex. e19 | B | | | | | 1999 | 1904 | 116 |
| Comp. Ex. e20 | W | | | | | 2000 | 1904 | 115 |
| Comp. Ex. e21 | Nb | | | | | 1997 | 1903 | 118 |
| Comp. Ex. e22 | Mo | | | | | 1999 | 1905 | 116 |
| Comp. Ex. e23 | Ta | | | Dry Air | Dry Air | 2002 | 1900 | 120 |
| Comp. Ex. e24 | Al | | | | | 2002 | 1901 | 120 |
| Comp. Ex. e25 | Zr | | | | | 2004 | 1900 | 110 |
| Comp. Ex. e26 | Mg | | | | | 2003 | 1900 | 100 |
| Comp. Ex. e27 | In | | | | | 2000 | 1905 | 100 |
| Comp. Ex. e28 | Sn | | | | | 2000 | 1904 | 110 |
| Comp. Ex. e29 | Mn | | | | | 2000 | 1902 | 105 |
| Comp. Ex. e30 | B | | | | | 2003 | 1900 | 120 |
| Comp. Ex. e31 | W | | | | | 2005 | 1900 | 120 |
| Comp. Ex. e32 | Nb | | | | | 2000 | 1902 | 105 |
| Comp. Ex. e33 | Mo | | | | | 2003 | 1900 | 120 |
| Comp. Ex. e34 | Not Added | — | 25 · 55 | | Oxygen | 1750 | 1600 | 72 |
| Comp. Ex. e35 | Not Added | 0.5 | | Not Carried Out | | 2000 | 1900 | 114 |
| Comp. Ex. e36 | | | — | Mixed Gas of Nitrogen:Hydrogen = 95:5 (molar ratio) treated at 400° C. for 6 hours | | 2005 | 1901 | 112 |
| Comp. Ex. e37 | | | | Not Carried Out | | 2005 | 1905 | 120 |

EXAMPLE 6

A first lithium-nickel composite oxide having a composition of $LiNi_{0.50}Co_{0.50}O_2$ was obtained by using nickel sulfate and cobalt sulfate without using aluminum sulfate so that a molar ratio of Ni atoms and Co atoms was 50:50 upon synthesizing the first lithium-nickel composite oxide. Example Batteries F1 to F44 and Comparative Example Batteries f1 to f37 were made in the same manner as Example Batteries A1 to A44 and Comparative Example Batteries a1 to a37, respectively, except that this first lithium-nickel composite oxide was used as the raw material for the active material particles, and the evaluation was carried out in the same manner as Example 1. The results are shown in Tables 6A and 6B.

TABLE 6A

First Lithium-Nickel Composite Oxide: $LiNi_{0.50}Co_{0.50}O_2$

| Battery No | Element M | Amount Added (mol %) | Environment to be Allowed to Stand Temperature · Humidity (° C. · %) | Preliminary Baking Atmosphere | Main Baking · Annealing Atmosphere | Discharge Performance Discharge 400 mA at 0° C. (mAh) | Discharge Performance Discharge 4000 mA at 0° C. (mAh) | Internal Short Circuit Safety 60° C. · Crush Speed 5 mm/Sec Highest Temperature Reached (° C.) |
|---|---|---|---|---|---|---|---|---|
| Ex. F1 | Ta | 0.5 | 25 · 55 | Dry Air | Oxygen | 2000 | 1900 | 60 |
| Ex. F2 | | 2.0 | | | | 2000 | 1905 | 62 |
| Ex. F3 | Al | 0.5 | | | | 2004 | 1902 | 65 |
| Ex. F4 | | 2.0 | | | | 2002 | 1900 | 61 |
| Ex. F5 | Zr | 0.5 | | | | 2000 | 1902 | 70 |
| Ex. F6 | | 2.0 | | | | 2000 | 1900 | 65 |
| Ex. F7 | Mg | 0.5 | | | | 1999 | 1900 | 61 |
| Ex. F8 | | 2.0 | | | | 1998 | 1905 | 62 |
| Ex. F9 | In | 0.5 | | | | 2002 | 1900 | 64 |
| Ex. F10 | | 2.0 | | | | 2000 | 1900 | 68 |
| Ex. F11 | Sn | 0.5 | | | | 2000 | 1905 | 66 |
| Ex. F12 | | 2.0 | | | | 2005 | 1904 | 62 |
| Ex. F13 | Mn | 0.5 | | | | 2000 | 1902 | 61 |
| Ex. F14 | | 2.0 | | | | 2004 | 1902 | 62 |
| Ex. F15 | B | 0.5 | | | | 2002 | 1900 | 65 |
| Ex. F16 | | 2.0 | | | | 1999 | 1910 | 64 |
| Ex. F17 | W | 0.5 | | | | 2002 | 1910 | 66 |
| Ex. F18 | | 2.0 | | | | 2000 | 1915 | 65 |
| Ex. F19 | Nb | 0.5 | | | | 2000 | 1905 | 66 |
| Ex. F20 | | 2.0 | | | | 2002 | 1900 | 65 |
| Ex. F21 | Mo | 0.5 | | | | 2000 | 1900 | 65 |
| Ex. F22 | | 2.0 | | | | 2004 | 1902 | 65 |
| Ex. F23 | Ta | 2.5 | | | | 2000 | 1700 | 69 |
| Ex. F24 | Al | | | | | 2002 | 1702 | 67 |
| Ex. F25 | Zr | | | | | 1999 | 1710 | 65 |
| Ex. F26 | Mg | | | | | 1998 | 1715 | 68 |
| Ex. F27 | In | | | | | 2002 | 1705 | 64 |
| Ex. F28 | Sn | | | | | 2000 | 1705 | 66 |
| Ex. F29 | Mn | | | | | 2000 | 1700 | 65 |
| Ex. F30 | B | | | | | 2005 | 1702 | 64 |
| Ex. F31 | W | | | | | 2004 | 1700 | 65 |
| Ex. F32 | Nb | | | | | 2002 | 1705 | 64 |
| Ex. F33 | Mo | | | | | 2000 | 1700 | 65 |
| Ex. F34 | Ta | 0.5 | 60 · 55 | | | 1780 | 1600 | 62 |
| Ex. F35 | Al | | | | | 1770 | 1620 | 65 |
| Ex. F36 | Zr | | | | | 1720 | 1650 | 63 |
| Ex. F37 | Mg | | | | | 1780 | 1680 | 67 |
| Ex. F38 | In | | | | | 1760 | 1630 | 64 |
| Ex. F39 | Sn | | | | | 1790 | 1620 | 62 |
| Ex. F40 | Mn | | | | | 1760 | 1680 | 65 |
| Ex. F41 | B | | | | | 1750 | 1650 | 65 |
| Ex. F42 | W | | | | | 1780 | 1650 | 65 |
| Ex. F43 | Nb | | | | | 1780 | 1680 | 67 |
| Ex. F44 | Mo | | | | | 1790 | 1620 | 62 |

TABLE 6B

First Lithium-Nickel Composite Oxide: $LiNi_{0.50}Co_{0.50}O_2$

| Battery No | Element M | Amount Added (mol %) | Environment to be Allowed to Stand Temperature · Humidity (° C. · %) | Preliminary Baking Atmosphere | Main Baking · Annealing Atmosphere | Discharge Performance Discharge 400 mA at 0° C. (mAh) | 4000 mA at 0° C. (mAh) | Internal Short Circuit Safety 60° C. · Crush Speed 5 mm/Sec Highest Temperature Reached (° C.) |
|---|---|---|---|---|---|---|---|---|
| Comp. Ex. f1 | Ta | 0.5 | 25 · 20 | Dry Air | Oxygen | 2004 | 1900 | 120 |
| Comp. Ex. f2 | Al | | | | | 2005 | 1900 | 110 |
| Comp. Ex. f3 | Zr | | | | | 2000 | 1905 | 115 |
| Comp. Ex. f4 | Mg | | | | | 2000 | 1905 | 112 |
| Comp. Ex. f5 | In | | | | | 2002 | 1902 | 114 |
| Comp. Ex. f6 | Sn | | | | | 2000 | 1902 | 112 |
| Comp. Ex. f7 | Mn | | | | | 2003 | 1902 | 112 |
| Comp. Ex. f8 | B | | | | | 2005 | 1900 | 125 |
| Comp. Ex. f9 | W | | | | | 2005 | 1905 | 120 |
| Comp. Ex. f10 | Nb | | | | | 2002 | 1902 | 114 |
| Comp. Ex. f11 | Mo | | | | | 2003 | 1902 | 112 |
| Comp. Ex. f12 | Ta | | 25 · 55 | Oxygen | | 2000 | 1902 | 116 |
| Comp. Ex. f13 | Al | | | | | 2000 | 1902 | 118 |
| Comp. Ex. f14 | Zr | | | | | 2005 | 1905 | 110 |
| Comp. Ex. f15 | Mg | | | | | 2000 | 1900 | 112 |
| Comp. Ex. f16 | In | | | | | 1999 | 1905 | 115 |
| Comp. Ex. f17 | Sn | | | | | 1998 | 1902 | 115 |
| Comp. Ex. f18 | Mn | | | | | 1997 | 1903 | 118 |
| Comp. Ex. f19 | B | | | | | 1999 | 1904 | 117 |
| Comp. Ex. f20 | W | | | | | 2000 | 1904 | 119 |
| Comp. Ex. f21 | Nb | | | | | 1999 | 1905 | 115 |
| Comp. Ex. f22 | Mo | | | | | 1997 | 1903 | 118 |
| Comp. Ex. f23 | Ta | | | Dry Air | Dry Air | 2002 | 1900 | 110 |
| Comp. Ex. f24 | Al | | | | | 2002 | 1901 | 110 |
| Comp. Ex. f25 | Zr | | | | | 2004 | 1900 | 115 |
| Comp. Ex. f26 | Mg | | | | | 2003 | 1900 | 117 |
| Comp. Ex. f27 | In | | | | | 2000 | 1905 | 118 |
| Comp. Ex. f28 | Sn | | | | | 2000 | 1904 | 116 |
| Comp. Ex. f29 | Mn | | | | | 2000 | 1902 | 120 |
| Comp. Ex. f30 | B | | | | | 2003 | 1900 | 120 |
| Comp. Ex. f31 | W | | | | | 2005 | 1900 | 115 |
| Comp. Ex. f32 | Nb | | | | | 2000 | 1902 | 120 |
| Comp. Ex. f33 | Mo | | | | | 2000 | 1904 | 116 |
| Comp. Ex. f34 | Not Added | — | 25 · 55 | | Oxygen | 1710 | 1600 | 60 |
| Comp. Ex. f35 | Not Added | 0.5 | | Not Carried Out | | 2000 | 1900 | 112 |
| Comp. Ex. f36 | | — | Mixed Gas of Nitrogen:Hydrogen = 95:5 (molar ratio) treated at 400° C. for 6 hours | | | 2005 | 1901 | 110 |
| Comp. Ex. f37 | | | | Not Carried Out | | 2005 | 1905 | 130 |

EXAMPLE 7

Nickel sulfate, cobalt sulfate, and aluminum sulfate were mixed so that a molar ratio of Ni atoms, Co atoms, and Al atoms was 80:15:3. The obtained mixture in an amount of 3.2 kg was dissolved in 10 L of water, to obtain a raw material solution. To the raw material solution, 400 g of sodium hydroxide was added to form a precipitate. The precipitate was sufficiently washed with water and dried, to obtain a coprecipitated hydroxide.

To 3 kg of the obtained coprecipitated hydroxide of Ni—Co—Al, 853 g of lithium hydroxide and 378 g of manganese nitrate were mixed. The obtained mixture was baked at a synthesizing temperature of 750° C. for 10 hours under an atmosphere with an oxygen partial pressure of 0.5 atm, to obtain a first lithium-nickel composite oxide including Al and Mn as element Me (composition: $LiNi_{0.8}Cu_{0.15}Al_{0.03}Mn_{0.02}O_2$).

Example Batteries G1 to G44 and Comparative Example Batteries g1 to g37 were made in the same manner as Example Batteries A1 to A44 and Comparative Example Batteries a1 to a37, respectively, except that this first lithium-nickel composite oxide was used as the raw material for the active material particles, and the evaluation was carried out in the same manner as Example 1. The results are shown in Tables 7A and 7B.

TABLE 7A

First Lithium-Nickel Composite Oxide: $LiNi_{0.80}Co_{0.15}Al_{0.03}Mn_{0.02}O_2$

| Battery No | Element M | Amount Added (mol %) | Environment to be Allowed to Stand Temperature · Humidity (° C. · %) | Preliminary Baking Atmosphere | Main Baking · Annealing Atmosphere | Discharge Performance Discharge 400 mA at 0° C. (mAh) | 4000 mA at 0° C. (mAh) | Internal Short Circuit Safety 60° C. · Crush Speed 5 mm/Sec Highest Temperature Reached (° C.) |
|---|---|---|---|---|---|---|---|---|
| Ex. G1 | Ta | 0.5 | 25 · 55 | Dry Air | Oxygen | 2002 | 1905 | 62 |
| Ex. G2 |    | 2.0 |         |         |        | 2004 | 1900 | 65 |
| Ex. G3 | Al | 0.5 |         |         |        | 2005 | 1902 | 66 |
| Ex. G4 |    | 2.0 |         |         |        | 2002 | 1905 | 60 |
| Ex. G5 | Zr | 0.5 |         |         |        | 2000 | 1900 | 68 |
| Ex. G6 |    | 2.0 |         |         |        | 2000 | 1900 | 68 |
| Ex. G7 | Mg | 0.5 |         |         |        | 2000 | 1900 | 64 |
| Ex. G8 |    | 2.0 |         |         |        | 2002 | 1900 | 64 |
| Ex. G9 | In | 0.5 |         |         |        | 2004 | 1900 | 64 |
| Ex. G10 |   | 2.0 |         |         |        | 2003 | 1902 | 66 |
| Ex. G11 | Sn | 0.5 |        |         |        | 2002 | 1900 | 66 |
| Ex. G12 |   | 2.0 |         |         |        | 2004 | 1904 | 66 |
| Ex. G13 | Mn | 0.5 |        |         |        | 2000 | 1910 | 60 |
| Ex. G14 |   | 2.0 |         |         |        | 2000 | 1915 | 60 |
| Ex. G15 | B | 0.5 |         |         |        | 2000 | 1900 | 61 |
| Ex. G16 |   | 2.0 |         |         |        | 2002 | 1910 | 61 |
| Ex. G17 | W | 0.5 |         |         |        | 2000 | 1910 | 62 |
| Ex. G18 |   | 2.0 |         |         |        | 2004 | 1915 | 62 |
| Ex. G19 | Nb | 0.5 |        |         |        | 2001 | 1900 | 68 |
| Ex. G20 |   | 2.0 |         |         |        | 2002 | 1905 | 68 |
| Ex. G21 | Mo | 0.5 |        |         |        | 2000 | 1902 | 67 |
| Ex. G22 |   | 2.0 |         |         |        | 2000 | 1902 | 67 |
| Ex. G23 | Ta | 2.5 |         |         |        | 2002 | 1705 | 64 |
| Ex. G24 | Al |     |         |         |        | 2004 | 1715 | 66 |
| Ex. G25 | Zr |     |         |         |        | 2004 | 1705 | 65 |
| Ex. G26 | Mg |     |         |         |        | 2004 | 1715 | 65 |
| Ex. G27 | In |     |         |         |        | 2004 | 1702 | 64 |
| Ex. G28 | Sn |     |         |         |        | 2000 | 1700 | 64 |
| Ex. G29 | Mn |     |         |         |        | 2005 | 1700 | 66 |
| Ex. G30 | B  |     |         |         |        | 2005 | 1702 | 65 |
| Ex. G31 | W  |     |         |         |        | 2005 | 1700 | 65 |
| Ex. G32 | Nb |     |         |         |        | 2000 | 1700 | 65 |
| Ex. G33 | Mo |     |         |         |        | 2000 | 1705 | 64 |
| Ex. G34 | Ta | 0.5 | 60 · 55 |         |        | 1760 | 1660 | 65 |
| Ex. G35 | Al |     |         |         |        | 1750 | 1680 | 65 |
| Ex. G36 | Zr |     |         |         |        | 1760 | 1678 | 64 |
| Ex. G37 | Mg |     |         |         |        | 1780 | 1670 | 67 |
| Ex. G38 | In |     |         |         |        | 1750 | 1655 | 62 |
| Ex. G39 | Sn |     |         |         |        | 1750 | 1675 | 60 |
| Ex. G40 | Mn |     |         |         |        | 1780 | 1677 | 60 |
| Ex. G41 | B  |     |         |         |        | 1760 | 1682 | 62 |
| Ex. G42 | W  |     |         |         |        | 1780 | 1685 | 62 |
| Ex. G43 | Nb |     |         |         |        | 1780 | 1678 | 65 |
| Ex. G44 | Mo |     |         |         |        | 1790 | 1679 | 65 |

TABLE 7B

First Lithium-Nickel Composite Oxide: $LiNi_{0.80}Co_{0.15}Al_{0.03}Mn_{0.02}O_2$

| Battery No | Element M | Amount Added (mol %) | Environment to be Allowed to Stand Temperature · Humidity (° C. · %) | Preliminary Baking Atmosphere | Main Baking · Annealing Atmosphere | Discharge Performance Discharge 400 mA at 0° C. (mAh) | 4000 mA at 0° C. (mAh) | Internal Short Circuit Safety 60° C. · Crush Speed 5 mm/Sec Highest Temperature Reached (° C.) |
|---|---|---|---|---|---|---|---|---|
| Comp. Ex. g1 | Ta | 0.5 | 25 · 20 | Dry Air | Oxygen | 2002 | 1905 | 125 |
| Comp. Ex. g2 | Al |     |         |         |        | 2004 | 1902 | 115 |
| Comp. Ex. g3 | Zr |     |         |         |        | 2002 | 1900 | 110 |
| Comp. Ex. g4 | Mg |     |         |         |        | 2002 | 1900 | 110 |
| Comp. Ex. g5 | In |     |         |         |        | 2000 | 1905 | 120 |
| Comp. Ex. g6 | Sn |     |         |         |        | 2000 | 1900 | 120 |
| Comp. Ex. g7 | Mn |     |         |         |        | 2004 | 1902 | 120 |
| Comp. Ex. g8 | B  |     |         |         |        | 2004 | 1905 | 110 |
| Comp. Ex. g9 | W  |     |         |         |        | 2002 | 1900 | 120 |

TABLE 7B-continued

First Lithium-Nickel Composite Oxide: $LiNi_{0.80}Co_{0.15}Al_{0.03}Mn_{0.02}O_2$

| Battery No | Element M | Amount Added (mol %) | Temperature · Humidity (° C. · %) | Preliminary Baking Atmosphere | Main Baking · Annealing Atmosphere | Discharge Performance Discharge 400 mA at 0° C. (mAh) | 4000 mA at 0° C. (mAh) | Internal Short Circuit Safety 60° C. · Crush Speed 5 mm/Sec Highest Temperature Reached (° C.) |
|---|---|---|---|---|---|---|---|---|
| Comp. Ex. g10 | Nb | | | | | 2004 | 1905 | 110 |
| Comp. Ex. g11 | Mo | | | | | 2004 | 1905 | 110 |
| Comp. Ex. g12 | Ta | | 25 · 55 | Oxygen | | 2000 | 1900 | 115 |
| Comp. Ex. g13 | Al | | | | | 2000 | 1900 | 120 |
| Comp. Ex. g14 | Zr | | | | | 2004 | 1902 | 110 |
| Comp. Ex. g15 | Mg | | | | | 2005 | 1900 | 120 |
| Comp. Ex. g16 | In | | | | | 2000 | 1900 | 120 |
| Comp. Ex. g17 | Sn | | | | | 2005 | 1902 | 120 |
| Comp. Ex. g18 | Mn | | | | | 2004 | 1905 | 120 |
| Comp. Ex. g19 | B | | | | | 2002 | 1902 | 120 |
| Comp. Ex. g20 | W | | | | | 2002 | 1904 | 120 |
| Comp. Ex. g21 | Nb | | | | | 2000 | 1900 | 115 |
| Comp. Ex. g22 | Mo | | | | | 2000 | 1900 | 118 |
| Comp. Ex. g23 | Ta | | | Dry Air | Dry Air | 2004 | 1902 | 115 |
| Comp. Ex. g24 | Al | | | | | 2005 | 1900 | 118 |
| Comp. Ex. g25 | Zr | | | | | 2005 | 1905 | 116 |
| Comp. Ex. g26 | Mg | | | | | 2000 | 1902 | 117 |
| Comp. Ex. g27 | In | | | | | 2002 | 1904 | 120 |
| Comp. Ex. g28 | Sn | | | | | 2002 | 1905 | 120 |
| Comp. Ex. g29 | Mn | | | | | 2002 | 1900 | 110 |
| Comp. Ex. g30 | B | | | | | 2004 | 1902 | 110 |
| Comp. Ex. g31 | W | | | | | 2004 | 1904 | 115 |
| Comp. Ex. g32 | Nb | | | | | 2004 | 1900 | 110 |
| Comp. Ex. g33 | Mo | | | | | 2004 | 1900 | 115 |
| Comp. Ex. g34 | Not Added | — | 25 · 55 | | Oxygen | 1720 | 1605 | 65 |
| Comp. Ex. g35 | Not Added | 0.5 | | Not Carried Out | | 2002 | 1905 | 120 |
| Comp. Ex. g36 | | — | | Mixed Gas of Nitrogen:Hydrogen = 95:5 (molar ratio) treated at 400° C. for 6 hours | | 2004 | 1900 | 115 |
| Comp. Ex. g37 | | | | Not Carried Out | | 2004 | 1902 | 127 |

EXAMPLE 8

To 3 kg of a coprecipitated hydroxide of Ni—Co—Al prepared in the same manner as Example 7, 853 g of lithium hydroxide and 378 g of magnesium sulfate were mixed. The obtained mixture was baked at a synthesizing temperature of 750° C. for 10 hours under an atmosphere with an oxygen partial pressure of 0.5 atm, to obtain a first lithium-nickel composite oxide including Al and Mg as element Me (composition: $LiNi_{0.8}Co_{0.15}Al_{0.03}Mg_{0.02}O_2$).

Example Batteries H1 to H44 and Comparative Example Batteries h1 to h37 were made in the same manner as Example Batteries A1 to A44 and Comparative Example Batteries a1 to a37, respectively, except that this first lithium-nickel composite oxide was used as the raw material for the active material particles, and the evaluation was carried out in the same manner as Example 1. The results are shown in Tables 8A and 8B.

TABLE 8A

First Lithium-Nickel Composite Oxide: $LiNi_{0.80}Co_{0.15}Al_{0.03}Mg_{0.02}O_2$

| Battery No | Element M | Amount Added (mol %) | Temperature · Humidity (° C. · %) | Preliminary Baking Atmosphere | Main Baking · Annealing Atmosphere | Discharge Performance Discharge 400 mA at 0° C. (mAh) | 4000 mA at 0° C. (mAh) | Internal Short Circuit Safety 60° C. · Crush Speed 5 mm/Sec Highest Temperature Reached (° C.) |
|---|---|---|---|---|---|---|---|---|
| Ex. H1 | Ta | 0.5 | 25 · 55 | Dry Air | Oxygen | 2005 | 1904 | 67 |
| Ex. H2 | | 2.0 | | | | 2004 | 1905 | 64 |
| Ex. H3 | Al | 0.5 | | | | 2003 | 1904 | 65 |
| Ex. H4 | | 2.0 | | | | 2000 | 1903 | 64 |
| Ex. H5 | Zr | 0.5 | | | | 2002 | 1902 | 64 |
| Ex. H6 | | 2.0 | | | | 2004 | 1904 | 68 |
| Ex. H7 | Mg | 0.5 | | | | 2006 | 1900 | 61 |
| Ex. H8 | | 2.0 | | | | 2004 | 1903 | 62 |
| Ex. H9 | In | 0.5 | | | | 2003 | 1905 | 67 |

TABLE 8A-continued

First Lithium-Nickel Composite Oxide: $LiNi_{0.80}Co_{0.15}Al_{0.03}Mg_{0.02}O_2$

| Battery No | Element M | Amount Added (mol %) | Temperature · Humidity (° C. · %) | Preliminary Baking Atmosphere | Main Baking · Annealing Atmosphere | Discharge Performance Discharge 400 mA at 0° C. (mAh) | Discharge Performance Discharge 4000 mA at 0° C. (mAh) | Internal Short Circuit Safety 60° C. · Crush Speed 5 mm/Sec Highest Temperature Reached (° C.) |
|---|---|---|---|---|---|---|---|---|
| Ex. H10 |  | 2.0 |  |  |  | 2008 | 1902 | 64 |
| Ex. H11 | Sn | 0.5 |  |  |  | 2004 | 1904 | 62 |
| Ex. H12 |  | 2.0 |  |  |  | 2006 | 1905 | 62 |
| Ex. H13 | Mn | 0.5 |  |  |  | 2004 | 1904 | 63 |
| Ex. H14 |  | 2.0 |  |  |  | 2005 | 1905 | 64 |
| Ex. H15 | B | 0.5 |  |  |  | 2002 | 1906 | 67 |
| Ex. H16 |  | 2.0 |  |  |  | 2000 | 1903 | 62 |
| Ex. H17 | W | 0.5 |  |  |  | 2001 | 1901 | 69 |
| Ex. H18 |  | 2.0 |  |  |  | 2003 | 1901 | 67 |
| Ex. H19 | Nb | 0.5 |  |  |  | 2004 | 1904 | 65 |
| Ex. H20 |  | 2.0 |  |  |  | 2005 | 1902 | 61 |
| Ex. H21 | Mo | 0.5 |  |  |  | 2006 | 1905 | 62 |
| Ex. H22 |  | 2.0 |  |  |  | 2004 | 1903 | 64 |
| Ex. H23 | Ta | 2.5 |  |  |  | 2002 | 1705 | 65 |
| Ex. H24 | Al |  |  |  |  | 2000 | 1702 | 63 |
| Ex. H25 | Zr |  |  |  |  | 2006 | 1704 | 64 |
| Ex. H26 | Mg |  |  |  |  | 2004 | 1705 | 66 |
| Ex. H27 | In |  |  |  |  | 2005 | 1706 | 66 |
| Ex. H28 | Sn |  |  |  |  | 2004 | 1709 | 66 |
| Ex. H29 | Mn |  |  |  |  | 2003 | 1705 | 67 |
| Ex. H30 | B |  |  |  |  | 2005 | 1701 | 62 |
| Ex. H31 | W |  |  |  |  | 2004 | 1700 | 63 |
| Ex. H32 | Nb |  |  |  |  | 2006 | 1705 | 64 |
| Ex. H33 | Mo |  |  |  |  | 2004 | 1704 | 65 |
| Ex. H34 | Ta | 0.5 | 60 · 55 |  |  | 1780 | 1610 | 62 |
| Ex. H35 | Al |  |  |  |  | 1778 | 1620 | 60 |
| Ex. H36 | Zr |  |  |  |  | 1778 | 1640 | 60 |
| Ex. H37 | Mg |  |  |  |  | 1772 | 1670 | 62 |
| Ex. H38 | In |  |  |  |  | 1772 | 1650 | 62 |
| Ex. H39 | Sn |  |  |  |  | 1777 | 1620 | 63 |
| Ex. H40 | Mn |  |  |  |  | 1778 | 1640 | 62 |
| Ex. H41 | B |  |  |  |  | 1776 | 1650 | 61 |
| Ex. H42 | W |  |  |  |  | 1777 | 1670 | 63 |
| Ex. H43 | Nb |  |  |  |  | 1775 | 1640 | 64 |
| Ex. H44 | Mo |  |  |  |  | 1778 | 1650 | 62 |

TABLE 8B

First Lithium-Nickel Composite Oxide: $LiNi_{0.80}Co_{0.15}Al_{0.03}Mg_{0.02}O_2$

| Battery No | Element M | Amount Added (mol %) | Temperature · Humidity (° C. · %) | Preliminary Baking Atmosphere | Main Baking · Annealing Atmosphere | Discharge Performance Discharge 400 mA at 0° C. (mAh) | Discharge Performance Discharge 4000 mA at 0° C. (mAh) | Internal Short Circuit Safety 60° C. · Crush Speed 5 mm/Sec Highest Temperature Reached (° C.) |
|---|---|---|---|---|---|---|---|---|
| Comp. Ex. h1 | Ta | 0.5 | 25 · 20 | Dry Air | Oxygen | 2000 | 1904 | 125 |
| Comp. Ex. h2 | Al |  |  |  |  | 2002 | 1902 | 120 |
| Comp. Ex. h3 | Zr |  |  |  |  | 2005 | 1904 | 124 |
| Comp. Ex. h4 | Mg |  |  |  |  | 2004 | 1905 | 123 |
| Comp. Ex. h5 | In |  |  |  |  | 2003 | 1904 | 125 |
| Comp. Ex. h6 | Sn |  |  |  |  | 2005 | 1906 | 124 |
| Comp. Ex. h7 | Mn |  |  |  |  | 2004 | 1900 | 126 |
| Comp. Ex. h8 | B |  |  |  |  | 2001 | 1905 | 120 |
| Comp. Ex. h9 | W |  |  |  |  | 2003 | 1904 | 125 |
| Comp. Ex. h10 | Nb |  |  |  |  | 2006 | 1902 | 121 |
| Comp. Ex. h11 | Mo |  |  |  |  | 2005 | 1904 | 123 |
| Comp. Ex. h12 | Ta |  | 25 · 55 | Oxygen |  | 2003 | 1903 | 118 |
| Comp. Ex. h13 | Al |  |  |  |  | 2003 | 1904 | 115 |
| Comp. Ex. h14 | Zr |  |  |  |  | 2006 | 1905 | 114 |
| Comp. Ex. h15 | Mg |  |  |  |  | 2004 | 1904 | 116 |
| Comp. Ex. h16 | In |  |  |  |  | 2000 | 1903 | 114 |
| Comp. Ex. h17 | Sn |  |  |  |  | 2000 | 1904 | 118 |
| Comp. Ex. h18 | Mn |  |  |  |  | 2005 | 1900 | 119 |

TABLE 8B-continued

First Lithium-Nickel Composite Oxide: $LiNi_{0.80}Co_{0.15}Al_{0.03}Mg_{0.02}O_2$

| Battery No | Element M | Amount Added (mol %) | Environment to be Allowed to Stand Temperature · Humidity (° C. · %) | Preliminary Baking Atmosphere | Main Baking · Annealing Atmosphere | Discharge Performance Discharge 400 mA at 0° C. (mAh) | 4000 mA at 0° C. (mAh) | Internal Short Circuit Safety 60° C. · Crush Speed 5 mm/Sec Highest Temperature Reached (° C.) |
|---|---|---|---|---|---|---|---|---|
| Comp. Ex. h19 | B | | | | | 2003 | 1900 | 116 |
| Comp. Ex. h20 | W | | | | | 2001 | 1900 | 117 |
| Comp. Ex. h21 | Nb | | | | | 2005 | 1905 | 112 |
| Comp. Ex. h22 | Mo | | | | | 2004 | 1904 | 120 |
| Comp. Ex. h23 | Ta | | | Dry Air | Dry Air | 2003 | 1902 | 115 |
| Comp. Ex. h24 | Al | | | | | 2005 | 1902 | 110 |
| Comp. Ex. h25 | Zr | | | | | 2006 | 1903 | 115 |
| Comp. Ex. h26 | Mg | | | | | 2003 | 1904 | 114 |
| Comp. Ex. h27 | In | | | | | 2004 | 1905 | 118 |
| Comp. Ex. h28 | Sn | | | | | 2000 | 1904 | 119 |
| Comp. Ex. h29 | Mn | | | | | 2000 | 1904 | 119 |
| Comp. Ex. h30 | B | | | | | 2005 | 1900 | 116 |
| Comp. Ex. h31 | W | | | | | 2003 | 1901 | 114 |
| Comp. Ex. h32 | Nb | | | | | 2006 | 1900 | 115 |
| Comp. Ex. h33 | Mo | | | | | 2004 | 1900 | 118 |
| Comp. Ex. h34 | Not Added | — | 25 · 55 | | Oxygen | 1712 | 1605 | 62 |
| Comp. Ex. h35 | Not Added | 0.5 | | Not Carried Out | | 2005 | 1904 | 115 |
| Comp. Ex. h36 | | — | Mixed Gas of Nitrogen:Hydrogen = 95:5 (molar ratio) treated at 400° C. for 6 hours | | | 2002 | 1900 | 118 |
| Comp. Ex. h37 | | | Not Carried Out | | | 2002 | 1900 | 125 |

EXAMPLE 9

To 3 kg of a coprecipitated hydroxide of Ni—Co—Al prepared in the same manner as Example 7, 853 g of lithium hydroxide and 378 g of calcium hydroxide were mixed. The obtained mixture was baked under an atmosphere with an oxygen partial pressure of 0.5 atm at a synthesizing temperature of 750° C. for 10 hours, to obtain a first lithium-nickel composite oxide including Al and Ca as element Me (composition: $LiNi_{0.8}Co_{0.15}Al_{0.03}Ca_{0.02}O_2$).

Example Batteries I1 to I44 and Comparative Example Batteries i1 to i37 were made in the same manner as Example Batteries A1 to A44 and Comparative Example Batteries a1 to a37, respectively, except that this first lithium-nickel composite oxide was used as the raw material for the active material particles, and the evaluation was carried out in the same manner as Example 1. The results are shown in Tables 9A and 9B.

TABLE 9A

First Lithium-Nickel Composite Oxide: $LiNi_{0.80}Co_{0.15}Al_{0.03}Ca_{0.02}O_2$

| Battery No | Element M | Amount Added (mol %) | Environment to be Allowed to Stand Temperature · Humidity (° C. · %) | Preliminary Baking Atmosphere | Main Baking · Annealing Atmosphere | Discharge Performance Discharge 400 mA at 0° C. (mAh) | 4000 mA at 0° C. (mAh) | Internal Short Circuit Safety 60° C. · Crush Speed 5 mm/Sec Highest Temperature Reached (° C.) |
|---|---|---|---|---|---|---|---|---|
| Ex. I1 | Ta | 0.5 | 25 · 55 | Dry Air | Oxygen | 2005 | 1905 | 62 |
| Ex. I2 | | 2.0 | | | | 2000 | 1902 | 64 |
| Ex. I3 | Al | 0.5 | | | | 2002 | 1900 | 65 |
| Ex. I4 | | 2.0 | | | | 2005 | 1905 | 66 |
| Ex. I5 | Zr | 0.5 | | | | 2000 | 1904 | 68 |
| Ex. I6 | | 2.0 | | | | 2002 | 1903 | 64 |
| Ex. I7 | Mg | 0.5 | | | | 2004 | 1905 | 62 |
| Ex. I8 | | 2.0 | | | | 2005 | 1900 | 60 |
| Ex. I9 | In | 0.5 | | | | 2005 | 1902 | 64 |
| Ex. I10 | | 2.0 | | | | 2005 | 1905 | 68 |
| Ex. I11 | Sn | 0.5 | | | | 2002 | 1904 | 62 |
| Ex. I12 | | 2.0 | | | | 2004 | 1905 | 62 |
| Ex. I13 | Mn | 0.5 | | | | 2004 | 1904 | 64 |
| Ex. I14 | | 2.0 | | | | 2000 | 1902 | 67 |
| Ex. I15 | B | 0.5 | | | | 2002 | 1900 | 68 |
| Ex. I16 | | 2.0 | | | | 2005 | 1902 | 65 |
| Ex. I17 | W | 0.5 | | | | 2003 | 1905 | 62 |
| Ex. I18 | | 2.0 | | | | 2003 | 1904 | 64 |

TABLE 9A-continued

First Lithium-Nickel Composite Oxide: $LiNi_{0.80}Co_{0.15}Al_{0.03}Ca_{0.02}O_2$

| Battery No | Element M | Amount Added (mol %) | Environment to be Allowed to Stand Temperature · Humidity (° C. · %) | Preliminary Baking Atmosphere | Main Baking · Annealing Atmosphere | Discharge Performance Discharge 400 mA at 0° C. (mAh) | 4000 mA at 0° C. (mAh) | Internal Short Circuit Safety 60° C. · Crush Speed 5 mm/Sec Highest Temperature Reached (° C.) |
|---|---|---|---|---|---|---|---|---|
| Ex. I19 | Nb | 0.5 | | | | 2004 | 1904 | 62 |
| Ex. I20 | | 2.0 | | | | 2000 | 1900 | 62 |
| Ex. I21 | Mo | 0.5 | | | | 2002 | 1905 | 61 |
| Ex. I22 | | 2.0 | | | | 2005 | 1900 | 62 |
| Ex. I23 | Ta | 2.5 | | | | 2000 | 1705 | 67 |
| Ex. I24 | Al | | | | | 2005 | 1705 | 68 |
| Ex. I25 | Zr | | | | | 2000 | 1708 | 64 |
| Ex. I26 | Mg | | | | | 2000 | 1707 | 68 |
| Ex. I27 | In | | | | | 2005 | 1707 | 64 |
| Ex. I28 | Sn | | | | | 2002 | 1709 | 65 |
| Ex. I29 | Mn | | | | | 2004 | 1707 | 69 |
| Ex. I30 | B | | | | | 2002 | 1709 | 67 |
| Ex. I31 | W | | | | | 2000 | 1707 | 65 |
| Ex. I32 | Nb | | | | | 2000 | 1705 | 64 |
| Ex. I33 | Mo | | | | | 2002 | 1701 | 68 |
| Ex. I34 | Ta | 0.5 | 60 · 55 | | | 1785 | 1650 | 65 |
| Ex. I35 | Al | | | | | 1775 | 1670 | 64 |
| Ex. I36 | Zr | | | | | 1725 | 1680 | 65 |
| Ex. I37 | Mg | | | | | 1770 | 1670 | 67 |
| Ex. I38 | In | | | | | 1770 | 1675 | 67 |
| Ex. I39 | Sn | | | | | 1780 | 1672 | 62 |
| Ex. I40 | Mn | | | | | 1750 | 1678 | 64 |
| Ex. I41 | B | | | | | 1740 | 1682 | 64 |
| Ex. I42 | W | | | | | 1770 | 1668 | 68 |
| Ex. I43 | Nb | | | | | 1770 | 1680 | 68 |
| Ex. I44 | Mo | | | | | 1790 | 1678 | 62 |

TABLE 9B

First Lithium-Nickel Composite Oxide: $LiNi_{0.80}Co_{0.15}Al_{0.03}Ca_{0.02}O_2$

| Battery No | Element M | Amount Added (mol %) | Environment to be Allowed to Stand Temperature · Humidity (° C. · %) | Preliminary Baking Atmosphere | Main Baking · Annealing Atmosphere | Discharge Performance Discharge 400 mA at 0° C. (mAh) | 4000 mA at 0° C. (mAh) | Internal Short Circuit Safety 60° C. · Crush Speed 5 mm/Sec Highest Temperature Reached (° C.) |
|---|---|---|---|---|---|---|---|---|
| Comp. Ex. i1 | Ta | 0.5 | 25 · 20 | Dry Air | Oxygen | 2002 | 1902 | 125 |
| Comp. Ex. i2 | Al | | | | | 2004 | 1905 | 124 |
| Comp. Ex. i3 | Zr | | | | | 2002 | 1900 | 123 |
| Comp. Ex. i4 | Mg | | | | | 2002 | 1904 | 123 |
| Comp. Ex. i5 | In | | | | | 2000 | 1905 | 124 |
| Comp. Ex. i6 | Sn | | | | | 2005 | 1900 | 120 |
| Comp. Ex. i7 | Mn | | | | | 2004 | 1900 | 118 |
| Comp. Ex. i8 | B | | | | | 2005 | 1905 | 119 |
| Comp. Ex. i9 | W | | | | | 2004 | 1902 | 117 |
| Comp. Ex. i10 | Nb | | | | | 2004 | 1905 | 121 |
| Comp. Ex. i11 | Mo | | | | | 2004 | 1905 | 120 |
| Comp. Ex. i12 | Ta | | 25 · 55 | Oxygen | | 2002 | 1900 | 118 |
| Comp. Ex. i13 | Al | | | | | 2002 | 1904 | 120 |
| Comp. Ex. i14 | Zr | | | | | 2002 | 1904 | 122 |
| Comp. Ex. i15 | Mg | | | | | 2000 | 1905 | 123 |
| Comp. Ex. i16 | In | | | | | 2000 | 1904 | 124 |
| Comp. Ex. i17 | Sn | | | | | 2002 | 1902 | 125 |
| Comp. Ex. i18 | Mn | | | | | 2000 | 1900 | 125 |
| Comp. Ex. i19 | B | | | | | 2000 | 1901 | 124 |
| Comp. Ex. i20 | W | | | | | 2002 | 1902 | 119 |
| Comp. Ex. i21 | Nb | | | | | 2000 | 1903 | 119 |
| Comp. Ex. i22 | Mo | | | | | 2000 | 1903 | 120 |
| Comp. Ex. i23 | Ta | | | Dry Air | Dry Air | 2005 | 1905 | 118 |
| Comp. Ex. i24 | Al | | | | | 2004 | 1902 | 112 |
| Comp. Ex. i25 | Zr | | | | | 2002 | 1905 | 114 |
| Comp. Ex. i26 | Mg | | | | | 2000 | 1904 | 118 |
| Comp. Ex. i27 | In | | | | | 2003 | 1905 | 116 |

TABLE 9B-continued

First Lithium-Nickel Composite Oxide: $LiNi_{0.80}Co_{0.15}Al_{0.03}Ca_{0.02}O_2$

| Battery No | Element M | Amount Added (mol %) | Temperature · Humidity (° C. · %) | Preliminary Baking Atmosphere | Main Baking · Annealing Atmosphere | 400 mA at 0° C. (mAh) | 4000 mA at 0° C. (mAh) | Speed 5 mm/Sec Highest Temperature Reached (° C.) |
|---|---|---|---|---|---|---|---|---|
| Comp. Ex. i28 | Sn | | | | | 2003 | 1906 | 117 |
| Comp. Ex. i29 | Mn | | | | | 2005 | 1905 | 118 |
| Comp. Ex. i30 | B | | | | | 2004 | 1903 | 118 |
| Comp. Ex. i31 | W | | | | | 2005 | 1900 | 119 |
| Comp. Ex. i32 | Nb | | | | | 2002 | 1900 | 121 |
| Comp. Ex. i33 | Mo | | | | | 2000 | 1902 | 122 |
| Comp. Ex. i34 | Not Added | — | 25 · 55 | | Oxygen | 1715 | 1605 | 59 |
| Comp. Ex. i35 | Not Added | 0.5 | | Not Carried Out | | 2005 | 1904 | 120 |
| Comp. Ex. i36 | | — | | Mixed Gas of Nitrogen:Hydrogen = 95:5 (molar ratio) treated at 400° C. for 6 hours | | 2000 | 1900 | 115 |
| Comp. Ex. i37 | | | | Not Carried Out | | 2000 | 1905 | 129 |

EXAMPLE 10

To 3 kg of a coprecipitated hydroxide of Ni—Co—Al prepared in the same manner as Example 7, 853 g of lithium hydroxide and 378 g of titanium sulfate were mixed. The obtained mixture was baked under an atmosphere with an oxygen partial pressure of 0.5 atm, and at a synthesizing temperature of 750° C. for 10 hours, to obtain a first lithium-nickel composite oxide including Al and Ti as element Me (composition: $LiNi_{0.8}Co_{0.15}Al_{0.03}Ti_{0.02}O_2$).

Example Batteries J1 to J44 and Comparative Example Batteries j1 to j37 were made in the same manner as Example Batteries A1 to A44 and Comparative Example Batteries a1 to a37, respectively, except that this first lithium-nickel composite oxide was used as the raw material for the active material particles, and the evaluation was carried out in the same manner as Example 1. The results are shown in Tables 10A and 10B.

TABLE 10A

Lithium Composite Oxide: $LiNi_{0.80}Co_{0.15}Al_{0.03}Ti_{0.02}O_2$

| Battery No | Element M | Amount Added (mol %) | Temperature · Humidity (° C. · %) | Preliminary Baking Atmosphere | Main Baking · Annealing Atmosphere | 400 mA at 0° C. (mAh) | 4000 mA at 0° C. (mAh) | Speed 5 mm/Sec Highest Temperature Reached (° C.) |
|---|---|---|---|---|---|---|---|---|
| Ex. J1 | Ta | 0.5 | 25 · 55 | Dry Air | Oxygen | 2000 | 1905 | 64 |
| Ex. J2 | | 2.0 | | | | 2004 | 1902 | 62 |
| Ex. J3 | Al | 0.5 | | | | 2005 | 1903 | 64 |
| Ex. J4 | | 2.0 | | | | 2002 | 1904 | 65 |
| Ex. J5 | Zr | 0.5 | | | | 2000 | 1903 | 62 |
| Ex. J6 | | 2.0 | | | | 2003 | 1902 | 62 |
| Ex. J7 | Mg | 0.5 | | | | 2005 | 1902 | 60 |
| Ex. J8 | | 2.0 | | | | 2000 | 1904 | 60 |
| Ex. J9 | In | 0.5 | | | | 2000 | 1902 | 62 |
| Ex. J10 | | 2.0 | | | | 2002 | 1903 | 62 |
| Ex. J11 | Sn | 0.5 | | | | 2001 | 1904 | 61 |
| Ex. J12 | | 2.0 | | | | 2006 | 1905 | 63 |
| Ex. J13 | Mn | 0.5 | | | | 2003 | 1900 | 64 |
| Ex. J14 | | 2.0 | | | | 2004 | 1902 | 61 |
| Ex. J15 | B | 0.5 | | | | 2000 | 1903 | 62 |
| Ex. J16 | | 2.0 | | | | 2002 | 1900 | 60 |
| Ex. J17 | W | 0.5 | | | | 2002 | 1900 | 60 |
| Ex. J18 | | 2.0 | | | | 2004 | 1905 | 63 |
| Ex. J19 | Nb | 0.5 | | | | 2002 | 1904 | 65 |
| Ex. J20 | | 2.0 | | | | 2003 | 1900 | 64 |
| Ex. J21 | Mo | 0.5 | | | | 2006 | 1902 | 62 |
| Ex. J22 | | 2.0 | | | | 2005 | 1900 | 62 |
| Ex. J23 | Ta | 2.5 | | | | 2002 | 1705 | 60 |
| Ex. J24 | Al | | | | | 2004 | 1705 | 64 |
| Ex. J25 | Zr | | | | | 2005 | 1708 | 64 |
| Ex. J26 | Mg | | | | | 2002 | 1710 | 68 |
| Ex. J27 | In | | | | | 2000 | 1708 | 66 |

TABLE 10A-continued

Lithium Composite Oxide: $LiNi_{0.80}Co_{0.15}Al_{0.03}Ti_{0.02}O_2$

| Battery No | Element M | Amount Added (mol %) | Environment to be Allowed to Stand Temperature · Humidity (° C. · %) | Preliminary Baking Atmosphere | Main Baking · Annealing Atmosphere | Discharge Performance Discharge 400 mA at 0° C. (mAh) | Discharge Performance Discharge 4000 mA at 0° C. (mAh) | Internal Short Circuit Safety 60° C. · Crush Speed 5 mm/Sec Highest Temperature Reached (° C.) |
|---|---|---|---|---|---|---|---|---|
| Ex. J28 | Sn | | | | | 2002 | 1704 | 67 |
| Ex. J29 | Mn | | | | | 2004 | 1702 | 68 |
| Ex. J30 | B | | | | | 2006 | 1700 | 64 |
| Ex. J31 | W | | | | | 2003 | 1705 | 65 |
| Ex. J32 | Nb | | | | | 2002 | 1702 | 64 |
| Ex. J33 | Mo | | | | | 2002 | 1705 | 68 |
| Ex. J34 | Ta | 0.5 | 60 · 55 | | | 1780 | 1615 | 65 |
| Ex. J35 | Al | | | | | 1778 | 1625 | 64 |
| Ex. J36 | Zr | | | | | 1779 | 1637 | 62 |
| Ex. J37 | Mg | | | | | 1775 | 1650 | 68 |
| Ex. J38 | In | | | | | 1777 | 1625 | 67 |
| Ex. J39 | Sn | | | | | 1778 | 1620 | 65 |
| Ex. J40 | Mn | | | | | 1777 | 1650 | 62 |
| Ex. J41 | B | | | | | 1778 | 1630 | 64 |
| Ex. J42 | W | | | | | 1780 | 1640 | 68 |
| Ex. J43 | Nb | | | | | 1781 | 1650 | 67 |
| Ex. J44 | Mo | | | | | 1782 | 1640 | 68 |

TABLE 10B

First Lithium-Nickel Composite Oxide: $LiNi_{0.80}Co_{0.15}Al_{0.03}Ti_{0.02}O_2$

| Battery No | Element M | Amount Added (mol %) | Environment to be Allowed to Stand Temperature · Humidity (° C. · %) | Preliminary Baking Atmosphere | Main Baking · Annealing Atmosphere | Discharge Performance Discharge 400 mA at 0° C. (mAh) | Discharge Performance Discharge 4000 mA at 0° C. (mAh) | Internal Short Circuit Safety 60° C. · Crush Speed 5 mm/Sec Highest Temperature Reached (° C.) |
|---|---|---|---|---|---|---|---|---|
| Comp. Ex. j1 | Ta | 0.5 | 25 · 20 | Dry Air | Oxygen | 2000 | 1904 | 117 |
| Comp. Ex. j2 | Al | | | | | 2004 | 1905 | 115 |
| Comp. Ex. j3 | Zr | | | | | 2002 | 1904 | 120 |
| Comp. Ex. j4 | Mg | | | | | 2005 | 1900 | 120 |
| Comp. Ex. j5 | In | | | | | 2004 | 1905 | 115 |
| Comp. Ex. j6 | Sn | | | | | 2000 | 1900 | 117 |
| Comp. Ex. j7 | Mn | | | | | 2002 | 1902 | 117 |
| Comp. Ex. j8 | B | | | | | 2003 | 1902 | 115 |
| Comp. Ex. j9 | W | | | | | 2005 | 1900 | 117 |
| Comp. Ex. j10 | Nb | | | | | 2004 | 1905 | 112 |
| Comp. Ex. j11 | Mo | | | | | 2005 | 1900 | 115 |
| Comp. Ex. j12 | Ta | | 25 · 55 | Oxygen | | 2002 | 1904 | 114 |
| Comp. Ex. j13 | Al | | | | | 2002 | 1900 | 115 |
| Comp. Ex. j14 | Zr | | | | | 2000 | 1903 | 118 |
| Comp. Ex. j15 | Mg | | | | | 2005 | 1903 | 119 |
| Comp. Ex. j16 | In | | | | | 2002 | 1902 | 117 |
| Comp. Ex. j17 | Sn | | | | | 2004 | 1902 | 111 |
| Comp. Ex. j18 | Mn | | | | | 2003 | 1900 | 112 |
| Comp. Ex. j19 | B | | | | | 2002 | 1905 | 115 |
| Comp. Ex. j20 | W | | | | | 2002 | 1900 | 110 |
| Comp. Ex. j21 | Nb | | | | | 2000 | 1900 | 120 |
| Comp. Ex. j22 | Mo | | | | | 2000 | 1900 | 125 |
| Comp. Ex. j23 | Ta | | | Dry Air | Dry Air | 2004 | 1904 | 111 |
| Comp. Ex. j24 | Al | | | | | 2005 | 1900 | 117 |
| Comp. Ex. j25 | Zr | | | | | 2006 | 1905 | 115 |
| Comp. Ex. j26 | Mg | | | | | 2004 | 1900 | 111 |
| Comp. Ex. j27 | In | | | | | 2002 | 1900 | 112 |
| Comp. Ex. j28 | Sn | | | | | 2002 | 1905 | 115 |
| Comp. Ex. j29 | Mn | | | | | 2000 | 1904 | 111 |
| Comp. Ex. j30 | B | | | | | 2003 | 1902 | 111 |
| Comp. Ex. j31 | W | | | | | 2005 | 1900 | 115 |
| Comp. Ex. j32 | Nb | | | | | 2002 | 1904 | 117 |
| Comp. Ex. j33 | Mo | | | | | 2002 | 1907 | 117 |
| Comp. Ex. j34 | Not Added | — | 25 · 55 | | Oxygen | 1710 | 1607 | 67 |
| Comp. Ex. j35 | Not Added | 0.5 | | Not Carried Out | | 2005 | 1907 | 117 |

TABLE 10B-continued

First Lithium-Nickel Composite Oxide: $LiNi_{0.80}Co_{0.15}Al_{0.03}Ti_{0.02}O_2$

| Battery No | Element M | Amount Added (mol %) | Temperature · Humidity (° C. · %) | Preliminary Baking Atmosphere | Main Baking · Annealing Atmosphere | Discharge Performance Discharge 400 mA at 0° C. (mAh) | Discharge Performance Discharge 4000 mA at 0° C. (mAh) | Internal Short Circuit Safety 60° C. · Crush Speed 5 mm/Sec Highest Temperature Reached (° C.) |
|---|---|---|---|---|---|---|---|---|
| Comp. Ex. j36 | — | | Mixed Gas of Nitrogen:Hydrogen = 95:5 (molar ratio) treated at 400° C. for 6 hours | | | 2004 | 1907 | 115 |
| Comp. Ex. j37 | | | Not Carried Out | | | 2002 | 1907 | 124 |

The results in Table 2A to 10A, and in Tables 2B to 10B showed almost the same tendency with the case of Example 1.

COMPARATIVE EXAMPLE 1

A first lithium-nickel composite oxide having a composition of $LiNi_{0.20}Co_{0.50}Al_{0.30}O_2$ was obtained by using nickel sulfate, cobalt sulfate, and aluminum sulfate so that a molar ratio of Ni atoms, Co atoms, and Al atoms was 20:50:30 upon synthesizing the first lithium-nickel composite oxide. Comparative Example Batteries k1 to k81 were prepared in the same manner as Example Batteries A1 to 44 and Comparative Example Batteries a1 to 37, respectively, except that this first lithium-nickel composite oxide was used as the raw material for the active material particles, and the evaluation was carried out in the same manner as Example 1. The results are shown in Tables 11A and 11B.

TABLE 11A

First Lithium-Nickel Composite Oxide: $LiNi_{0.20}Co_{0.50}Al_{0.30}O_2$

| Battery No | Element M | Amount Added (mol %) | Temperature · Humidity (° C. · %) | Preliminary Baking Atmosphere | Main Baking-Annealing Atmosphere | Discharge Performance Discharge 400 mA at 0° C. (mAh) | Discharge Performance Discharge 4000 mA at 0° C. (mAh) | Internal Short Circuit Safety 60° C.-Crush Speed 5 mm/Sec Highest Temperature Reached (° C.) |
|---|---|---|---|---|---|---|---|---|
| Comp. Ex. k1 | Ta | 0.5 | 25 · 55 | Dry Air | Oxygen | 1800 | 1710 | 117 |
| Comp. Ex. k2 |  | 2.0 | | | | 1805 | 1720 | 115 |
| Comp. Ex. k3 | Al | 0.5 | | | | 1804 | 1715 | 117 |
| Comp. Ex. k4 |  | 2.0 | | | | 1805 | 1710 | 112 |
| Comp. Ex. k5 | Zr | 0.5 | | | | 1802 | 1710 | 115 |
| Comp. Ex. k6 |  | 2.0 | | | | 1800 | 1712 | 117 |
| Comp. Ex. k7 | Mg | 0.5 | | | | 1810 | 1715 | 120 |
| Comp. Ex. k8 |  | 2.0 | | | | 1805 | 1709 | 118 |
| Comp. Ex. k9 | In | 0.5 | | | | 1800 | 1708 | 117 |
| Comp. Ex. k10 |  | 2.0 | | | | 1800 | 1710 | 110 |
| Comp. Ex. k11 | Sn | 0.5 | | | | 1801 | 1710 | 112 |
| Comp. Ex. k12 |  | 2.0 | | | | 1810 | 1712 | 113 |
| Comp. Ex. k13 | Mn | 0.5 | | | | 1805 | 1715 | 115 |
| Comp. Ex. k14 |  | 2.0 | | | | 1805 | 1715 | 110 |
| Comp. Ex. k15 | B | 0.5 | | | | 1800 | 1715 | 120 |
| Comp. Ex. k16 |  | 2.0 | | | | 1805 | 1712 | 118 |
| Comp. Ex. k17 | W | 0.5 | | | | 1805 | 1710 | 117 |
| Comp. Ex. k18 |  | 2.0 | | | | 1810 | 1715 | 117 |
| Comp. Ex. k19 | Nb | 0.5 | | | | 1815 | 1710 | 115 |
| Comp. Ex. k20 |  | 2.0 | | | | 1805 | 1705 | 115 |
| Comp. Ex. k21 | Mo | 0.5 | | | | 1805 | 1700 | 120 |
| Comp. Ex. k22 |  | 2.0 | | | | 1815 | 1715 | 120 |
| Comp. Ex. k23 | Ta | 2.5 | | | | 1800 | 1530 | 117 |
| Comp. Ex. k24 | Al | | | | | 1800 | 1535 | 120 |
| Comp. Ex. k25 | Zr | | | | | 1805 | 1540 | 118 |
| Comp. Ex. k26 | Mg | | | | | 1807 | 1535 | 119 |
| Comp. Ex. k27 | In | | | | | 1806 | 1530 | 115 |
| Comp. Ex. k28 | Sn | | | | | 1805 | 1530 | 116 |
| Comp. Ex. k29 | Mn | | | | | 1807 | 1532 | 112 |
| Comp. Ex. k30 | B | | | | | 1806 | 1533 | 100 |
| Comp. Ex. k31 | W | | | | | 1800 | 1540 | 100 |
| Comp. Ex. k32 | Nb | | | | | 1805 | 1530 | 120 |
| Comp. Ex. k33 | Mo | | | | | 1806 | 1530 | 110 |

TABLE 11A-continued

First Lithium-Nickel Composite Oxide: $LiNi_{0.20}Co_{0.50}Al_{0.30}O_2$

| Battery No | Element M | Amount Added (mol %) | Environment to be Allowed to Stand Temperature · Humidity (° C. · %) | Preliminary Baking Atmosphere | Main Baking-Annealing Atmosphere | Discharge Performance Discharge 400 mA at 0° C. (mAh) | Discharge Performance Discharge 4000 mA at 0° C. (mAh) | Internal Short Circuit Safety 60° C.- Crush Speed 5 mm/Sec Highest Temperature Reached (° C.) |
|---|---|---|---|---|---|---|---|---|
| Comp. Ex. k34 | Ta | 0.5 | 60 · 55 | | | 1805 | 1620 | 105 |
| Comp. Ex. k35 | Al | | | | | 1803 | 1625 | 100 |
| Comp. Ex. k36 | Zr | | | | | 1804 | 1610 | 110 |
| Comp. Ex. k37 | Mg | | | | | 1805 | 1605 | 112 |
| Comp. Ex. k38 | In | | | | | 1818 | 1605 | 105 |
| Comp. Ex. k39 | Sn | | | | | 1810 | 1600 | 106 |
| Comp. Ex. k40 | Mn | | | | | 1810 | 1620 | 110 |
| Comp. Ex. k41 | B | | | | | 1805 | 1622 | 110 |
| Comp. Ex. k42 | W | | | | | 1805 | 1600 | 105 |
| Comp. Ex. k43 | Nb | | | | | 1800 | 1600 | 120 |
| Comp. Ex. k44 | Mo | | | | | 1804 | 1610 | 116 |

TABLE 11B

First Lithium-Nickel Composite Oxide: $LiNi_{0.20}Co_{0.50}Al_{0.30}O_2$

| Battery No | Element M | Amount Added (mol %) | Environment to be Allowed to Stand Temperature · Humidity (° C. · %) | Preliminary Baking Atmosphere | Main Baking-Annealing Atmosphere | Discharge Performance Discharge 400 mA at 0° C. (mAh) | Discharge Performance Discharge 4000 mA at 0° C. (mAh) | Internal Short Circuit Safety 60° C.- Crush Speed 5 mm/Sec Highest Temperature Reached (° C.) |
|---|---|---|---|---|---|---|---|---|
| Comp. Ex. k45 | Ta | 0.5 | 25 · 20 | Dry Air | Oxygen | 1800 | 1710 | 120 |
| Comp. Ex. k46 | Al | | | | | 1805 | 1715 | 120 |
| Comp. Ex. k47 | Zr | | | | | 1804 | 1710 | 115 |
| Comp. Ex. k48 | Mg | | | | | 1802 | 1712 | 115 |
| Comp. Ex. k49 | In | | | | | 1802 | 1712 | 110 |
| Comp. Ex. k50 | Sn | | | | | 1805 | 1710 | 120 |
| Comp. Ex. k51 | Mn | | | | | 1804 | 1715 | 120 |
| Comp. Ex. k52 | B | | | | | 1802 | 1710 | 122 |
| Comp. Ex. k53 | W | | | | | 1802 | 1715 | 125 |
| Comp. Ex. k54 | Nb | | | | | 1805 | 1711 | 118 |
| Comp. Ex. k55 | Mo | | | | | 1805 | 1710 | 118 |
| Comp. Ex. k56 | Ta | | 25 · 55 | Oxygen | | 1805 | 1717 | 122 |
| Comp. Ex. k57 | Al | | | | | 1802 | 1717 | 123 |
| Comp. Ex. k58 | Zr | | | | | 1803 | 1717 | 124 |
| Comp. Ex. k59 | Mg | | | | | 1805 | 1715 | 122 |
| Comp. Ex. k60 | In | | | | | 1805 | 1710 | 120 |
| Comp. Ex. k61 | Sn | | | | | 1802 | 1712 | 125 |
| Comp. Ex. k62 | Mn | | | | | 1810 | 1715 | 124 |
| Comp. Ex. k63 | B | | | | | 1805 | 1712 | 125 |
| Comp. Ex. k64 | W | | | | | 1807 | 1710 | 123 |
| Comp. Ex. k65 | Nb | | | | | 1800 | 1710 | 122 |
| Comp. Ex. k66 | Mo | | | | | 1800 | 1710 | 122 |
| Comp. Ex. k67 | Ta | | | Dry Air | Dry Air | 1801 | 1710 | 115 |
| Comp. Ex. k68 | Al | | | | | 1805 | 1710 | 115 |
| Comp. Ex. k69 | Zr | | | | | 1807 | 1712 | 112 |
| Comp. Ex. k70 | Mg | | | | | 1801 | 1715 | 110 |
| Comp. Ex. k71 | In | | | | | 1805 | 1715 | 111 |
| Comp. Ex. k72 | Sn | | | | | 1806 | 1712 | 112 |
| Comp. Ex. k73 | Mn | | | | | 1800 | 1712 | 117 |
| Comp. Ex. k74 | B | | | | | 1800 | 1710 | 115 |
| Comp. Ex. k75 | W | | | | | 1800 | 1715 | 115 |
| Comp. Ex. k76 | Nb | | | | | 1805 | 1715 | 120 |
| Comp. Ex. k77 | Mo | | | | | 1800 | 1718 | 115 |
| Comp. Ex. k78 | Not Added | — | 25 · 55 | | Oxygen | 1800 | 1600 | 115 |

TABLE 11B-continued

First Lithium-Nickel Composite Oxide: $LiNi_{0.20}Co_{0.50}Al_{0.30}O_2$

| Battery No | Element M | Amount Added (mol %) | Environment to be Allowed to Stand Temperature · Humidity (° C. · %) | Preliminary Baking Atmosphere | Main Baking-Annealing Atmosphere | Discharge Performance Discharge 400 mA at 0° C. (mAh) | 4000 mA at 0° C. (mAh) | Internal Short Circuit Safety 60° C.- Crush Speed 5 mm/Sec Highest Temperature Reached (° C.) |
|---|---|---|---|---|---|---|---|---|
| Comp. Ex. k79 | Not | 0.5 | | Not Carried Out | | 1802 | 1710 | 120 |
| Comp. Ex. k80 | Added | — | | Mixed Gas of Nitrogen:Hydrogen = 95:5 treated at 400° C. for 6 hours | | 1800 | 1710 | 120 |
| Comp. Ex. k81 | | | | Not Carried Out | | 1810 | 1715 | 135 |

No generation of $Ni_{1-\delta}O$ was confirmed as the active material particles of each battery were analyzed. The results of Tables 7A and 7B show that in the first lithium-nickel composite oxide represented by the general formula $Li_xNi_{1-y-z}Co_yMe_zO_2$, when y+z exceeds 0.75, $Ni_{1-\delta}O$ ($0 \leqq \delta$) is not generated and great amount of heat generates in the crush test.

COMPARATIVE EXAMPLE 2

Comparative Example Batteries l1 to l81 were made in the same manner as Example Batteries A1 to A44 and Comparative Example Batteries a1 to a37, respectively, except that instead of the first lithium-nickel composite oxide, $LiNiO_2$ was used for the raw material of the active material particles, and the evaluation was carried out in the same manner as Example 1. The results are shown in Tables 12A and 12B.

TABLE 12A

First Lithium-Nickel Composite Oxide: $LiNiO_2$

| Battery No | Element M | Amount Added (mol %) | Environment to be Allowed to Stand Temperature · Humidity (° C. · %) | Preliminary Baking Atmosphere | Main Baking-Annealing Atmosphere | Discharge Performance Discharge 400 mA at 0° C. (mAh) | 4000 mA at 0° C. (mAh) | Internal Short Circuit Safety 60° C.- Crush Speed 5 mm/Sec Highest Temperature Reached (° C.) |
|---|---|---|---|---|---|---|---|---|
| Comp. Ex. l1 | Ta | 0.5 | 25 · 55 | Dry Air | Oxygen | 1800 | 1710 | 117 |
| Comp. Ex. l2 | | 2.0 | | | | 1805 | 1720 | 115 |
| Comp. Ex. l3 | Al | 0.5 | | | | 1804 | 1715 | 117 |
| Comp. Ex. l4 | | 2.0 | | | | 1805 | 1710 | 112 |
| Comp. Ex. l5 | Zr | 0.5 | | | | 1802 | 1710 | 115 |
| Comp. Ex. l6 | | 2.0 | | | | 1800 | 1712 | 117 |
| Comp. Ex. l7 | Mg | 0.5 | | | | 1810 | 1715 | 120 |
| Comp. Ex. l8 | | 2.0 | | | | 1805 | 1709 | 118 |
| Comp. Ex. l9 | In | 0.5 | | | | 1800 | 1708 | 117 |
| Comp. Ex. l10 | | 2.0 | | | | 1800 | 1710 | 110 |
| Comp. Ex. l11 | Sn | 0.5 | | | | 1801 | 1710 | 112 |
| Comp. Ex. l12 | | 2.0 | | | | 1810 | 1712 | 113 |
| Comp. Ex. l13 | Mn | 0.5 | | | | 1805 | 1715 | 115 |
| Comp. Ex. l14 | | 2.0 | | | | 1805 | 1715 | 110 |
| Comp. Ex. l15 | B | 0.5 | | | | 1800 | 1715 | 120 |
| Comp. Ex. l16 | | 2.0 | | | | 1805 | 1712 | 118 |
| Comp. Ex. l17 | W | 0.5 | | | | 1805 | 1710 | 117 |
| Comp. Ex. l18 | | 2.0 | | | | 1810 | 1715 | 117 |
| Comp. Ex. l19 | Nb | 0.5 | | | | 1800 | 1710 | 120 |
| Comp. Ex. l20 | | 2.0 | | | | 1808 | 1715 | 115 |
| Comp. Ex. l21 | Ma | 0.5 | | | | 1810 | 1715 | 112 |
| Comp. Ex. l22 | | 2.0 | | | | 1810 | 1710 | 115 |
| Comp. Ex. l23 | Ta | 2.5 | | | | 1800 | 1530 | 117 |
| Comp. Ex. l24 | Al | | | | | 1800 | 1535 | 120 |
| Comp. Ex. l25 | Zr | | | | | 1805 | 1540 | 118 |

TABLE 12A-continued

First Lithium-Nickel Composite Oxide: LiNiO$_2$

| Battery No | Element M | Amount Added (mol %) | Environment to be Allowed to Stand Temperature · Humidity (° C. · %) | Preliminary Baking Atmosphere | Main Baking-Annealing Atmosphere | Discharge Performance Discharge 400 mA at 0° C. (mAh) | Discharge Performance Discharge 4000 mA at 0° C. (mAh) | Internal Short Circuit Safety 60° C.-Crush Speed 5 mm/Sec Highest Temperature Reached (° C.) |
|---|---|---|---|---|---|---|---|---|
| Comp. Ex. 126 | Mg | | | | | 1807 | 1535 | 119 |
| Comp. Ex. 127 | In | | | | | 1806 | 1530 | 115 |
| Comp. Ex. 128 | Sn | | | | | 1805 | 1530 | 116 |
| Comp. Ex. 129 | Mn | | | | | 1807 | 1532 | 112 |
| Comp. Ex. 130 | B | | | | | 1806 | 1533 | 100 |
| Comp. Ex. 131 | W | | | | | 1800 | 1540 | 100 |
| Comp. Ex. 132 | Nb | | | | | 1805 | 1530 | 120 |
| Comp. Ex. 133 | Mo | | | | | 1800 | 1530 | 115 |
| Comp. Ex. 134 | Ta | 0.5 | 60 · 55 | | | 1805 | 1620 | 105 |
| Comp. Ex. 135 | Al | | | | | 1803 | 1625 | 100 |
| Comp. Ex. 136 | Zr | | | | | 1804 | 1610 | 110 |
| Comp. Ex. 137 | Mg | | | | | 1805 | 1605 | 112 |
| Comp. Ex. 138 | In | | | | | 1818 | 1605 | 105 |
| Comp. Ex. 139 | Sn | | | | | 1810 | 1600 | 106 |
| Comp. Ex. 140 | Mn | | | | | 1810 | 1620 | 110 |
| Comp. Ex. 141 | B | | | | | 1805 | 1622 | 110 |
| Comp. Ex. 142 | W | | | | | 1805 | 1600 | 105 |
| Comp. Ex. 143 | Nb | | | | | 1810 | 1620 | 115 |
| Comp. Ex. 144 | Mo | | | | | 1808 | 1610 | 110 |

TABLE 12B

First Lithium-Nickel Composite Oxide: LiNiO$_2$

| Battery No | Element M | Amount Added (mol %) | Environment to be Allowed to Stand Temperature · Humidity (° C. · %) | Preliminary Baking Atmosphere | Main Baking-Annealing Atmosphere | Discharge Performance Discharge 400 mA at 0° C. (mAh) | Discharge Performance Discharge 4000 mA at 0° C. (mAh) | Internal Short Circuit Safety 60° C.-Crush Speed 5 mm/Sec Highest Temperature Reached (° C.) |
|---|---|---|---|---|---|---|---|---|
| Comp. Ex. 145 | Ta | 0.5 | 25 · 20 | Dry Air | Oxygen | 1800 | 1710 | 120 |
| Comp. Ex. 146 | Al | | | | | 1805 | 1715 | 120 |
| Comp. Ex. 147 | Zr | | | | | 1804 | 1710 | 115 |
| Comp. Ex. 148 | Mg | | | | | 1802 | 1712 | 115 |
| Comp. Ex. 149 | In | | | | | 1802 | 1712 | 110 |
| Comp. Ex. 150 | Sn | | | | | 1805 | 1710 | 120 |
| Comp. Ex. 151 | Mn | | | | | 1804 | 1715 | 120 |
| Comp. Ex. 152 | B | | | | | 1802 | 1710 | 122 |
| Comp. Ex. 153 | W | | | | | 1802 | 1715 | 125 |
| Comp. Ex. 154 | Nb | | | | | 1805 | 1710 | 125 |
| Comp. Ex. 155 | Mo | | | | | 1800 | 1710 | 115 |
| Comp. Ex. 156 | Ta | | 25 · 55 | Oxygen | | 1805 | 1717 | 122 |
| Comp. Ex. 157 | Al | | | | | 1802 | 1717 | 123 |
| Comp. Ex. 158 | Zr | | | | | 1803 | 1717 | 124 |
| Comp. Ex. 159 | Mg | | | | | 1805 | 1715 | 122 |
| Comp. Ex. 160 | In | | | | | 1805 | 1710 | 120 |
| Comp. Ex. 161 | Sn | | | | | 1802 | 1712 | 125 |
| Comp. Ex. 162 | Mn | | | | | 1810 | 1715 | 124 |
| Comp. Ex. 163 | B | | | | | 1805 | 1712 | 125 |
| Comp. Ex. 164 | W | | | | | 1807 | 1710 | 123 |
| Comp. Ex. 165 | Nb | | | | | 1802 | 1710 | 120 |

TABLE 12B-continued

First Lithium-Nickel Composite Oxide: LiNiO₂

| | | | Environment to be Allowed to Stand | | | Discharge Performance Discharge | | Internal Short Circuit Safety 60° C.- Crush Speed 5 mm/Sec Highest |
|---|---|---|---|---|---|---|---|---|
| Battery No | Element M | Amount Added (mol %) | Temperature · Humidity (° C. · %) | Preliminary Baking Atmosphere | Main Baking-Annealing Atmosphere | 400 mA at 0° C. (mAh) | 4000 mA at 0° C. (mAh) | Temperature Reached (° C.) |
| Comp. Ex. 166 | Mo | | | | | 1805 | 1715 | 122 |
| Comp. Ex. 167 | Ta | | | Dry Air | Dry Air | 1801 | 1710 | 115 |
| Comp. Ex. 168 | Al | | | | | 1805 | 1710 | 115 |
| Comp. Ex. 169 | Zr | | | | | 1807 | 1712 | 112 |
| Comp. Ex. 170 | Mg | | | | | 1801 | 1715 | 110 |
| Comp. Ex. 171 | In | | | | | 1805 | 1715 | 111 |
| Comp. Ex. 172 | Sn | | | | | 1806 | 1712 | 112 |
| Comp. Ex. 173 | Mn | | | | | 1800 | 1712 | 117 |
| Comp. Ex. 174 | B | | | | | 1800 | 1710 | 115 |
| Comp. Ex. 175 | W | | | | | 1800 | 1715 | 115 |
| Comp. Ex. 176 | Nb | | | | | 1805 | 1710 | 118 |
| Comp. Ex. 177 | Mo | | | | | 1800 | 1715 | 117 |
| Comp. Ex. 178 | Not Added | — | 25 · 55 | | Oxygen | 1800 | 1600 | 115 |
| Comp. Ex. 179 | Not | 0.5 | | Not Carried Out | | 1802 | 1710 | 120 |
| Comp. Ex. 180 | Added | — | | Mixed Gas of Nitrogen:Hydrogen = 95:5 (molar ratio) treated at 400° C. for 6 hours | | 1800 | 1710 | 120 |
| Comp. Ex. 181 | | | | Not Carried Out | | 1810 | 1715 | 135 |

The results of Tables 12A and 12B show that when LiNiO₂ was used, the discharge capacity becomes small though $Ni_{1-\delta}O$ $(0 \leq \delta)$ was produced.

When Z was greater than 0.5 in $LiNi_{1-y-z}Co_yMe_xO_2$, homogeneous solid solution could not be obtained.

EXAMPLE 11

Example Batteries M1 to M44 and Comparative Example Batteries m1 to m14 were made in the same manner as Example Batteries A1 to A44 and Comparative Example Batteries a1 to a11, a34, a36, and a37, respectively, except that the synthesizing the first lithium-nickel composite oxide and synthesizing the active material particles were carried out as below, and the evaluation was carried out in the same manner as Example 1. The results are shown in Table 13.

(i) Synthesis of First Lithium-Nickel Composite Oxide

A first lithium-nickel composite oxide including excessive lithium ($Li_{1.03}Ni_{0.8}Co_{0.15}Al_{0.05}O_2$) was obtained in the same manner as Example 1, except that the amount of lithium hydroxide to be mixed with 3 kg of the coprecipitated hydroxide of Ni—Co—Al was increased to 800 g.

(ii) Synthesis of Active Material Particles

In the Case of Example Batteries M1 to M44 and Comparative Example Batteries m1 to m12

Active material particles were synthesized in the same manner as Example Batteries A1 to A44 and Comparative Example Batteries a1 to a11, and a34 of Example 1, except that the third step was carried out as in below. In the third step, the first lithium-nickel composite oxide with NiOOH formed on the surface thereof was baked at 650° C. for 6 hours, under 100% oxygen atmosphere (pressure 101 KPa). By this baking, NiOOH on the surface of the first lithium-nickel composite oxide reacted with the excessive Li to be converted to a second lithium-nickel composite oxide including a domain having the NaCl-type crystal structure. As a result, active material particles having a surface layer portion including element M and a second lithium-nickel composite oxide was obtained.

Presence of the second lithium-nickel composite oxide (a domain having the NaCl-type crystal structure) was confirmed by electron diffraction measurement. In Examples below as well, presence of the domain having the NaCl-type crystal structure in the active material particles was confirmed by electron diffraction measurement.

In the Case of Comparative Example Battery m13

Active material particles were synthesized in the same manner as Comparative Example Battery a36 in Example 1, except that a first lithium-nickel composite oxide including excessive lithium ($Li_{1.03}Ni_{0.8}Co_{0.15}Al_{0.05}O_2$) was used.

In the Case of Comparative Example Battery m14

Active material particles were synthesized in the same manner as Comparative Example Battery a37 of Example 1, except that a first lithium-nickel composite oxide including excessive lithium ($Li_{1.03}Ni_{0.8}Co_{0.15}Al_{0.05}O_2$) was used. That is, $Li_{1.03}Ni_{0.8}Co_{0.15}Al_{0.05}O_2$ as is was used as the positive electrode active material.

TABLE 13

First Lithium-Nickel Composite Oxide: $Li_{1.03}Ni_{0.80}Co_{0.15}Al_{0.05}O_2$

| Battery No | | Element M | Amount Added (mol %) | NaCl-type Crystal Structure Domain | Environment to be Allowed to Stand Temperature · Humidity (° C. · %) | Baking Atmosphere-Temperature | Discharge Performance Discharge 400 mA at 0° C. (mAh) | 4000 mA at 0° C. (mAh) | Internal Short Circuit Safety 60° C.- Crush Speed 5 mm/Sec Highest Temperature Reached (° C.) |
|---|---|---|---|---|---|---|---|---|---|
| Ex. | M1 | Ta | 0.5 | Present | 25 · 55 | Oxygen-650° C. | 1982 | 1901 | 71 |
| Ex. | M2 | | 2.0 | | | | 1984 | 1902 | 76 |
| Ex. | M3 | Al | 0.5 | | | | 1980 | 1902 | 72 |
| Ex. | M4 | | 2.0 | | | | 1989 | 1904 | 70 |
| Ex. | M5 | Zr | 0.5 | | | | 1988 | 1908 | 68 |
| Ex. | M6 | | 2.0 | | | | 1987 | 1908 | 62 |
| Ex. | M7 | Mg | 0.5 | | | | 1992 | 1909 | 71 |
| Ex. | M8 | | 2.0 | | | | 1991 | 1910 | 72 |
| Ex. | M9 | In | 0.5 | | | | 1991 | 1912 | 71 |
| Ex. | M10 | | 2.0 | | | | 1992 | 1915 | 66 |
| Ex. | M11 | Sn | 0.5 | | | | 1992 | 1910 | 70 |
| Ex. | M12 | | 2.0 | | | | 1991 | 1908 | 70 |
| Ex. | M13 | Mn | 0.5 | | | | 1988 | 1902 | 68 |
| Ex. | M14 | | 2.0 | | | | 1990 | 1901 | 75 |
| Ex. | M15 | B | 0.5 | | | | 1992 | 1902 | 71 |
| Ex. | M16 | | 2.0 | | | | 1994 | 1902 | 74 |
| Ex. | M17 | W | 0.5 | | | | 1992 | 1901 | 72 |
| Ex. | M18 | | 2.0 | | | | 1990 | 1905 | 72 |
| Ex. | M19 | Nb | 0.5 | | | | 1982 | 1904 | 71 |
| Ex. | M20 | | 2.0 | | | | 1988 | 1902 | 70 |
| Ex. | M21 | Mo | 0.5 | | | | 1991 | 1904 | 66 |
| Ex. | M22 | | 2.0 | | | | 1991 | 1906 | 71 |
| Ex. | M23 | Ta | 2.5 | | | | 1992 | 1800 | 75 |
| Ex. | M24 | Al | | | | | 1990 | 1802 | 77 |
| Ex. | M25 | Zr | | | | | 1988 | 1801 | 74 |
| Ex. | M26 | Mg | | | | | 1981 | 1800 | 72 |
| Ex. | M27 | In | | | | | 1984 | 1802 | 71 |
| Ex. | M28 | Sn | | | | | 1988 | 1800 | 65 |
| Ex. | M29 | Mn | | | | | 1989 | 1804 | 69 |
| Ex. | M30 | B | | | | | 1990 | 1805 | 72 |
| Ex. | M31 | W | | | | | 1991 | 1805 | 69 |
| Ex. | M32 | Nb | | | | | 1992 | 1804 | 72 |
| Ex. | M33 | Mo | | | | | 1992 | 1810 | 71 |
| Ex. | M34 | Ta | 0.5 | | 60 · 55 | | 1801 | 1700 | 71 |
| Ex. | M35 | Al | | | | | 1800 | 1689 | 70 |
| Ex. | M36 | Zr | | | | | 1805 | 1700 | 69 |
| Ex. | M37 | Mg | | | | | 1815 | 1710 | 69 |
| Ex. | M38 | In | | | | | 1802 | 1712 | 69 |
| Ex. | M39 | Sn | | | | | 1800 | 1715 | 71 |
| Ex. | M40 | Mn | | | | | 1804 | 1700 | 70 |
| Ex. | M41 | B | | | | | 1804 | 1702 | 72 |
| Ex. | M42 | W | | | | | 1805 | 1699 | 68 |
| Ex. | M43 | Nb | | | | | 1806 | 1698 | 69 |
| Ex. | M44 | Mo | | | | | 1805 | 1700 | 68 |
| Comp. Ex. | m1 | Ta | 0.5 | Absent | 25 · 20 | | 1991 | 1915 | 118 |
| Comp. Ex. | m2 | Al | | | | | 1992 | 1910 | 119 |
| Comp. Ex. | m3 | Zr | | | | | 1988 | 1915 | 121 |
| Comp. Ex. | m4 | Mg | | | | | 1991 | 1912 | 115 |
| Comp. Ex. | m5 | In | | | | | 1992 | 1900 | 116 |
| Comp. Ex. | m6 | Sn | | | | | 1988 | 1911 | 121 |
| Comp. Ex. | m7 | Mn | | | | | 1989 | 1907 | 120 |
| Comp. Ex. | m8 | B | | | | | 1989 | 1905 | 125 |
| Comp. Ex. | m9 | W | | | | | 1990 | 1901 | 124 |
| Comp. Ex. | m10 | Nb | | | | | 1990 | 1900 | 118 |
| Comp. Ex. | m11 | Mo | | | | | 1995 | 1900 | 119 |
| Comp. Ex. | m12 | Absent | — | Present | 25 · 55 | | 1750 | 1600 | 70 |
| Comp. Ex. | m13 | | | Absent | | Mixed Gas of Nitrogen:Hydrogen = 95:5 (molar ratio) treated at 400° C. for 6 hours | 2002 | 1900 | 120 |
| Comp. Ex. | m14 | | | | | Not Carried Out | 2004 | 1910 | 125 |

The evaluation results are shown below.

In Example Batteries M1 to M22, in which the surface layer portion includes element M and the second lithium-nickel composite oxide, and in which the amount of element M relative to the first lithium-nickel composite oxide is 0.5 mol % or 2 mol %, the heat generation was quite small in the crush test. In these batteries, the discharge capacity with 2 CmA discharge at 0° C. is the same level as that of Comparative Example Battery m14, in which the first lithium-nickel composite oxide was used as is.

In Example Batteries M23 to M33, in which the amount of element M relative to the first lithium-nickel composite oxide was 2.5 mol %, the discharge capacity with 2 CmA discharge at 0° C. declined. Probably due to the compound of element M included in the surface layer portion and the second lithium-nickel composite oxide not being electrochemically active, it became resistance.

In Example Batteries M34 to M44, in which a condition for allowing the first lithium-nickel composite oxide carrying element M before baking to stand was changed to give high temperature, the discharge capacity tended to become low. This is probably because the portion other than the side reaction active points of the first lithium-nickel composite oxide was converted to a domain having the NaCl-type crystal structure.

In Comparative Example Battery m12, in which the first lithium-nickel composite oxide baked after being allowed to stand without carrying element M at a temperature of 25° C. and a humidity of 55% for 24 hours, the discharge capacity was not sufficient. This is probably because absence of element M at the surface thereof caused the first lithium-nickel composite oxide to deteriorate.

In Comparative Example Batteries m1 to 11, in which a condition for allowing the first lithium-nickel composite oxide carrying element M before baking to stand was changed to give low humidity, a large degree of heat generation was caused in the crush test. This is probably because the domain having the NaCl-type crystal structure which inactivate the side reaction active points of the first lithium-nickel composite oxide was not produced.

In Comparative Example Battery m13, in which the positive electrode active material with the reduced layer formed on the first lithium-nickel composite oxide surface, the discharge capacity with 2 CmA (4000 mAh) discharge at 0° C. was not sufficient. This is probably because the first lithium-nickel composite oxide surface is covered with Ni or Co having low oxidation number and electrochemical activity.

The results above were the same as the case when the surface layer portion includes element M and $Ni_{1-\delta}O$ ($0 \leq \delta \leq 0.1$).

EXAMPLE 12

A first lithium-nickel composite oxide having a composition of $Li_{1.03}Ni_{0.9}Co_{0.07}Al_{0.03}O_2$ was obtained by using nickel sulfate, cobalt sulfate, and aluminum sulfate so that a molar ratio of Ni atoms, Co atoms, and Al atoms was 90:7:3 upon synthesizing the first lithium composite oxide. Example Batteries N1 to N44 and Comparative Example Batteries n1 to n14 were made in the same manner as Example Batteries M1 to M44 and Comparative Example Batteries m1 to m14, respectively, except that this first lithium-nickel composite oxide was used as the raw material for the active material particles, and the evaluation was carried out in the same manner as Example 1. The results are shown in Table 14.

TABLE 14

First Lithium-Nickel Composite Oxide: $Li_{1.03}Ni_{0.90}Co_{0.07}Al_{0.03}O_2$

| | Battery No | Element M | Amount Added (mol %) | NaCl-type Crystal Structure Domain | Environment to be Allowed to Stand Temperature · Humidity (° C. · %) | Baking Atmosphere-Temperature | Discharge Performance Discharge 400 mA at 0° C. (mAh) | 4000 mA at 0° C. (mAh) | Internal Short Circuit Safety 60° C.- Crush Speed 5 mm/Sec Highest Temperature Reached (° C.) |
|---|---|---|---|---|---|---|---|---|---|
| Ex. | N1 | Ta | 0.5 | Present | 25 · 55 | Oxygen-650° C. | 1995 | 1901 | 74 |
| EX. | N2 |    | 2.0 |         |         |                | 1997 | 1902 | 75 |
| Ex. | N3 | Al | 0.5 |         |         |                | 1992 | 1910 | 65 |
| Ex. | N4 |    | 2.0 |         |         |                | 1995 | 1901 | 72 |
| Ex. | N5 | Zr | 0.5 |         |         |                | 1989 | 1904 | 65 |
| Ex. | N6 |    | 2.0 |         |         |                | 1994 | 1904 | 71 |
| Ex. | N7 | Mg | 0.5 |         |         |                | 1989 | 1902 | 70 |
| Ex. | N8 |    | 2.0 |         |         |                | 1992 | 1905 | 72 |
| Ex. | N9 | In | 0.5 |         |         |                | 1994 | 1900 | 68 |
| Ex. | N10 |   | 2.0 |         |         |                | 1995 | 1900 | 69 |
| Ex. | N11 | Sn | 0.5 |        |         |                | 1992 | 1902 | 68 |
| Ex. | N12 |   | 2.0 |         |         |                | 1990 | 1905 | 70 |
| Ex. | N13 | Mn | 0.5 |        |         |                | 1990 | 1904 | 70 |
| Ex. | N14 |   | 2.0 |         |         |                | 1992 | 1910 | 69 |
| Ex. | N15 | B | 0.5 |         |         |                | 1990 | 1905 | 68 |
| Ex. | N16 |   | 2.0 |         |         |                | 1990 | 1902 | 62 |
| Ex. | N17 | W | 0.5 |         |         |                | 1995 | 1904 | 68 |
| Ex. | N18 |   | 2.0 |         |         |                | 1989 | 1902 | 69 |

TABLE 14-continued

First Lithium-Nickel Composite Oxide: $Li_{1.03}Ni_{0.90}Co_{0.07}Al_{0.03}O_2$

| Battery No | Element M | Amount Added (mol %) | NaCl-type Crystal Structure Domain | Environment to be Allowed to Stand Temperature · Humidity (° C. · %) | Baking Atmosphere-Temperature | Discharge Performance Discharge 400 mA at 0° C. (mAh) | Discharge Performance Discharge 4000 mA at 0° C. (mAh) | Internal Short Circuit Safety 60° C.- Crush Speed 5 mm/Sec Highest Temperature Reached (° C.) |
|---|---|---|---|---|---|---|---|---|
| Ex. N19 | Nb | 0.5 | | | | 1989 | 1906 | 66 |
| Ex. N20 | | 2.0 | | | | 1992 | 1904 | 65 |
| Ex. N21 | Mo | 0.5 | | | | 1991 | 1900 | 68 |
| Ex. N22 | | 2.0 | | | | 1990 | 1902 | 69 |
| Ex. N23 | Ta | 2.5 | | | | 1990 | 1805 | 67 |
| Ex. N24 | Al | | | | | 1990 | 1800 | 69 |
| Ex. N25 | Zr | | | | | 1994 | 1802 | 68 |
| Ex. N26 | Mg | | | | | 1992 | 1801 | 69 |
| Ex. N27 | In | | | | | 1991 | 1802 | 70 |
| Ex. N28 | Sn | | | | | 1992 | 1805 | 71 |
| Ex. N29 | Mn | | | | | 1995 | 1800 | 65 |
| Ex. N30 | B | | | | | 1994 | 1804 | 68 |
| Ex. N31 | W | | | | | 1988 | 1802 | 69 |
| Ex. N32 | Nb | | | | | 1989 | 1800 | 70 |
| Ex. N33 | Mo | | | | | 1982 | 1800 | 70 |
| Ex. N34 | Ta | 0.5 | | 60 · 55 | | 1800 | 1700 | 70 |
| Ex. N35 | Al | | | | | 1802 | 1701 | 69 |
| Ex. N36 | Zr | | | | | 1800 | 1705 | 68 |
| Ex. N37 | Mg | | | | | 1801 | 1704 | 67 |
| Ex. N38 | In | | | | | 1802 | 1704 | 68 |
| Ex. N39 | Sn | | | | | 1805 | 1706 | 70 |
| Ex. N40 | Mn | | | | | 1804 | 1702 | 69 |
| Ex. N41 | B | | | | | 1805 | 1704 | 71 |
| Ex. N42 | W | | | | | 1804 | 1704 | 69 |
| Ex. N43 | Nb | | | | | 1805 | 1710 | 68 |
| Ex. N44 | Mo | | | | | 1810 | 1700 | 67 |
| Comp. Ex. n1 | Ta | 0.5 | Absent | 25 · 20 | | 1992 | 1912 | 120 |
| Comp. Ex. n2 | Al | | | | | 1990 | 1910 | 118 |
| Comp. Ex. n3 | Zr | | | | | 1990 | 1914 | 120 |
| Comp. Ex. n4 | Mg | | | | | 1995 | 1915 | 118 |
| Comp. Ex. n5 | In | | | | | 1994 | 1915 | 119 |
| Comp. Ex. n6 | Sn | | | | | 1990 | 1910 | 119 |
| Comp. Ex. n7 | Mn | | | | | 1991 | 1910 | 121 |
| Comp. Ex. n8 | B | | | | | 1989 | 1911 | 122 |
| Comp. Ex. n9 | W | | | | | 1988 | 1912 | 122 |
| Comp. Ex. n10 | Nb | | | | | 1991 | 1911 | 117 |
| Comp. Ex. n11 | Mo | | | | | 1994 | 1915 | 120 |
| Comp. Ex. n12 | Not Added | — | Present | 25 · 55 | | 1720 | 1599 | 65 |
| Comp. Ex. n13 | | | Absent | | Mixed Gas of Nitrogen: Hydregen = 95:5 (molar ratio) treated at 400° C. for 6 hours | 2005 | 1901 | 122 |
| Comp. Ex. n14 | | | | | Not Carried Out | 2007 | 1905 | 127 |

EXAMPLE 13

A first lithium-nickel composite oxide having a composition of $Li_{1.03}Ni_{0.25}Co_{0.25}Al_{0.50}O_2$ was obtained by using nickel sulfate, cobalt sulfate, and aluminum sulfate so that a molar ratio of Ni atoms, Co atoms, and Al atoms was 25:25:50 upon synthesizing the first lithium-nickel composite oxide.

Example Batteries O1 to O44 and Comparative Example Batteries o1 to o14 were made in the same manner as Example Batteries M1 to M44 and Comparative Example Batteries m1 to m14, respectively, except that this first lithium-nickel composite oxide was used as the raw material for the active material particles, and the evaluation was carried out in the same manner as Example 1. The results are shown in Table 15.

TABLE 15

First Lithium-Nickel Composite Oxide: $Li_{1.03}Ni_{0.25}Co_{0.25}Al_{0.50}O_2$

| Battery No | Element M | Amount Added (mol %) | NaCl-type Crystal Structure Domain | Environment to be Allowed to Stand Temperature · Humidity (°C · %) | Baking Atmosphere- Temperature | Discharge Performance Discharge 400 mA at 0° C. (mAh) | 4000 mA at 0° C. (mAh) | Internal Short Circuit Safety 60° C.- Crush Speed 5 mm/Sec Highest Temperature Reached (°C.) |
|---|---|---|---|---|---|---|---|---|
| Ex. O1 | Ta | 0.5 | Present | 25 · 55 | Oxygen- 650° C. | 1482 | 1450 | 64 |
| Ex. O2 |  | 2.0 |  |  |  | 1488 | 1452 | 67 |
| Ex. O3 | Al | 0.5 |  |  |  | 1481 | 1452 | 62 |
| Ex. O4 |  | 2.0 |  |  |  | 1480 | 1455 | 64 |
| Ex. O5 | Zr | 0.5 |  |  |  | 1471 | 1455 | 62 |
| Ex. O6 |  | 2.0 |  |  |  | 1475 | 1460 | 66 |
| Ex. O7 | Mg | 0.5 |  |  |  | 1474 | 1458 | 69 |
| Ex. O8 |  | 2.0 |  |  |  | 1472 | 1458 | 68 |
| Ex. O9 | In | 0.5 |  |  |  | 1477 | 1457 | 64 |
| Ex. O10 |  | 2.0 |  |  |  | 1480 | 1458 | 69 |
| Ex. O11 | Sn | 0.5 |  |  |  | 1474 | 1455 | 75 |
| Ex. O12 |  | 2.0 |  |  |  | 1477 | 1450 | 69 |
| Ex. O13 | Mn | 0.5 |  |  |  | 1481 | 1456 | 64 |
| Ex. O14 |  | 2.0 |  |  |  | 1480 | 1452 | 75 |
| Ex. O15 | B | 0.5 |  |  |  | 1488 | 1453 | 66 |
| Ex. O16 |  | 2.0 |  |  |  | 1477 | 1455 | 68 |
| Ex. O17 | W | 0.5 |  |  |  | 1478 | 1455 | 71 |
| Ex. O18 |  | 2.0 |  |  |  | 1482 | 1458 | 70 |
| Ex. O19 | Nb | 0.5 |  |  |  | 1488 | 1455 | 65 |
| Ex. O20 |  | 2.0 |  |  |  | 1487 | 1458 | 70 |
| Ex. O21 | Mo | 0.5 |  |  |  | 1485 | 1455 | 72 |
| Ex. O22 |  | 2.0 |  |  |  | 1477 | 1459 | 67 |
| Ex. O23 | Ta | 2.5 |  |  |  | 1478 | 1350 | 70 |
| Ex. O24 | Al |  |  |  |  | 1485 | 1352 | 70 |
| Ex. O25 | Zr |  |  |  |  | 1488 | 1355 | 61 |
| Ex. O26 | Mg |  |  |  |  | 1482 | 1354 | 65 |
| Ex. O27 | In |  |  |  |  | 1472 | 1352 | 75 |
| Ex. O28 | Sn |  |  |  |  | 1482 | 1350 | 60 |
| Ex. O29 | Mn |  |  |  |  | 1488 | 1350 | 69 |
| Ex. O30 | B |  |  |  |  | 1488 | 1351 | 68 |
| Ex. O31 | W |  |  |  |  | 1482 | 1352 | 68 |
| Ex. O32 | Nb |  |  |  |  | 1485 | 1355 | 70 |
| Ex. O33 | Mo |  |  |  |  | 1482 | 1355 | 70 |
| Ex. O34 | Ta | 0.5 |  | 60 · 55 |  | 1355 | 1201 | 59 |
| Ex. O35 | Al |  |  |  |  | 1352 | 1199 | 62 |
| Ex. O36 | Zr |  |  |  |  | 1351 | 1198 | 70 |
| Ex. O37 | Mg |  |  |  |  | 1355 | 1197 | 66 |
| Ex. O38 | In |  |  |  |  | 1352 | 1199 | 68 |
| Ex. O39 | Sn |  |  |  |  | 1354 | 1197 | 68 |
| Ex. O40 | Mn |  |  |  |  | 1356 | 1200 | 70 |
| Ex. O41 | B |  |  |  |  | 1355 | 1201 | 70 |
| Ex. O42 | W |  |  |  |  | 1350 | 1205 | 65 |
| Ex. O43 | Nb |  |  |  |  | 1350 | 1202 | 72 |
| Ex. O44 | Mo |  |  |  |  | 1352 | 1200 | 69 |
| Comp. Ex. o1 | Ta | 0.5 | Absent | 25 · 20 |  | 1492 | 1420 | 115 |
| Comp. Ex. o2 | Al |  |  |  |  | 1490 | 1420 | 120 |
| Comp. Ex. o3 | Zr |  |  |  |  | 1498 | 1422 | 112 |
| Comp. Ex. o4 | Mg |  |  |  |  | 1497 | 1425 | 100 |
| Comp. Ex. o5 | In |  |  |  |  | 1485 | 1420 | 120 |
| Comp. Ex. o6 | Sn |  |  |  |  | 1477 | 1420 | 115 |
| Comp. Ex. o7 | Mn |  |  |  |  | 1488 | 1420 | 120 |
| Comp. Ex. o8 | B |  |  |  |  | 1487 | 1420 | 115 |
| Comp. Ex. o9 | W |  |  |  |  | 1496 | 1420 | 122 |
| Comp. Ex. o10 | Nb |  |  |  |  | 1479 | 1422 | 124 |
| Comp. Ex. o11 | Mo |  |  |  |  | 1477 | 1425 | 105 |
| Comp. Ex. o12 | Not Added | — | Present | 25 · 55 |  | 1320 | 1170 | 80 |
| Comp. Ex. o13 |  |  | Absent |  | Mixed Gas of Nitrogen:Hydrogen = 95:5 (molar ratio) treated at 400° C. for 6 hours | 1500 | 1400 | 120 |
| Comp. Ex. o14 |  |  |  |  | Not Carried Out | 1500 | 1420 | 125 |

EXAMPLE 14

A first lithium-nickel composite oxide having a composition of $Li_{1.03}Ni_{0.25}Cu_{0.50}Al_{0.25}O_2$ was obtained by using nickel sulfate, cobalt sulfate, and aluminum sulfate so that a molar ratio of Ni atoms, Co atoms, and Al atoms was 25:50:25 upon synthesizing the first lithium-nickel composite oxide.

Example Batteries P1 to P44 and Comparative Example Batteries p1 to p14 were made in the same manner as Example Batteries M1 to M44 and Comparative Example Batteries m1 to m14, respectively, except that this first lithium-nickel composite oxide was used as the raw material for the active material particles, and the evaluation was carried out in the same manner as Example 1. The results are shown in Table 16.

TABLE 16

First Lithium-Nickel Composite Oxide: $Li_{1.03}Ni_{0.25}Co_{0.50}Al_{0.25}O_2$

|  | Battery No | Element M | Amount Added (mol %) | NaCl-type Crystal Structure Domain | Environment to be Allowed to Stand Temperature · Humidity (° C. · %) | Baking Atmosphere- Temperature | Discharge Performance Discharge 400 mA at 0° C. (mAh) | Discharge Performance Discharge 4000 mA at 0° C. (mAh) | Internal Short Circuit Safety 60° C.- Crush Speed 5 mm/Sec Highest Temperature Reached (° C.) |
|---|---|---|---|---|---|---|---|---|---|
| Ex. | P1 | Ta | 0.5 | Present | 25 · 55 | Oxygen-650° C. | 1882 | 1812 | 70 |
| Ex. | P2 |  | 2.0 |  |  |  | 1891 | 1815 | 62 |
| Ex. | P3 | Al | 0.5 |  |  |  | 1880 | 1810 | 65 |
| Ex. | P4 |  | 2.0 |  |  |  | 1882 | 1815 | 70 |
| Ex. | P5 | Zr | 0.5 |  |  |  | 1880 | 1812 | 71 |
| Ex. | P6 |  | 2.0 |  |  |  | 1881 | 1810 | 71 |
| Ex. | P7 | Mg | 0.5 |  |  |  | 1890 | 1812 | 65 |
| Ex. | P8 |  | 2.0 |  |  |  | 1890 | 1815 | 65 |
| Ex. | P9 | In | 0.5 |  |  |  | 1879 | 1810 | 71 |
| Ex. | P10 |  | 2.0 |  |  |  | 1888 | 1812 | 70 |
| Ex. | P11 | Sn | 0.5 |  |  |  | 1890 | 1814 | 61 |
| Ex. | P12 |  | 2.0 |  |  |  | 1887 | 1816 | 70 |
| Ex. | P13 | Mn | 0.5 |  |  |  | 1885 | 1815 | 65 |
| Ex. | P14 |  | 2.0 |  |  |  | 1884 | 1815 | 65 |
| Ex. | P15 | B | 0.5 |  |  |  | 1888 | 1815 | 71 |
| Ex. | P16 |  | 2.0 |  |  |  | 1889 | 1810 | 72 |
| Ex. | P17 | W | 0.5 |  |  |  | 1890 | 1811 | 64 |
| Ex. | P18 |  | 2.0 |  |  |  | 1890 | 1812 | 68 |
| Ex. | P19 | Nb | 0.5 |  |  |  | 1870 | 1815 | 62 |
| Ex. | P20 |  | 2.0 |  |  |  | 1885 | 1812 | 62 |
| Ex. | P21 | Mo | 0.5 |  |  |  | 1889 | 1800 | 72 |
| Ex. | P22 |  | 2.0 |  |  |  | 1885 | 1800 | 72 |
| Ex. | P23 | Ta | 2.5 |  |  |  | 1891 | 1601 | 70 |
| Ex. | P24 | Al |  |  |  |  | 1880 | 1605 | 72 |
| Ex. | P25 | Zr |  |  |  |  | 1879 | 1602 | 67 |
| Ex. | P26 | Mg |  |  |  |  | 1892 | 1608 | 68 |
| Ex. | P27 | In |  |  |  |  | 1891 | 1607 | 64 |
| Ex. | P28 | Sn |  |  |  |  | 1889 | 1602 | 65 |
| Ex. | P29 | Mn |  |  |  |  | 1895 | 1603 | 69 |
| Ex. | P30 | B |  |  |  |  | 1897 | 1608 | 65 |
| Ex. | P31 | W |  |  |  |  | 1889 | 1600 | 68 |
| Ex. | P32 | Nb |  |  |  |  | 1890 | 1601 | 65 |
| Ex. | P33 | Mo |  |  |  |  | 1890 | 1602 | 60 |
| Ex. | P34 | Ta | 0.5 |  | 60 · 55 |  | 1602 | 1502 | 67 |
| Ex. | P35 | Al |  |  |  |  | 1604 | 1500 | 65 |
| Ex. | P36 | Zr |  |  |  |  | 1605 | 1504 | 70 |
| Ex. | P37 | Mg |  |  |  |  | 1610 | 1501 | 65 |
| Ex. | P38 | In |  |  |  |  | 1605 | 1508 | 65 |
| Ex. | P39 | Sn |  |  |  |  | 1608 | 1509 | 70 |
| Ex. | P40 | Mn |  |  |  |  | 1604 | 1510 | 64 |
| Ex. | P41 | B |  |  |  |  | 1610 | 1511 | 70 |
| Ex. | P42 | W |  |  |  |  | 1609 | 1512 | 68 |
| Ex. | P43 | Nb |  |  |  |  | 1608 | 1513 | 70 |
| Ex. | P44 | Mo |  |  |  |  | 1608 | 1512 | 72 |
| Comp. Ex. | p1 | Ta | 0.5 | Absent | 25 · 20 |  | 1882 | 1810 | 122 |
| Comp. Ex. | p2 | Al |  |  |  |  | 1884 | 1809 | 123 |
| Comp. Ex. | p3 | Zr |  |  |  |  | 1880 | 1804 | 124 |
| Comp. Ex. | p4 | Mg |  |  |  |  | 1891 | 1809 | 121 |
| Comp. Ex. | p5 | In |  |  |  |  | 1890 | 1802 | 122 |
| Comp. Ex. | p6 | Sn |  |  |  |  | 1888 | 1809 | 125 |
| Comp. Ex. | p7 | Mn |  |  |  |  | 1879 | 1807 | 122 |
| Comp. Ex. | p8 | B |  |  |  |  | 1880 | 1807 | 124 |
| Comp. Ex. | p9 | W |  |  |  |  | 1889 | 1809 | 122 |
| Comp. Ex. | p10 | Nb |  |  |  |  | 1880 | 1087 | 120 |
| Comp. Ex. | p11 | Mo |  |  |  |  | 1890 | 1807 | 120 |

TABLE 16-continued

First Lithium-Nickel Composite Oxide: $Li_{1.03}Ni_{0.25}Co_{0.50}Al_{0.25}O_2$

| Battery No | Element M | NaCl-type Amount Added (mol %) | NaCl-type Crystal Structure Domain | Environment to be Allowed to Stand Temperature · Humidity (° C. · %) | Baking Atmosphere-Temperature | Discharge Performance Discharge 400 mA at 0° C. (mAh) | Discharge Performance Discharge 4000 mA at 0° C. (mAh) | Internal Short Circuit Safety 60° C.- Crush Speed 5 mm/Sec Highest Temperature Reached (° C.) |
|---|---|---|---|---|---|---|---|---|
| Comp. Ex. p12 | Not Added | — | Present | 25 · 55 | | 1608 | 1479 | 79 |
| Comp. Ex. p13 | Added | | Absent | | Mixed Gas of Nitrngen:Hydrogen = 95:5 (molar ratio) treated at 400° C. for 6 hours | 1890 | 1820 | 130 |
| Comp. Ex. p14 | | | | | Not Carried Out | 1895 | 1827 | 132 |

EXAMPLE 15

A first lithium-nickel composite oxide having a composition of $Li_{1.03}Ni_{0.90}Co_{0.10}O_2$ was obtained by using nickel sulfate and cobalt sulfate without using aluminum sulfate so that a molar ratio of Ni atoms to Co atoms was 90:10 upon synthesizing the first lithium-nickel composite oxide. Example Batteries Q1 to Q44 and Comparative Example Batteries q1 to q14 were made in the same manner as Example Batteries M1 to M44 and Comparative Example Batteries m1 to m14, respectively, except that this first lithium-nickel composite oxide was used as the raw material for the active material particles, and the evaluation was carried out in the same manner as Example 1. The results are shown in Table 17.

TABLE 17

First Lithium-Nickel Composite Oxide: $Li_{1.03}Ni_{0.90}Co_{0.10}O_2$

| | Battery No | Element M | NaCl-type Amount Added (mol %) | NaCl-type Crystal Structure Domain | Environment to be Allowed to Stand Temperature · Humidity (° C. · %) | Baking Atmosphere-Temperature | Discharge Performance Discharge 400 mA at 0° C. (mAh) | Discharge Performance Discharge 4000 mA at 0° C. (mAh) | Internal Short Circuit Safety 60° C.- Crush Speed 5 mm/Sec Highest Temperature Reached (° C.) |
|---|---|---|---|---|---|---|---|---|---|
| Ex. | Q1 | Ta | 0.5 | Present | 25 · 55 | Oxygen-650° C. | 2001 | 1901 | 70 |
| Ex. | Q2 | | 2.0 | | | | 2002 | 1902 | 75 |
| Ex. | Q3 | Al | 0.5 | | | | 2003 | 1907 | 62 |
| Ex. | Q4 | | 2.0 | | | | 2004 | 1905 | 67 |
| Ex. | Q5 | Zr | 0.5 | | | | 2001 | 1901 | 64 |
| Ex. | Q6 | | 2.0 | | | | 2005 | 1905 | 72 |
| Ex. | Q7 | Mg | 0.5 | | | | 2008 | 1907 | 62 |
| Ex. | Q8 | | 2.0 | | | | 2007 | 1901 | 67 |
| Ex. | Q9 | In | 0.5 | | | | 2000 | 1900 | 68 |
| Ex. | Q10 | | 2.0 | | | | 2001 | 1902 | 62 |
| Ex. | Q11 | Sn | 0.5 | | | | 2006 | 1908 | 62 |
| Ex. | Q12 | | 2.0 | | | | 2007 | 1908 | 60 |
| Ex. | Q13 | Mn | 0.5 | | | | 2009 | 1901 | 62 |
| Ex. | Q14 | | 2.0 | | | | 2005 | 1904 | 65 |
| Ex. | Q15 | B | 0.5 | | | | 2004 | 1903 | 70 |
| Ex. | Q16 | | 2.0 | | | | 2000 | 1905 | 60 |

TABLE 17-continued

First Lithium-Nickel Composite Oxide: $Li_{1.03}Ni_{0.90}Co_{0.10}O_2$

| Battery No | Element M | NaCl-type Amount Added (mol %) | Crystal Structure Domain | Environment to be Allowed to Stand Temperature · Humidity (° C. · %) | Baking Atmosphere-Temperature | Discharge Performance Discharge 400 mA at 0° C. (mAh) | 4000 mA at 0° C. (mAh) | Internal Short Circuit Safety 60° C.-Crush Speed 5 mm/Sec Highest Temperature Reached (° C.) |
|---|---|---|---|---|---|---|---|---|
| Ex. Q17 | W | 0.5 | | | | 2003 | 1908 | 68 |
| Ex. Q18 | | 2.0 | | | | 2000 | 1907 | 65 |
| Ex. Q19 | Nb | 0.5 | | | | 2004 | 1902 | 62 |
| Ex. Q20 | | 2.0 | | | | 2005 | 1900 | 65 |
| Ex. Q21 | Mo | 0.5 | | | | 2002 | 1901 | 67 |
| Ex. Q22 | | 2.0 | | | | 2004 | 1908 | 65 |
| Ex. Q23 | Ta | 2.5 | | | | 2002 | 1701 | 70 |
| Ex. Q24 | Al | | | | | 2004 | 1701 | 70 |
| Ex. Q25 | Zr | | | | | 2001 | 1705 | 65 |
| Ex. Q26 | Mg | | | | | 2000 | 1706 | 70 |
| Ex. Q27 | In | | | | | 2004 | 1707 | 67 |
| Ex. Q28 | Sn | | | | | 2003 | 1701 | 65 |
| Ex. Q29 | Mn | | | | | 2002 | 1704 | 71 |
| Ex. Q30 | B | | | | | 2002 | 1707 | 68 |
| Ex. Q31 | W | | | | | 2004 | 1700 | 65 |
| Ex. Q32 | Nb | | | | | 2001 | 1705 | 71 |
| Ex. Q33 | Mo | | | | | 2003 | 1704 | 65 |
| Ex. Q34 | Ta | 0.5 | | 60 · 55 | | 1750 | 1611 | 60 |
| Ex. Q35 | Al | | | | | 1740 | 1613 | 72 |
| Ex. Q36 | Zr | | | | | 1747 | 1609 | 75 |
| Ex. Q37 | Mg | | | | | 1757 | 1619 | 62 |
| Ex. Q38 | In | | | | | 1758 | 1620 | 70 |
| Ex. Q39 | Sn | | | | | 1760 | 1627 | 62 |
| Ex. Q40 | Mn | | | | | 1747 | 1622 | 67 |
| Ex. Q41 | B | | | | | 1749 | 1619 | 68 |
| Ex. Q42 | W | | | | | 1752 | 1617 | 69 |
| Ex. Q43 | Nb | | | | | 1755 | 1617 | 64 |
| Ex. Q44 | Mo | | | | | 1754 | 1627 | 64 |
| Comp. Ex. q1 | Ta | 0.5 | Absent | 25 · 20 | | 2003 | 1901 | 117 |
| Comp. Ex. q2 | Al | | | | | 2005 | 1902 | 117 |
| Comp. Ex. q3 | Zr | | | | | 2004 | 1909 | 119 |
| Comp. Ex. q4 | Mg | | | | | 2005 | 1904 | 117 |
| Comp. Ex. q5 | In | | | | | 2000 | 1902 | 115 |
| Comp. Ex. q6 | Sn | | | | | 2003 | 1907 | 114 |
| Comp. Ex. q7 | Mn | | | | | 2005 | 1903 | 119 |
| Comp. Ex. q8 | B | | | | | 2002 | 1901 | 119 |
| Comp. Ex. q9 | W | | | | | 2004 | 1900 | 118 |
| Comp. Ex. q10 | Nb | | | | | 2003 | 1904 | 118 |
| Comp. Ex. q11 | Mo | | | | | 2007 | 1900 | 118 |
| Comp. Ex. q12 | Not Added | — | Present | 25 · 55 | | 1760 | 1611 | 70 |
| Comp. Ex. q13 | | | Absent | | Mixed Gas of Nitrogen:Hydrogen = 95:5 (molar ratio) treated at 400° C. for 6 hours | 2008 | 1910 | 112 |
| Comp. Ex. q14 | | | | | Not Carried Out | 2007 | 1919 | 122 |

EXAMPLE 16

A first lithium-nickel composite oxide having a composition of $Li_{1.03}Ni_{0.50}Co_{0.50}O_2$ was obtained by using nickel sulfate and cobalt sulfate without using aluminum sulfate so that a molar ratio of Ni atoms to Co atoms was 50:50 upon synthesizing the first lithium-nickel composite oxide.

Example Batteries R1 to R44 and Comparative Example Batteries r1 to r14 were made in the same manner as Example Batteries M1 to M44 and Comparative Example Batteries m1 to m14, respectively, except that this first lithium-nickel composite oxide was used as the raw material for the active material particles, and the evaluation was carried out in the same manner as Example 1. The results are shown in Table 18.

TABLE 18

First Lithium-Nickel Composite Oxide: $Li_{1.03}Ni_{0.50}Co_{0.50}O_2$

| Battery No | | Element M | Amount Added (mol %) | NaCl-type Crystal Structure Domain | Environment to be Allowed to Stand Temperature · Humidity (° C. · %) | Baking Atmosphere-Temperature | Discharge Performance Discharge 400 mA at 0° C. (mAh) | 4000 mA at 0° C. (mAh) | Internal Short Circuit Safety 60° C.- Crush Speed 5 mm/Sec Highest Temperature Reached (° C.) |
|---|---|---|---|---|---|---|---|---|---|
| Ex. | R1 | Ta | 0.5 | Present | 25 · 55 | Oxygen-650° C. | 2001 | 1901 | 64 |
| Ex. | R2 |  | 2.0 |  |  |  | 2002 | 1903 | 68 |
| Ex. | R3 | Al | 05 |  |  |  | 2003 | 1902 | 65 |
| Ex. | R4 |  | 2.0 |  |  |  | 2002 | 1900 | 62 |
| Ex. | R5 | Zr | 0.5 |  |  |  | 2004 | 1904 | 61 |
| Ex. | R6 |  | 2.0 |  |  |  | 2005 | 1905 | 67 |
| Ex. | R7 | Mg | 0.5 |  |  |  | 2000 | 1902 | 65 |
| Ex. | R8 |  | 2.0 |  |  |  | 2000 | 1907 | 65 |
| Ex. | R9 | In | 0.5 |  |  |  | 2001 | 1908 | 61 |
| Ex. | R10 |  | 2.0 |  |  |  | 2001 | 1907 | 62 |
| Ex. | R11 | Sn | 0.5 |  |  |  | 2002 | 1905 | 62 |
| Ex. | R12 |  | 2.0 |  |  |  | 2004 | 1906 | 66 |
| Ex. | R13 | Mn | 0.5 |  |  |  | 2003 | 1907 | 66 |
| Ex. | R14 |  | 2.0 |  |  |  | 2005 | 1905 | 65 |
| Ex. | R15 | B | 0.5 |  |  |  | 2001 | 1906 | 70 |
| Ex. | R16 |  | 2.0 |  |  |  | 2000 | 1907 | 64 |
| Ex. | R17 | W | 0.5 |  |  |  | 2001 | 1907 | 66 |
| Ex. | R18 |  | 2.0 |  |  |  | 2004 | 1917 | 62 |
| Ex. | R19 | Nb | 0.5 |  |  |  | 2005 | 1907 | 64 |
| Ex. | R20 |  | 2.0 |  |  |  | 2006 | 1905 | 64 |
| Ex. | R21 | Mo | 0.5 |  |  |  | 2003 | 1907 | 67 |
| Ex. | R22 |  | 2.0 |  |  |  | 2001 | 1900 | 60 |
| Ex. | R23 | Ta | 2.5 |  |  |  | 2004 | 1701 | 65 |
| Ex. | R24 | Al |  |  |  |  | 2001 | 1702 | 64 |
| Ex. | R25 | Zr |  |  |  |  | 2000 | 1708 | 65 |
| Ex. | R26 | Mg |  |  |  |  | 2002 | 1709 | 65 |
| Ex. | R27 | In |  |  |  |  | 2000 | 1706 | 65 |
| Ex. | R28 | Sn |  |  |  |  | 2001 | 1704 | 65 |
| Ex. | R29 | Mn |  |  |  |  | 2003 | 1702 | 62 |
| Ex. | R30 | B |  |  |  |  | 2004 | 1700 | 65 |
| Ex. | R31 | W |  |  |  |  | 2002 | 1703 | 63 |
| Ex. | R32 | Nb |  |  |  |  | 2001 | 1702 | 66 |
| Ex. | R33 | Mo |  |  |  |  | 2005 | 1708 | 65 |
| Ex. | R34 | Ta | 0.5 |  | 60 · 55 |  | 1770 | 1637 | 62 |
| Ex. | R35 | Al |  |  |  |  | 1777 | 1647 | 65 |
| Ex. | R36 | Zr |  |  |  |  | 1780 | 1644 | 62 |
| Ex. | R37 | Mg |  |  |  |  | 1782 | 1650 | 65 |
| Ex. | R38 | In |  |  |  |  | 1772 | 1638 | 67 |
| Ex. | R39 | Sn |  |  |  |  | 1773 | 1637 | 68 |
| Ex. | R40 | Mn |  |  |  |  | 1774 | 1657 | 65 |
| Ex. | R41 | B |  |  |  |  | 1773 | 1652 | 65 |
| Ex. | R42 | W |  |  |  |  | 1772 | 1650 | 64 |
| Ex. | R43 | Nb |  |  |  |  | 1777 | 1677 | 61 |
| Ex. | R44 | Mo |  |  |  |  | 1771 | 1667 | 69 |
| Comp. Ex. | r1 | Ta | 0.5 | Absent | 25 · 20 |  | 2002 | 1902 | 119 |
| Comp. Ex. | r2 | Al |  |  |  |  | 2000 | 1900 | 111 |
| Comp. Ex. | r3 | Zr |  |  |  |  | 2003 | 1905 | 110 |
| Comp. Ex. | r4 | Mg |  |  |  |  | 2001 | 1905 | 113 |
| Comp. Ex. | r5 | In |  |  |  |  | 2000 | 1900 | 116 |
| Comp. Ex. | r6 | Sn |  |  |  |  | 2001 | 1906 | 115 |
| Comp. Ex. | r7 | Mn |  |  |  |  | 2002 | 1907 | 110 |
| Comp. Ex. | r8 | B |  |  |  |  | 2006 | 1901 | 119 |
| Comp. Ex. | r9 | W |  |  |  |  | 2008 | 1903 | 121 |
| Comp. Ex. | r10 | Nb |  |  |  |  | 2007 | 1907 | 122 |
| Comp. Ex. | r11 | Mo |  |  |  |  | 2005 | 1900 | 111 |
| Comp. Ex. | r12 | Not Added | — | Present | 25 · 55 |  | 1711 | 1655 | 65 |
| Comp. Ex. | r13 |  |  | Absent |  | Mixed Gas of Nitrogen:Hydrogen = 95:5 (molar ratio) treated at 400° C. for 6 hours | 2009 | 1920 | 130 |
| Comp. Ex. | r14 |  |  |  |  | Not Carried Out | 2010 | 1927 | 137 |

EXAMPLE 17

Nickel sulfate, cobalt sulfate, and aluminum sulfate were mixed so that a molar ratio of Ni atoms, Co atoms, and Al atoms was 80:15:3. The obtained mixture in an amount of 3.2 kg was dissolved in 10 L of water, to obtain a raw material solution. To the raw material solution, 400 g of sodium hydroxide was added to form a precipitate. The precipitate was sufficiently washed with water and dried, to obtain a coprecipitated hydroxide.

To 3 kg of the obtained coprecipitated hydroxide of Ni—Co—Al, 870 g of lithium hydroxide and 378 g of manganese nitrate were mixed. The obtained mixture was baked under an atmosphere with an oxygen partial pressure of 0.5 atm at a synthesizing temperature of 750° C. for 10 hours, to obtain a first lithium-nickel composite oxide including excessive lithium (composition: $Li_{1.03}Ni_{0.8}Co_{0.15}Al_{0.03}Mn_{0.02}O_2$).

Example Batteries S1 to S44 and Comparative Example Batteries s1 to s14 were made in the same manner as Example Batteries M1 to M44 and Comparative Example Batteries m1 to m14, respectively, except that the lithium composite oxide was used as a raw material for the active material particles, and the evaluation was carried out in the same manner as Example 1. The results are shown in Table 19.

TABLE 19

First Lithium-Nickel Composite Oxide: $Li_{1.03}Ni_{0.80}Co_{0.15}Al_{0.03}Mn_{0.02}O_2$

| Battery No | | Element M | Amount Added (mol %) | NaCl-type Crystal Structure Domain | Environment to be Allowed to Stand Temperature · Humidity (° C. · %) | Baking Atmosphere · Temperature | Discharge Performance Discharge 400 mA at 0° C. (mAh) | 4000 mA at 0° C. (mAh) | Internal Short Circuit Safety 60° C. - Crush Speed 5 mm/Sec Highest Temperature Reached (° C.) |
|---|---|---|---|---|---|---|---|---|---|
| Ex. | S1 | Ta | 0.5 | Present | 25 · 55 | Oxygen- 650° C. | 2004 | 1902 | 66 |
| Ex. | S2 |    | 2.0 |         |         |          | 2005 | 1900 | 67 |
| Ex. | S3 | Al | 0.5 |         |         |          | 2004 | 1904 | 65 |
| Ex. | S4 |    | 2.0 |         |         |          | 2005 | 1907 | 60 |
| Ex. | S5 | Zr | 0.5 |         |         |          | 2002 | 1905 | 65 |
| Ex. | S6 |    | 2.0 |         |         |          | 2005 | 1902 | 62 |
| Ex. | S7 | Mg | 0.5 |         |         |          | 2008 | 1904 | 60 |
| Ex. | S8 |    | 2.0 |         |         |          | 2009 | 1907 | 64 |
| Ex. | S9 | In | 0.5 |         |         |          | 2007 | 1907 | 65 |
| Ex. | S10 |   | 2.0 |         |         |          | 2007 | 1901 | 61 |
| Ex. | S11 | Sn | 0.5 |        |         |          | 2006 | 1905 | 65 |
| Ex. | S12 |    | 2.0 |        |         |          | 2004 | 1907 | 65 |
| Ex. | S13 | Mn | 0.5 |        |         |          | 2005 | 1901 | 64 |
| Ex. | S14 |    | 2.0 |        |         |          | 2004 | 1900 | 64 |
| Ex. | S15 | B | 0.5 |         |         |          | 2005 | 1905 | 64 |
| Ex. | S16 |   | 2.0 |         |         |          | 2003 | 1907 | 67 |
| Ex. | S17 | W | 0.5 |         |         |          | 2002 | 1908 | 66 |
| Ex. | S18 |   | 2.0 |         |         |          | 2005 | 1909 | 60 |
| Ex. | S19 | Nb | 0.5 |        |         |          | 2002 | 1910 | 61 |
| Ex. | S20 |    | 2.0 |        |         |          | 2000 | 1901 | 67 |
| Ex. | S21 | Mo | 0.5 |        |         |          | 2005 | 1912 | 68 |
| Ex. | S22 |    | 2.0 |        |         |          | 2005 | 1900 | 65 |
| Ex. | S23 | Ta | 2.5 |        |         |          | 2004 | 1711 | 62 |
| Ex. | S24 | Al |     |        |         |          | 2000 | 1720 | 60 |
| Ex. | S25 | Zr |     |        |         |          | 2001 | 1727 | 62 |
| Ex. | S26 | Mg |     |        |         |          | 2002 | 1722 | 68 |
| Ex. | S27 | In |     |        |         |          | 2002 | 1715 | 68 |
| Ex. | S28 | Sn |     |        |         |          | 2008 | 1720 | 64 |
| Ex. | S29 | Mn |     |        |         |          | 2002 | 1710 | 66 |
| Ex. | S30 | B |      |        |         |          | 2002 | 1715 | 64 |
| Ex. | S31 | W |      |        |         |          | 2000 | 1726 | 60 |
| Ex. | S32 | Nb |     |        |         |          | 2005 | 1717 | 64 |
| Ex. | S33 | Mo |     |        |         |          | 2004 | 1709 | 66 |
| Ex. | S34 | Ta | 0.5 |        | 60 · 55 |          | 1755 | 1667 | 68 |
| Ex. | S35 | Al |     |        |         |          | 1757 | 1670 | 66 |
| Ex. | S36 | Zr |     |        |         |          | 1767 | 1671 | 65 |
| Ex. | S37 | Mg |     |        |         |          | 1754 | 1669 | 62 |
| Ex. | S38 | In |     |        |         |          | 1752 | 1670 | 62 |
| Ex. | S39 | Sn |     |        |         |          | 1747 | 1657 | 64 |
| Ex. | S40 | Mn |     |        |         |          | 1767 | 1671 | 65 |
| Ex. | S41 | B |      |        |         |          | 1765 | 1682 | 65 |
| Ex. | S42 | W |      |        |         |          | 1774 | 1682 | 65 |
| Ex. | S43 | Nb |     |        |         |          | 1777 | 1677 | 62 |
| Ex. | S44 | Mo |     |        |         |          | 1787 | 1680 | 66 |
| Comp. Ex. | s1 | Ta | 0.5 | Absent | 25 · 20 |          | 2001 | 1907 | 122 |
| Comp. Ex. | s2 | Al |    |        |         |          | 2003 | 1910 | 120 |
| Comp. Ex. | s3 | Zr |    |        |         |          | 2002 | 1911 | 121 |

TABLE 19-continued

First Lithium-Nickel Composite Oxide: $Li_{1.03}Ni_{0.80}Co_{0.15}Al_{0.03}Mn_{0.02}O_2$

| Battery No | Element M | NaCl-type Amount Added (mol %) | NaCl-type Crystal Structure Domain | Environment to be Allowed to Stand Temperature · Humidity (° C. · %) | Baking Atmosphere · Temperature | Discharge Performance Discharge 400 mA at 0° C. (mAh) | Discharge Performance Discharge 4000 mA at 0° C. (mAh) | Internal Short Circuit Safety 60° C. - Crush Speed 5 mm/Sec Highest Temperature Reached (° C.) |
|---|---|---|---|---|---|---|---|---|
| Comp. Ex. s4 | Mg | | | | | 2005 | 1912 | 118 |
| Comp. Ex. s5 | In | | | | | 2001 | 1908 | 119 |
| Comp. Ex. s6 | Sn | | | | | 2003 | 1909 | 117 |
| Comp. Ex. s7 | Mn | | | | | 2005 | 1907 | 119 |
| Comp. Ex. s8 | B | | | | | 2007 | 1910 | 121 |
| Comp. Ex. s9 | W | | | | | 2002 | 1911 | 119 |
| Comp. Ex. s10 | Nb | | | | | 2003 | 1908 | 120 |
| Comp. Ex. s11 | Mo | | | | | 2005 | 1907 | 118 |
| Comp. Ex. s12 | Not Added | — | Present | 25 · 55 | | 1734 | 1620 | 66 |
| Comp. Ex. s13 | | | Absent | | Mixed Gas of Nitrogen:Hydrogen = 95:5 (molar ratio) treated at 400° C. for 6 hours | 2009 | 1919 | 122 |
| Comp. Ex. s14 | | | | | Not Carried Out | 2010 | 1927 | 132 |

EXAMPLE 18

To 3 kg of a coprecipitated hydroxide of Ni—Co—Al prepared in the same manner as Example 17, 870 g of lithium hydroxide and 378 g of magnesium sulfate were mixed. The obtained mixture was baked under an atmosphere with an oxygen partial pressure of 0.5 atm at a synthesizing temperature of 750° C. for 10 hours, to obtain a first lithium-nickel composite oxide including excessive lithium (composition: $Li_{1.03}Ni_{0.8}Co_{0.15}Al_{0.03}Mg_{0.02}O_2$).

Example Batteries T1 to T44 and Comparative Example Batteries t1 to t14 were made in the same manner as Example Batteries M1 to M44 and Comparative Example Batteries m1 to m14, respectively, except that this lithium composite oxide was used as a raw material for the active material particles, and the evaluation was carried out in the same manner as Example 1. The results are shown in Table 20.

TABLE 20

First Lithium-Nickel Composite Oxide: $Li_{1.03}Ni_{0.80}Co_{0.15}Al_{0.03}Mg_{0.02}O_2$

| Battery No | Element M | NaCl-type Amount Added (mol %) | NaCl-type Crystal Structure Domain | Environment to be Allowed to Stand Temperature · Humidity (° C. · %) | Baking Atmosphere · Temperature | Discharge Performance Discharge 400 mA at 0° C. (mAh) | Discharge Performance Discharge 4000 mA at 0° C. (mAh) | Internal Short Circuit Safety 60° C. - Crush Speed 5 mm/Sec Highest Temperature Reached (° C.) |
|---|---|---|---|---|---|---|---|---|
| Ex. T1 | Ta | 0.5 | Present | 25 · 55 | Oxygen · 650° C. | 2002 | 1902 | 64 |
| Ex. T2 | | 2.0 | | | | 2004 | 1900 | 60 |
| Ex. T3 | Al | 0.5 | | | | 2005 | 1902 | 66 |
| Ex. T4 | | 2.0 | | | | 2002 | 1903 | 63 |
| Ex. T5 | Zr | 0.5 | | | | 2001 | 1904 | 62 |
| Ex. T6 | | 2.0 | | | | 2000 | 1901 | 64 |
| Ex. T7 | Mg | 0.5 | | | | 2005 | 1902 | 62 |
| Ex. T8 | | 2.0 | | | | 2002 | 1901 | 67 |
| Ex. T9 | In | 0.5 | | | | 2000 | 1907 | 62 |
| Ex. T10 | | 2.0 | | | | 2005 | 1905 | 69 |
| Ex. T11 | Sn | 0.5 | | | | 2001 | 1900 | 62 |
| Ex. T12 | | 2.0 | | | | 2002 | 1900 | 61 |
| Ex. T13 | Mn | 0.5 | | | | 2000 | 1902 | 63 |
| Ex. T14 | | 2.0 | | | | 2004 | 1902 | 62 |
| Ex. T15 | B | 0.5 | | | | 2004 | 1905 | 65 |

TABLE 20-continued

First Lithium-Nickel Composite Oxide: $Li_{1.03}Ni_{0.80}Co_{0.15}Al_{0.03}Mg_{0.02}O_2$

| Battery No | Element M | NaCl-type Amount Added (mol %) | NaCl-type Crystal Structure Domain | Environment to be Allowed to Stand Temperature · Humidity (° C. · %) | Baking Atmosphere · Temperature | Discharge Performance Discharge 400 mA at 0° C. (mAh) | Discharge Performance Discharge 4000 mA at 0° C. (mAh) | Internal Short Circuit Safety 60° C. - Crush Speed 5 mm/Sec Highest Temperature Reached (° C.) |
|---|---|---|---|---|---|---|---|---|
| Ex. T16 | | 2.0 | | | | 2005 | 1905 | 66 |
| Ex. T17 | W | 0.5 | | | | 2002 | 1900 | 67 |
| Ex. T18 | | 2.0 | | | | 2000 | 1900 | 64 |
| Ex. T19 | Nb | 0.5 | | | | 2004 | 1900 | 65 |
| Ex. T20 | | 2.0 | | | | 2005 | 1901 | 64 |
| Ex. T21 | Mo | 0.5 | | | | 2007 | 1902 | 62 |
| Ex. T22 | | 2.0 | | | | 2003 | 1902 | 67 |
| Ex. T23 | Ta | 2.5 | | | | 2005 | 1702 | 62 |
| Ex. T24 | Al | | | | | 2003 | 1700 | 67 |
| Ex. T25 | Zr | | | | | 2004 | 1705 | 63 |
| Ex. T26 | Mg | | | | | 2005 | 1703 | 64 |
| Ex. T27 | In | | | | | 2008 | 1704 | 64 |
| Ex. T28 | Sn | | | | | 2009 | 1705 | 67 |
| Ex. T29 | Mn | | | | | 2007 | 1705 | 63 |
| Ex. T30 | B | | | | | 2007 | 1707 | 66 |
| Ex. T31 | W | | | | | 2007 | 1707 | 68 |
| Ex. T32 | Nb | | | | | 2006 | 1700 | 62 |
| Ex. T33 | Mo | | | | | 2005 | 1700 | 62 |
| Ex. T34 | Ta | 0.5 | | 60 · 55 | | 1782 | 1611 | 62 |
| Ex. T35 | Al | | | | | 1777 | 1614 | 60 |
| Ex. T36 | Zr | | | | | 1779 | 1626 | 61 |
| Ex. T37 | Mg | | | | | 1781 | 1627 | 64 |
| Ex. T38 | In | | | | | 1782 | 1634 | 62 |
| Ex. T39 | Sn | | | | | 1783 | 1626 | 65 |
| Ex. T40 | Mn | | | | | 1787 | 1620 | 64 |
| Ex. T41 | B | | | | | 1771 | 1630 | 65 |
| Ex. T42 | W | | | | | 1773 | 1643 | 63 |
| Ex. T43 | Nb | | | | | 1772 | 1625 | 61 |
| Ex. T44 | Mo | | | | | 1777 | 1632 | 64 |
| Comp. Ex. t1 | Ta | 0.5 | Absent | 25 · 20 | | 2001 | 1907 | 120 |
| Comp. Ex. t2 | Al | | | | | 2004 | 1903 | 121 |
| Comp. Ex. t3 | Zr | | | | | 2003 | 1906 | 120 |
| Comp. Ex. t4 | Mg | | | | | 2004 | 1909 | 119 |
| Comp. Ex. t5 | In | | | | | 2005 | 1900 | 124 |
| Comp. Ex. t6 | Sn | | | | | 2001 | 1901 | 125 |
| Comp. Ex. t7 | Mn | | | | | 2002 | 1902 | 130 |
| Comp. Ex. t8 | B | | | | | 2001 | 1901 | 128 |
| Comp. Ex. t9 | W | | | | | 2002 | 1907 | 122 |
| Comp. Ex. t10 | Nb | | | | | 2000 | 1904 | 129 |
| Comp. Ex. t11 | Mo | | | | | 2005 | 1905 | 125 |
| Comp. Ex. t12 | Not Added | — | Present | 25 · 55 | | 1722 | 1602 | 69 |
| Comp. Ex. t13 | | | Absent | | Mixed Gas of Nitrogen:Hydrogen = 95:5 (molar ratio) treated at 400° C. for 6 hours | 2007 | 1907 | 132 |
| Comp. Ex. t14 | | | | | Not Carried Out | 2009 | 1917 | 135 |

EXAMPLE 19

To 3 kg of a coprecipitated hydroxide of Ni—Co—Al prepared in the same manner as Example 17, 870 g of lithium hydroxide and 378 g of calcium hydroxide were mixed. The obtained mixture was baked under an atmosphere with an oxygen partial pressure of 0.5 atm at a synthesizing temperature of 750° C. for 10 hours, to obtain a first lithium-nickel composite oxide including excessive lithium (composition: $Li_{1.03}Ni_{0.8}Co_{0.15}Al_{0.03}Ca_{0.02}O_2$).

Example Batteries U1 to U44 and Comparative Example Batteries u1 to u35 were made in the same manner as Example Batteries M1 to M44 and Comparative Example Batteries m1 to m14, respectively, except that this lithium composite oxide was used as a raw material for the active material particles, and the evaluation was carried out in the same manner as Example 1. The results are shown in Table 21.

TABLE 21

First Lithium-Nickel Composite Oxide: $Li_{1.03}Ni_{0.80}Co_{0.15}Al_{0.03}Ca_{0.02}O_2$

| | Battery No | Element M | Amount Added (mol %) | NaCl-type Crystal Structure Domain | Environment to be Allowed to Stand Temperature · Humidity (° C. · %) | Baking Atmosphere · Temperature | Discharge Performance Discharge 400 mA at 0° C. (mAh) | 4000 mA at 0° C. (mAh) | Internal Short Circuit Safety 60° C. - Crush Speed 5 mm/Sec Highest Temperature Reached (° C.) |
|---|---|---|---|---|---|---|---|---|---|
| Ex. | U1 | Ta | 0.5 | Present | 25 · 25 | Oxygen · 650° C. | 2002 | 1912 | 65 |
| Ex. | U2 | | 2.0 | | | | 2004 | 1911 | 62 |
| Ex. | U3 | Al | 0.5 | | | | 2005 | 1910 | 65 |
| Ex. | U4 | | 2.0 | | | | 2004 | 1913 | 65 |
| Ex. | U5 | Zr | 0.5 | | | | 2002 | 1914 | 64 |
| Ex. | U6 | | 2.0 | | | | 2005 | 1914 | 64 |
| Ex. | U7 | Mg | 0.5 | | | | 2006 | 1915 | 62 |
| Ex. | U8 | | 2.0 | | | | 2004 | 1911 | 68 |
| Ex. | U9 | In | 0.5 | | | | 2005 | 1908 | 69 |
| Ex. | U10 | | 2.0 | | | | 2002 | 1909 | 65 |
| Ex. | U11 | Sn | 0.5 | | | | 2004 | 1912 | 60 |
| Ex. | U12 | | 2.0 | | | | 2005 | 1914 | 66 |
| Ex. | U13 | Mn | 0.5 | | | | 2006 | 1917 | 67 |
| Ex. | U14 | | 2.0 | | | | 2007 | 1908 | 62 |
| Ex. | U15 | B | 0.5 | | | | 2004 | 1915 | 62 |
| Ex. | U16 | | 2.0 | | | | 2002 | 1917 | 62 |
| Ex. | U17 | W | 0.5 | | | | 2006 | 1911 | 68 |
| Ex. | U18 | | 2.0 | | | | 2004 | 1911 | 64 |
| Ex. | U19 | Nb | 0.5 | | | | 2003 | 1914 | 64 |
| Ex. | U20 | | 2.0 | | | | 2002 | 1912 | 68 |
| Ex. | U21 | Mo | 0.5 | | | | 2001 | 1913 | 67 |
| Ex. | U22 | | 2.0 | | | | 2005 | 1917 | 64 |
| Ex. | U23 | Ta | 2.5 | | | | 2004 | 1712 | 64 |
| Ex. | U24 | Al | | | | | 2000 | 1712 | 61 |
| Ex. | U25 | Zr | | | | | 2002 | 1709 | 68 |
| Ex. | U26 | Mg | | | | | 2005 | 1710 | 62 |
| Ex. | U27 | In | | | | | 2004 | 1717 | 65 |
| Ex. | U28 | Sn | | | | | 2003 | 1703 | 62 |
| Ex. | U29 | Mn | | | | | 2005 | 1704 | 62 |
| Ex. | U30 | B | | | | | 2000 | 1707 | 68 |
| Ex. | U31 | W | | | | | 2002 | 1717 | 68 |
| Ex. | U32 | Nb | | | | | 2005 | 1710 | 67 |
| Ex. | U33 | Mo | | | | | 2007 | 1717 | 64 |
| Ex. | U34 | Ta | 0.5 | | 60 · 55 | | 1774 | 1660 | 67 |
| Ex. | U35 | Al | | | | | 1779 | 1664 | 64 |
| Ex. | U36 | Zr | | | | | 1757 | 1670 | 64 |
| Ex. | U37 | Mg | | | | | 1767 | 1672 | 67 |
| Ex. | U38 | In | | | | | 1771 | 1667 | 62 |
| Ex. | U39 | Sn | | | | | 1764 | 1669 | 62 |
| Ex. | U40 | Mn | | | | | 1757 | 1672 | 68 |
| Ex. | U41 | B | | | | | 1770 | 1680 | 64 |
| Ex. | U42 | W | | | | | 1761 | 1672 | 64 |
| Ex. | U43 | Nb | | | | | 1775 | 1682 | 65 |
| Ex. | U44 | Mo | | | | | 1770 | 1682 | 68 |
| Comp. | u1 | Ta | 0.5 | Absent | 25 · 20 | | 2003 | 1907 | 120 |
| Comp. | u2 | Al | | | | | 2007 | 1902 | 119 |
| Comp. | u3 | Zr | | | | | 2005 | 1903 | 117 |
| Comp. | u4 | Mg | | | | | 2008 | 1907 | 122 |
| Comp. | u5 | In | | | | | 2002 | 1909 | 120 |
| Comp. | u6 | Sn | | | | | 2004 | 1902 | 117 |
| Comp. | u7 | Mn | | | | | 2007 | 1904 | 117 |
| Comp. | u8 | B | | | | | 2003 | 1907 | 121 |
| Comp. | u9 | W | | | | | 2005 | 1903 | 119 |
| Comp. | u10 | Nb | | | | | 2002 | 1907 | 124 |
| Comp. | u11 | Mo | | | | | 2000 | 1902 | 127 |
| Comp. | u12 | Not Added | — | Present | 25 · 55 | | 1727 | 1600 | 69 |
| Comp. | u13 | | | Absent | | Mixed Gas of Nitrogen:Hydrogen = 95:5 (molar ratio) treated at 400° C. for 6 hours | 2004 | 1920 | 119 |
| Comp. | u14 | | | | Not Carried Out | | 2007 | 1914 | 120 |

EXAMPLE 20

To 3 kg of the coprecipitated hydroxide of Ni—Co—Al prepared in the same manner as Example 17, 870 g of lithium hydroxide and 378 g of titanium sulfate were mixed. The obtained mixture was baked under an atmosphere with an oxygen partial pressure of 0.5 atm at a synthesizing temperature of 750° C. for 10 hours, to obtain a first lithium-nickel composite oxide including excessive lithium (composition: $Li_{1.03}Ni_{0.8}Co_{0.15}Al_{0.03}Ti_{0.02}O_2$).

Example Batteries V1 to V44 and Comparative Example Batteries v1 to v14 were made in the same manner as Example Batteries M1 to M44 and Comparative Example Batteries m1 to m14, respectively, except that this lithium composite oxide was used for a raw material for the active material particles, and the evaluation was carried out in the same manner as Example 1. The results are shown in Table 22.

TABLE 22

First Lithium-Nickel Composite Oxide: $Li_{1.03}Ni_{0.80}Co_{0.15}Al_{0.03}Ti_{0.02}O_2$

| | Battery No | Element M | Amount Added (mol %) | NaCl-type Crystal Structure Domain | Environment to be Allowed to Stand Temperature · Humidity (° C. · %) | Baking Atmosphere · Temperature | Discharge Performance Discharge 400 mA at 0° C. (mAh) | 4000 mA at 0° C. (mAh) | Internal Short Circuit Safety 60° C. - Crush Speed 5 mm/Sec Highest Temperature Reached (° C.) |
|---|---|---|---|---|---|---|---|---|---|
| Ex. | V1 | Ta | 0.5 | Present | 25 · 55 | Oxygen · 650° C. | 2002 | 1902 | 64 |
| Ex. | V2 | | 2.0 | | | | 2002 | 1900 | 65 |
| Ex. | V3 | Al | 0.5 | | | | 2005 | 1905 | 67 |
| Ex. | V4 | | 2.0 | | | | 2000 | 1902 | 65 |
| Ex. | V5 | Zr | 0.5 | | | | 2002 | 1900 | 64 |
| Ex. | V6 | | 2.0 | | | | 2002 | 1905 | 65 |
| Ex. | V7 | Mg | 0.5 | | | | 2000 | 1900 | 68 |
| Ex. | V8 | | 2.0 | | | | 2000 | 1902 | 62 |
| Ex. | V9 | In | 0.5 | | | | 2003 | 1903 | 68 |
| Ex. | V10 | | 2.0 | | | | 2004 | 1903 | 63 |
| Ex. | V11 | Sn | 0.5 | | | | 2004 | 1900 | 60 |
| Ex. | V12 | | 2.0 | | | | 2002 | 1903 | 60 |
| Ex. | V13 | Mn | 0.5 | | | | 2003 | 1902 | 64 |
| Ex. | V14 | | 2.0 | | | | 2003 | 1905 | 64 |
| Ex. | V15 | B | 0.5 | | | | 2005 | 1903 | 64 |
| Ex. | V16 | | 2.0 | | | | 2001 | 1902 | 61 |
| Ex. | V17 | W | 0.5 | | | | 2004 | 1904 | 62 |
| Ex. | V18 | | 2.0 | | | | 2005 | 1904 | 65 |
| Ex. | V19 | Nb | 0.5 | | | | 2002 | 1902 | 68 |
| Ex. | V20 | | 2.0 | | | | 2002 | 1904 | 64 |
| Ex. | V21 | Mo | 0.5 | | | | 2000 | 1904 | 68 |
| Ex. | V22 | | 2.0 | | | | 2004 | 1900 | 66 |
| Ex. | V23 | Ta | 2.5 | | | | 2006 | 1707 | 60 |
| Ex. | V24 | Al | | | | | 2002 | 1708 | 62 |
| Ex. | V25 | Zr | | | | | 2002 | 1700 | 60 |
| Ex. | V26 | Mg | | | | | 2003 | 1704 | 62 |
| Ex. | V27 | In | | | | | 2000 | 1704 | 67 |
| Ex. | V28 | Sn | | | | | 2006 | 1707 | 62 |
| Ex. | V29 | Mn | | | | | 2005 | 1700 | 62 |
| Ex. | V30 | B | | | | | 2002 | 1710 | 68 |
| Ex. | V31 | W | | | | | 2000 | 1702 | 68 |
| Ex. | V32 | Nb | | | | | 2006 | 1700 | 64 |
| Ex. | V33 | Mo | | | | | 2004 | 1711 | 64 |
| Ex. | V34 | Ta | 0.5 | | 60 · 55 | | 1175 | 1627 | 62 |
| Ex. | V35 | Al | | | | | 1777 | 1622 | 61 |
| Ex. | V36 | Zr | | | | | 1776 | 1624 | 65 |
| Ex. | V37 | Mg | | | | | 1775 | 1637 | 64 |
| Ex. | V38 | In | | | | | 1772 | 1635 | 60 |
| Ex. | V39 | Sn | | | | | 1771 | 1627 | 62 |
| Ex. | V40 | Mn | | | | | 1772 | 1647 | 67 |
| Ex. | V41 | B | | | | | 1775 | 1640 | 63 |
| Ex. | V42 | W | | | | | 1782 | 1627 | 62 |
| Ex. | V43 | Nb | | | | | 1779 | 1647 | 64 |
| Ex. | V44 | Mo | | | | | 1778 | 1617 | 62 |
| Comp. Ex. | v1 | Ta | 0.5 | Absent | 25 · 20 | | 2007 | 1905 | 119 |
| Comp. Ex. | v2 | Al | | | | | 2005 | 1907 | 120 |
| Comp. Ex. | v3 | Zr | | | | | 2008 | 1908 | 124 |
| Comp. Ex. | v4 | Mg | | | | | 2004 | 1902 | 123 |
| Comp. Ex. | v5 | In | | | | | 2008 | 1907 | 125 |
| Comp. Ex. | v6 | Sn | | | | | 2002 | 1904 | 127 |

TABLE 22-continued

First Lithium-Nickel Composite Oxide: $Li_{1.03}Ni_{0.80}Co_{0.15}Al_{0.03}Ti_{0.02}O_2$

| Battery No | Element M | NaCl-type Amount Added (mol %) | NaCl-type Crystal Structure Domain | Environment to be Allowed to Stand Temperature · Humidity (° C. · %) | Baking Atmosphere · Temperature | Discharge Performance Discharge 400 mA at 0° C. (mAh) | Discharge Performance Discharge 4000 mA at 0° C. (mAh) | Internal Short Circuit Safety 60° C. - Crush Speed 5 mm/Sec Highest Temperature Reached (° C.) |
|---|---|---|---|---|---|---|---|---|
| Comp. Ex. v7 | Mn | | | | | 2005 | 1905 | 121 |
| Comp. Ex. v8 | B | | | | | 2007 | 1907 | 127 |
| Comp. Ex. v9 | W | | | | | 2004 | 1904 | 124 |
| Comp. Ex. v10 | Nb | | | | | 2002 | 1907 | 127 |
| Comp. Ex. v11 | Mo | | | | | 2001 | 1904 | 120 |
| Comp. Ex. v12 | Not Added | — | Present | 25 · 55 | | 1720 | 1609 | 71 |
| Comp. Ex. v13 | | | Absent | | Mixed Gas of Nitrogen:Hydrogen = 95:5 (molar ratio) treated at 400° C. for 6 hours | 2009 | 1912 | 125 |
| Comp. Ex. v14 | | | | | Not Carried Out | 2010 | 1920 | 127 |

The results in Tables 14 to 22 showed similar tendency with the case in Example 11.

COMPARATIVE EXAMPLE 3

A first lithium-nickel composite oxide having a composition of $Li_{1.03}Ni_{0.20}Co_{0.50}Al_{0.30}O_2$ was obtained by using nickel sulfate, cobalt sulfate, and aluminum sulfate so that a molar ratio of Ni atoms, Co atoms, and Al atoms was 20:50:30 upon synthesizing the lithium composite oxide. Comparative Example Batteries w1 to w58 were made in the same manner as Example Batteries M1 to M44 and Comparative Example Batteries m1 to m14, respectively, except that this first lithium-nickel composite oxide was used as the raw material for the active material particles, and the evaluation was carried out in the same manner as Example 1. The results are shown in Table 23.

TABLE 23

First Lithium-Nickel Composite Oxide: $Li_{1.03}Ni_{0.20}Co_{0.50}Al_{0.30}O_2$

| Battery No | Element M | NaCl-type Amount Added (mol %) | NaCl-type Crystal Structure Domain | Environment to be Allowed to Stand Temperature · Humidity (° C. · %) | Baking Atmosphere · Temperature | Discharge Performance Discharge 400 mA at 0° C. (mAh) | Discharge Performance Discharge 4000 mA at 0° C. (mAh) | Internal Short Circuit Safety 60° C. - Crush Speed 5 mm/Sec Highest Temperature Reached (° C.) |
|---|---|---|---|---|---|---|---|---|
| Comp. w1 | Ta | 0.5 | Present | 25 · 55 | Oxygen · 650° C. | 1810 | 1710 | 117 |
| Comp. w2 | | 2.0 | | | | 1815 | 1710 | 118 |
| Comp. w3 | Al | 0.5 | | | | 1805 | 1715 | 115 |
| Comp. w4 | | 2.0 | | | | 1810 | 1709 | 100 |
| Comp. w5 | Zr | 0.5 | | | | 1800 | 1710 | 120 |
| Comp. w6 | | 2.0 | | | | 1802 | 1710 | 110 |
| Comp. w7 | Mg | 0.5 | | | | 1807 | 1715 | 106 |
| Comp. w8 | | 2.0 | | | | 1804 | 1712 | 112 |
| Comp. w9 | In | 0.5 | | | | 1810 | 1715 | 110 |
| Comp. w10 | | 2.0 | | | | 1800 | 1705 | 110 |
| Comp. w11 | Sn | 0.5 | | | | 1805 | 1715 | 100 |
| Comp. w12 | | 2.0 | | | | 1810 | 1710 | 115 |
| Comp. w13 | Mn | 0.5 | | | | 1806 | 1712 | 120 |
| Comp. w14 | | 2.0 | | | | 1810 | 1720 | 100 |
| Comp. w15 | B | 0.5 | | | | 1805 | 1708 | 115 |
| Comp. w16 | | 2.0 | | | | 1802 | 1710 | 118 |
| Comp. w17 | W | 0.5 | | | | 1804 | 1715 | 117 |

TABLE 23-continued

First Lithium-Nickel Composite Oxide: $Li_{1.03}Ni_{0.20}Co_{0.50}Al_{0.30}O_2$

| Battery No | Element M | NaCl-type Amount Added (mol %) | NaCl-type Crystal Structure Domain | Environment to be Allowed to Stand Temperature · Humidity (° C. · %) | Baking Atmosphere · Temperature | Discharge Performance Discharge 400 mA at 0° C. (mAh) | Discharge Performance Discharge 4000 mA at 0° C. (mAh) | Internal Short Circuit Safety 60° C. - Crush Speed 5 mm/Sec Highest Temperature Reached (° C.) |
|---|---|---|---|---|---|---|---|---|
| Comp. w18 |  | 2.0 |  |  |  | 1805 | 1700 | 120 |
| Comp. w19 | Nb | 0.5 |  |  |  | 1800 | 1712 | 120 |
| Comp. w20 |  | 2.0 |  |  |  | 1805 | 1715 | 115 |
| Comp. w21 | Mo | 0.5 |  |  |  | 1805 | 1715 | 115 |
| Comp. w22 |  | 2.0 |  |  |  | 1805 | 1710 | 116 |
| Comp. w23 | Ta | 2.5 |  |  |  | 1789 | 1530 | 125 |
| Comp. w24 | Al |  |  |  |  | 1788 | 1535 | 115 |
| Comp. w25 | Zr |  |  |  |  | 1785 | 1540 | 120 |
| Comp. w26 | Mg |  |  |  |  | 1779 | 1530 | 120 |
| Comp. w27 | In |  |  |  |  | 1783 | 1540 | 118 |
| Comp. w28 | Sn |  |  |  |  | 1785 | 1530 | 110 |
| Comp. w29 | Mn |  |  |  |  | 1788 | 1532 | 115 |
| Comp. w30 | B |  |  |  |  | 1782 | 1535 | 117 |
| Comp. w31 | W |  |  |  |  | 1779 | 1530 | 115 |
| Comp. w32 | Nb |  |  |  |  | 1780 | 1530 | 112 |
| Comp. w33 | Mo |  |  |  |  | 1790 | 1533 | 110 |
| Comp. w34 | Ta | 0.5 |  | 60 · 55 |  | 1770 | 1622 | 105 |
| Comp. w35 | Al |  |  |  |  | 1769 | 1623 | 120 |
| Comp. w36 | Zr |  |  |  |  | 1763 | 1627 | 117 |
| Comp. w36 | Mg |  |  |  |  | 1767 | 1622 | 116 |
| Comp. w38 | In |  |  |  |  | 1757 | 1616 | 110 |
| Comp. w39 | Sn |  |  |  |  | 1760 | 1627 | 120 |
| Comp. w40 | Mn |  |  |  |  | 1762 | 1620 | 118 |
| Comp. w41 | B |  |  |  |  | 1767 | 1618 | 110 |
| Comp. w42 | W |  |  |  |  | 1770 | 1610 | 120 |
| Comp. w43 | Nb |  |  |  |  | 1758 | 1610 | 113 |
| Comp. w44 | Mo |  |  |  |  | 1759 | 1612 | 105 |
| Comp. w45 | Ta | 0.5 | Absent | 25 · 20 |  | 1805 | 1709 | 120 |
| Comp. w46 | Al |  |  |  |  | 1805 | 1715 | 120 |
| Comp. w47 | Zr |  |  |  |  | 1805 | 1710 | 118 |
| Comp. w48 | Mg |  |  |  |  | 1805 | 1710 | 117 |
| Comp. w49 | In |  |  |  |  | 1802 | 1710 | 115 |
| Comp. w50 | Sn |  |  |  |  | 1801 | 1712 | 105 |
| Comp. w51 | Mn |  |  |  |  | 1806 | 1715 | 117 |
| Comp. w52 | B |  |  |  |  | 1802 | 1715 | 117 |
| Comp. w53 | W |  |  |  |  | 1800 | 1710 | 119 |
| Comp. w54 | Nb |  |  |  |  | 1805 | 1715 | 112 |
| Comp. w55 | Mo |  |  |  |  | 1800 | 1705 | 122 |
| Comp. w56 | Not Added | — | Present Absent | 25 · 55 |  | 1760 | 1601 | 112 |
| Comp. w57 |  |  |  |  | Mixed Gas of Nitrogen:Hydrogen = 95:5 (molar ratio) treated at 400° C. for 6 hours | 1803 | 1712 | 135 |
| Comp. w58 |  |  |  |  | Not Carried Out | 1800 | 1720 | 138 |

No presence of the domain having the NaCl-type crystal structure was confirmed upon analysis of the active material particles of Comparative Example Batteries w1 to w58. The results of Tables 23A and 23B made clear that a large heat generation is caused in the crush test in the case when y+z exceeds 0.75 in the first lithium-nickel composite oxide represented by the general formula $Li_xNi_{1-y-z}Co_yMe_zO_2$, not producing the domain having the NaCl-type crystal structure.

COMPARATIVE EXAMPLE 4

Comparative Example Batteries x1 to x58 were made in the same manner as Example Batteries M1 to M44 and Comparative Example Batteries m1 to m14, respectively, except that $Li_{1.03}NiO_2$ was used as a raw material for the active material particles instead of the first lithium-nickel composite oxide, and the evaluation was carried out in the same manner as Example 1. The results are shown in Table 24.

TABLE 24

First Lithium-Nickel Composite Oxide: $Li_{1.03}NiO_2$

| Battery No | Element M | Amount Added (mol %) | NaCl-type Crystal Structure Domain | Environment to be Allowed to Stand Temperature · Humidity (° C. · %) | Baking Atmosphere · Temperature | Discharge Performance Discharge 400 mA at 0° C. (mAh) | 4000 mA at 0° C. (mAh) | Internal Short Circuit Safety 60° C. - Crush Speed 5 mm/Sec Highest Temperature Reached (° C.) |
|---|---|---|---|---|---|---|---|---|
| Comp. Ex. x1 | Ta | 0.5 | Present | 25 · 55 | Oxygen · 650° C. | 2002 | 1810 | 112 |
| Comp. Ex. x2 |  | 2.0 |  |  |  | 2004 | 1811 | 115 |
| Comp. Ex. x3 | Al | 0.5 |  |  |  | 2007 | 1822 | 105 |
| Comp. Ex. x4 |  | 2.0 |  |  |  | 2009 | 1820 | 117 |
| Comp. Ex. x5 | Zr | 0.5 |  |  |  | 2007 | 1828 | 117 |
| Comp. Ex. x6 |  | 2.0 |  |  |  | 2005 | 1819 | 106 |
| Comp. Ex. x7 | Mg | 0.5 |  |  |  | 2004 | 1811 | 110 |
| Comp. Ex. x8 |  | 2.0 |  |  |  | 2005 | 1813 | 120 |
| Comp. Ex. x9 | In | 0.5 |  |  |  | 2008 | 1810 | 116 |
| Comp. Ex. x10 |  | 2.0 |  |  |  | 2009 | 1813 | 120 |
| Comp. Ex. x11 | Sn | 0.5 |  |  |  | 2010 | 1818 | 110 |
| Comp. Ex. x12 |  | 2.0 |  |  |  | 2007 | 1812 | 115 |
| Comp. Ex. x13 | Mn | 0.5 |  |  |  | 2004 | 1820 | 117 |
| Comp. Ex. x14 |  | 2.0 |  |  |  | 2005 | 1822 | 110 |
| Comp. Ex. x15 | B | 0.5 |  |  |  | 2003 | 1824 | 115 |
| Comp. Ex. x16 |  | 2.0 |  |  |  | 2002 | 1825 | 117 |
| Comp. Ex. x17 | W | 0.5 |  |  |  | 2008 | 1822 | 119 |
| Comp. Ex. x18 |  | 2.0 |  |  |  | 2008 | 1820 | 116 |
| Comp. Ex. x19 | Nb | 0.5 |  |  |  | 2009 | 1821 | 122 |
| Comp. Ex. x20 |  | 2.0 |  |  |  | 2010 | 1822 | 100 |
| Comp. Ex. x21 | Mo | 0.5 |  |  |  | 2007 | 1824 | 112 |
| Comp. Ex. x22 |  | 2.0 |  |  |  | 2009 | 1822 | 110 |
| Comp. Ex. x23 | Ta | 2.5 |  |  |  | 1990 | 1720 | 118 |
| Comp. Ex. x24 | Al |  |  |  |  | 1992 | 1721 | 112 |
| Comp. Ex. x25 | Zr |  |  |  |  | 1991 | 1710 | 117 |
| Comp. Ex. x26 | Mg |  |  |  |  | 1993 | 1712 | 120 |
| Comp. Ex. x27 | In |  |  |  |  | 1992 | 1719 | 118 |
| Comp. Ex. x28 | Sn |  |  |  |  | 1990 | 1711 | 115 |
| Comp. Ex. x29 | Mn |  |  |  |  | 1992 | 1712 | 105 |
| Comp. Ex. x30 | B |  |  |  |  | 1992 | 1710 | 110 |
| Comp. Ex. x31 | W |  |  |  |  | 1990 | 1720 | 117 |
| Comp. Ex. x32 | Nb |  |  |  |  | 1991 | 1721 | 118 |
| Comp. Ex. x33 | Mo |  |  |  |  | 1990 | 1710 | 120 |
| Comp. Ex. x34 | Ta | 0.5 |  | 60 · 55 |  | 1800 | 1621 | 115 |
| Comp. Ex. x35 | Al |  |  |  |  | 1801 | 1618 | 110 |
| Comp. Ex. x36 | Zr |  |  |  |  | 1802 | 1611 | 112 |
| Comp. Ex. x37 | Mg |  |  |  |  | 1804 | 1610 | 125 |
| Comp. Ex. x38 | In |  |  |  |  | 1805 | 1612 | 115 |
| Comp. Ex. x39 | Sn |  |  |  |  | 1802 | 1600 | 105 |
| Comp. Ex. x40 | Mn |  |  |  |  | 1807 | 1609 | 120 |
| Comp. Ex. x41 | B |  |  |  |  | 1803 | 1608 | 120 |
| Comp. Ex. x42 | W |  |  |  |  | 1804 | 1610 | 100 |
| Comp. Ex. x43 | Nb |  |  |  |  | 1802 | 1620 | 120 |
| Comp. Ex. x44 | Mo |  |  |  |  | 1801 | 1618 | 110 |
| Comp. Ex. x45 | Ta | 0.5 | Absent | 25 · 20 |  | 2000 | 1810 | 120 |
| Comp. Ex. x46 | Al |  |  |  |  | 2001 | 1809 | 120 |
| Comp. Ex. x47 | Zr |  |  |  |  | 2000 | 1802 | 100 |
| Comp. Ex. x48 | Mg |  |  |  |  | 2000 | 1809 | 118 |
| Comp. Ex. x49 | In |  |  |  |  | 2002 | 1810 | 117 |
| Comp. Ex. x50 | Sn |  |  |  |  | 2000 | 1812 | 113 |
| Comp. Ex. x51 | Mn |  |  |  |  | 1999 | 1809 | 120 |
| Comp. Ex. x52 | B |  |  |  |  | 1998 | 1800 | 120 |
| Comp. Ex. x53 | W |  |  |  |  | 2000 | 1803 | 115 |
| Comp. Ex. x54 | Nb |  |  |  |  | 2001 | 1801 | 115 |
| Comp. Ex. x55 | Mo |  |  |  |  | 2002 | 1812 | 118 |
| Comp. Ex. x56 | Not Added | — | Present | 25 · 55 |  | 1990 | 1700 | 115 |
| Comp. Ex. x57 |  |  | Absent |  | Mixed Gas of Nitrogen:Hydrogen = 95:5 (molar ratio) treated at 400° C. for 6 hours | 2010 | 1820 | 140 |
| Comp. Ex. x58 |  |  |  |  | Not Carried Out | 2009 | 1819 | 142 |

The results of Table 24 made clear that when $Li_{1.03}NiO_2$ was used, though the domain having the NaCl-type crystal structure was produced, the discharge capacity was small. With an excessive presence of Li as well, when Z is greater than 0.5 in $Li_xNi_{1-y-z}Co_yMe_xO_2$, a homogeneous solid solution could not be obtained.

INDUSTRIAL APPLICABILITY

The present invention is useful in a lithium ion secondary battery including a lithium-nickel composite oxide composed mainly of nickel as the positive electrode active material. Based on the present invention, safety upon internal short-circuit can be further improved without hindering high-rate performance at low temperature.

Form of a lithium ion secondary battery of the present invention is not particularly limited, and may be any of for example coin-type, button-type, sheet-type, cylindrical type, flat-type, and prismatic-type. Also, form of an electrode assembly including a positive electrode, a negative electrode, and a separator may be wound-type or stack-type. The size of the battery may be a small size for a small mobile devices, or may be a large size for electric vehicles. Thus, a lithium ion secondary battery of the present invention may be used as a power source for, for example, personal data assistants, mobile electronic devices, household small electric power storage devices, motorcycles, Electric Vehicles, and Hybrid Electric Vehicles. However, application is not particularly limited.

The invention claimed is:

1. A lithium ion secondary battery comprising a positive electrode capable of charging and discharging, a negative electrode capable of charging and discharging, and a non-aqueous electrolyte;

said positive electrode including active material particles;

said active material particles including at least a first lithium-nickel composite oxide forming a core portion thereof;

said first lithium-nickel composite oxide being represented by $Li_xNi_{1-y-z}Co_yMe_xO_2$
where $0.85 \leq x \leq 1.25$, $0 < y \leq 0.5$, $0 \leq z \leq 0.5$, $0 < y+z \leq 0.75$, and element Me is at least one selected from the group consisting of Al, Mn, Ti, Mg, and Ca;

a surface layer portion of said active material particles including:

(i) at least one selected from the group consisting of a nickel oxide having a NaCl crystal structure and a second lithium-nickel composite oxide including a domain having the NaCl crystal structure; and (ii) element M not incorporated in the crystal structure of said first lithium-nickel composite oxide, said element M being at least one selected from the group consisting of Al, Mn, Mg, B, Zr, W, Nb, Ta, In, Mo, and Sn.

2. The lithium ion secondary battery in accordance with claim 1, wherein said nickel oxide having the NaCl crystal structure is at least one selected from the group consisting of NiO and cation-deficient $Ni_{1-\delta}O$, and said domain having the NaCl crystal structure has a structure in which Li in Li site in said first lithium-nickel composite oxide is replaced with Ni, Co, or Me.

3. The lithium ion secondary battery in accordance with claim 1, wherein element M is distributed more at the outer side of said surface layer portion compared with the inner side thereof, and said nickel oxide is distributed more at the inner side of said surface layer portion compared with the outer side.

4. The lithium ion secondary battery in accordance with claim 1, wherein $0 < z \leq 0.5$, and the concentration of element Me is high in the proximity of said surface layer portion compared with the inner portion of said active material particles.

5. The lithium ion secondary battery in accordance with claim 1, wherein the amount of element M is 2 mol % or less relative to said first lithium-nickel composite oxide.

6. A method for producing a lithium ion secondary battery, the method comprising the steps of:

obtaining a positive electrode capable of charging and discharging;

obtaining a negative electrode capable of charging and discharging; and assembling a battery including said positive electrode, said negative electrode, and a non-aqueous electrolyte:

said step of obtaining said positive electrode including the steps of:

(i) allowing a first lithium-nickel composite oxide represented by $Li_xNi_{1-y-z}Co_yMe_xO_2$
where $0.85 \leq x \leq 1.25$, $0 < y \leq 0.5$, $0 \leq z \leq 0.5$, $0 < y+z \leq 0.75$, and element Me is at least one selected from the group consisting of Al, Mn, Ti, Mg, and Ca, to carry element M of at least one selected from the group consisting of Al, Mn, Mg, B, Zr, W, Nb, Ta, In, Mo, and Sn;

(ii) producing NiOOH on a surface of said first lithium-nickel composite oxide by moisture in the atmosphere by allowing said first lithium-nickel composite oxide carrying element M to stand under an environment with a temperature of 60° C. or less and a humidity of 20% or more;

(iii) preliminary baking said first lithium-nickel composite oxide with NiOOH produced on the surface thereof in a dry air atmosphere, and then carrying out a main baking in an oxygen atmosphere, thereby converting said NiOOH into at least one selected from the group consisting of NiO having a NaCl crystal structure, cation-deficient $Ni_{1-\delta}O$ having the NaCl-type crystal structure, and a second lithium-nickel composite oxide including a domain having the NaCl crystal structure, to obtain active material particles; and (iv) forming a positive electrode including said active material particles.

* * * * *